United States Patent
Kim et al.

(10) Patent No.: US 10,149,196 B2
(45) Date of Patent: *Dec. 4, 2018

(54) METHOD AND USER EQUIPMENT FOR BLOCKING NETWORK ACCESS ACCORDING TO APPLICATION

(71) Applicant: LG ELECTRONICS INC., Seoul (KR)

(72) Inventors: Jaehyun Kim, Seoul (KR); Youngdae Lee, Seoul (KR); Ki-Dong Lee, Seoul (KR); Hyunsook Kim, Seoul (KR); Laeyoung Kim, Seoul (KR); Taehun Kim, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.
This patent is subject to a terminal disclaimer.

(21) Appl. No.: 15/113,402

(22) PCT Filed: Aug. 13, 2015

(86) PCT No.: PCT/KR2015/008500
§ 371 (c)(1),
(2) Date: Jul. 21, 2016

(87) PCT Pub. No.: WO2016/024832
PCT Pub. Date: Feb. 18, 2016

(65) Prior Publication Data
US 2017/0013501 A1 Jan. 12, 2017

Related U.S. Application Data

(60) Provisional application No. 62/037,095, filed on Aug. 13, 2014, provisional application No. 62/137,836, (Continued)

(51) Int. Cl.
H04W 28/02 (2009.01)
H04W 48/06 (2009.01)
H04W 84/04 (2009.01)

(52) U.S. Cl.
CPC ....... *H04W 28/0284* (2013.01); *H04W 48/06* (2013.01); *H04W 84/042* (2013.01)

(58) Field of Classification Search
None
See application file for complete search history.

(56) References Cited

U.S. PATENT DOCUMENTS

2013/0045706 A1 2/2013 Hsu
2014/0010180 A1 1/2014 Lee et al.
(Continued)

FOREIGN PATENT DOCUMENTS

JP 201422986 2/2014
WO 2013141600 A1 9/2013

OTHER PUBLICATIONS

NTT DOCOMO et al.: "Number of ACDC categories (changes to TR)", 3GPP Draft; S1-143118, 3rd Gerneration Partnership Project (3GPP); Mobile Competence Center; 650, Route Des Lucioles; F-06921 Sophia-Antipolis Cedex; France Aug. 9, 2014.*
(Continued)

*Primary Examiner* — Saba Tsegaye
(74) *Attorney, Agent, or Firm* — Lee Hong Degerman Kang Waimey

(57) ABSTRACT

A disclosure of the present specification provides a method of blocking network access in user equipment (UE). The method may include the steps of: receiving application attribute related information at a home public land mobile network (HPLMN); receiving application specific congestion control for data communication (ACDC) blocking information at the HPLMN or a visited PLMN (VPLMN); (Continued)

determining the category of an application being executed based on the application attribute related information when there is information on the application being executed in the application attribute related information; and performing an ACDC blocking check based on matched ACDC blocking information when the ACDC blocking information is matched with the determined category from among the ACDC blocking information.

18 Claims, 54 Drawing Sheets

Related U.S. Application Data filed on Mar. 25, 2015, provisional application No. 62/138,955, filed on Mar. 26, 2015, provisional application No. 62/141,838, filed on Apr. 1, 2015, provisional application No. 62/161,267, filed on May 14, 2015, provisional application No. 62/196,312, filed on Jul. 24, 2015.

(56) References Cited

U.S. PATENT DOCUMENTS

| | | | |
|---|---|---|---|
| 2014/0029530 | A1 | 1/2014 | Kim et al. |
| 2015/0289195 | A1* | 10/2015 | Gogic .................. H04W 48/06 370/230 |
| 2016/0014632 | A1* | 1/2016 | Siow ..................... H04L 5/0085 370/230 |
| 2016/0212653 | A1* | 7/2016 | Wang ................. A61B 10/0051 |
| 2017/0257791 | A1* | 9/2017 | Rajadurai ......... H04W 28/0289 |

OTHER PUBLICATIONS

3rd Generation Partnership Project, "Technical Specification Group Services and System Aspects; Study on Application-Specific Congestion Control for Data Communication (Release 13)", 3GPP TR 22.806 V13.0.0, Jun. 2014, 40 pages.

European Patent Office Application Serial No. 15831897.2, Search Report dated Sep. 25, 2017, 10 pages.

Japan Patent Office Application No. 2016-575284, Office Action dated Oct. 17, 2017, 3 pages.

NTT DOCOMO, "Number of ACDC categories (changes to TR)", 3GPP TSG-SA WG1 Meeting #67, S1-143118, Aug. 2014, 3 pages.

LG Electronics, "Some clarification in the statement of honouring ACDC category", 3GPP TSG-SA WG1 Meeting #66, S1-141163, May 2014, 3 pages.

QUALCOMM, "CR for ACDC in Connected", 3GPP TSG-SA WG1 Meeting #67, S1-143153, Aug. 2014, 3 pages.

* cited by examiner

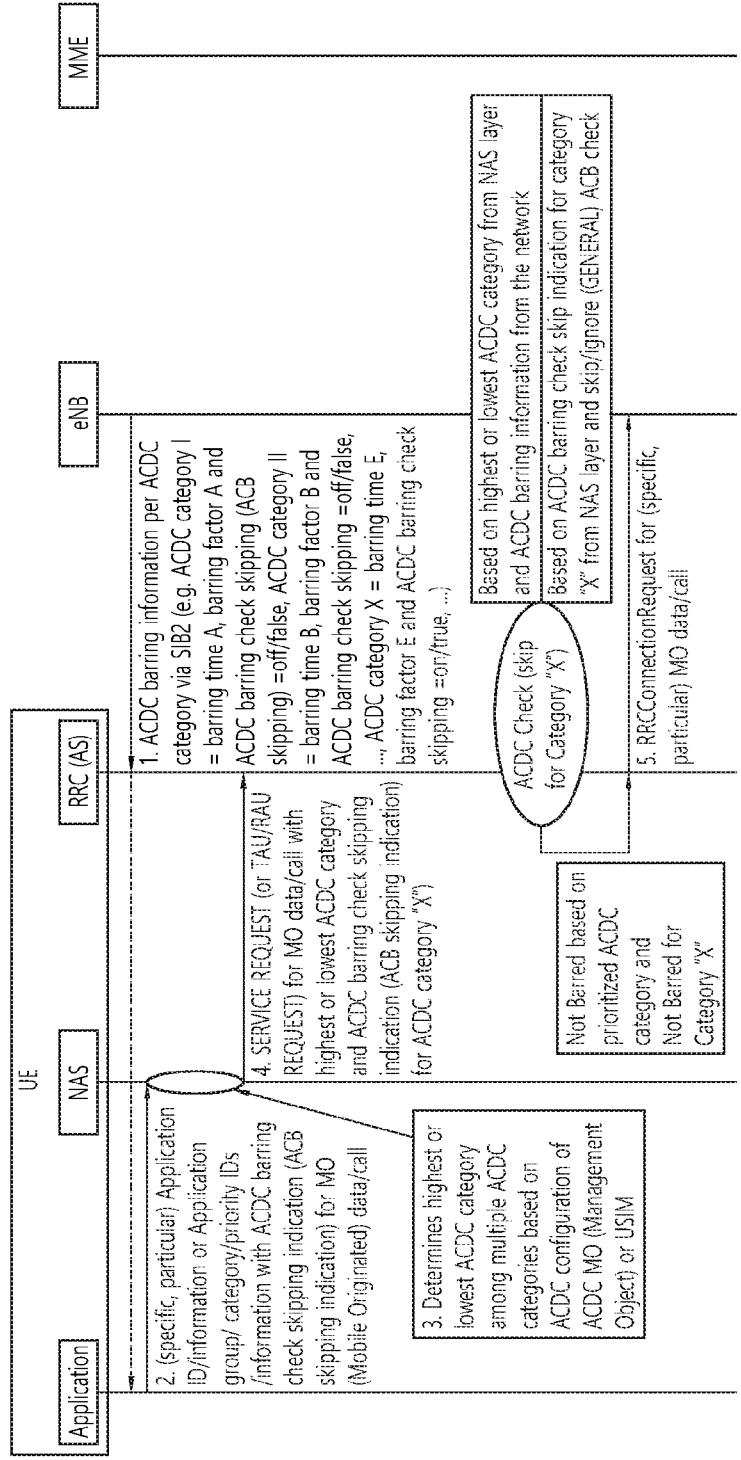

METHOD AND USER EQUIPMENT FOR BLOCKING NETWORK ACCESS ACCORDING TO APPLICATION

CROSS-REFERENCE TO RELATED APPLICATIONS

This application is the National Stage filing under 35 U.S.C. 371 of International Application No. PCT/KR2015/008500, filed on Aug. 13, 2015, which claims the benefit of U.S. Provisional Application No. 62/037,095, filed on Aug. 13, 2014, 62/137,836, filed on Mar. 25, 2015, 62/138,955, filed on Mar. 26, 2015, 62/141,838, filed on Apr. 1, 2015, 62/161,267, filed on May 14, 2015 and 62/196,312, filed on Jul. 24, 2015, the contents of which are all hereby incorporated by reference herein in their entirety.

BACKGROUND OF THE INVENTION

Field of the Invention

The present invention relates to a technique of barring access for congestion control in a mobile communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
| --- | --- |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, when the UE 10 requests the RRC connection for the purpose of data transmission of the user plane, if the network, for example, the base station (that is, eNodeB) is in the congest state, the UE 10 may reject the request for the RRC connection.

In the overload and congest situation of the network, a method for differentiating the service per specific application of the UE is required. However, in the related art, there is no method of implementing the method.

SUMMARY OF THE INVENTION

Accordingly, an object of the present invention is to present a method that can solve the aforementioned problem.

In order to achieve the aforementioned purpose, one disclosure of the present specification provides a method for barring a network access. The method may be performed by a user equipment (UE) and comprise: receiving application-related attribute information at home public land mobile network (H-PLMN); receiving application specific congestion control for data communication (ACDC) barring information at the H-PLMN or a visited public land mobile network (V-PLMN); if there exists information related to an executed application in the application-related attribute information, determining a category of the executed application based on the application-related attribute information; and if there exists a specific ACDC barring information to match with the determined category in the ACDC barring information, performing an ACDC barring check based on the matched ACDC barring information. According to the ACDC barring check, an network access may be barred or allowed per an application.

The method may further comprise: if there does not exist the information related to the executed application in the application-related attribute information, determining that the executed application corresponds to a special category for an uncategorized application; and performing the ACDC barring check based on a ACDC barring information or an indication for the special category in the ACDC barring information.

The special category may correspond to a highest category or a lowest category.

The method may further comprise: if there does not exist a ACDC barring information, to match with a category determined at H-PLMN, in the ACDC barring information received at H-PLMN, performing a ACDC barring check based on an ACDC barring information for a highest or lowest category in the ACDC barring information received at the H-PLMN.

The method may further comprise: if there does not exist a ACDC barring information, to match with a category determined at H-PLMN, in the ACDC barring information received at V-PLMN, performing a ACDC barring check based on an ACDC barring information for a highest or lowest category in the ACDC barring information received at the V-PLMN.

The application-related information may include at least one of a group, a category, a priority, information and an identifier of application.

The ACDC barring information may include: a barring rate, a barring factor, a barring time, a roaming information, and an access class barring (ACB) skipping configuration, which are defined per a specific unit of an application.

The performing of the ACDC barring check may include: if there exists a plurality of categories, performing the ACDC barring check based on an ACDC barring information for a highest or lowest category among the plurality of the categories.

In order to achieve the aforementioned purpose, one disclosure of the present specification provides a user equipment (UE) for barring a network access. The UE may comprise: a transceiver; and a processor configured to control the transceiver and configured to perform: receiving application-related attribute information at home public land mobile network (H-PLMN); receiving application specific congestion control for data communication (ACDC) barring information at the H-PLMN or a visited public land mobile network (V-PLMN); if there exists information related to an executed application in the application-related attribute information, determining a category of the executed application based on the application-related attribute information; and if there exists a specific ACDC barring information to match with the determined category in the ACDC barring information, performing an ACDC barring check based on the matched ACDC barring information. According to the ACDC barring check, an network access is barred or allowed per an application.

According to the disclosure of the specification, the problem in the related art is solved. In detail, an unnecessary service delay between a terminal and a network can be prevented under an application based service environment of a system. Further, unnecessary network resource waste can be prevented.

BRIEF DESCRIPTION OF THE DRAWINGS

FIGS. 9a to 9b are signal flowcharts illustrating proposal 1-1a of the present invention and FIGS. 10a to 10b are signal flowcharts illustrating proposal 1-1b of the present invention.

DESCRIPTION OF EXEMPLARY EMBODIMENTS

Figure 1:
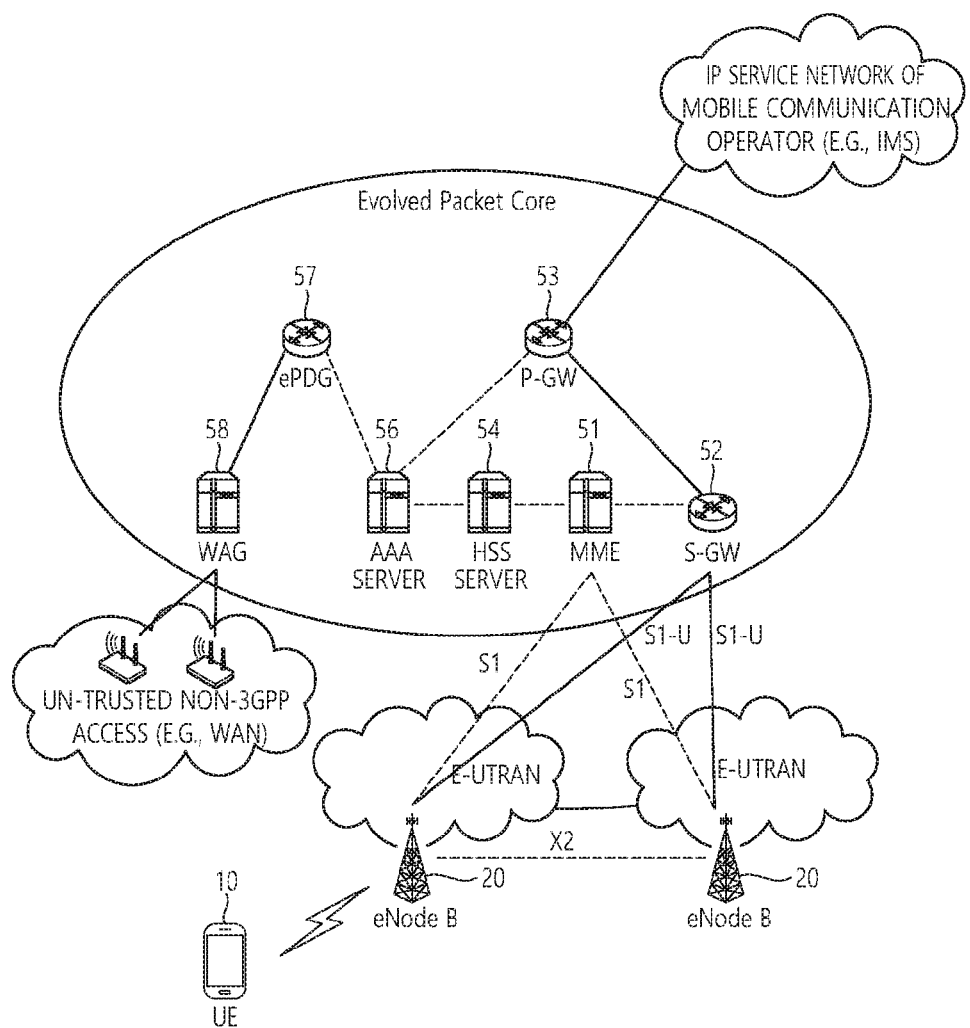
FIG. 1 is a structural diagram of an evolved mobile communication network.
Figure 2:
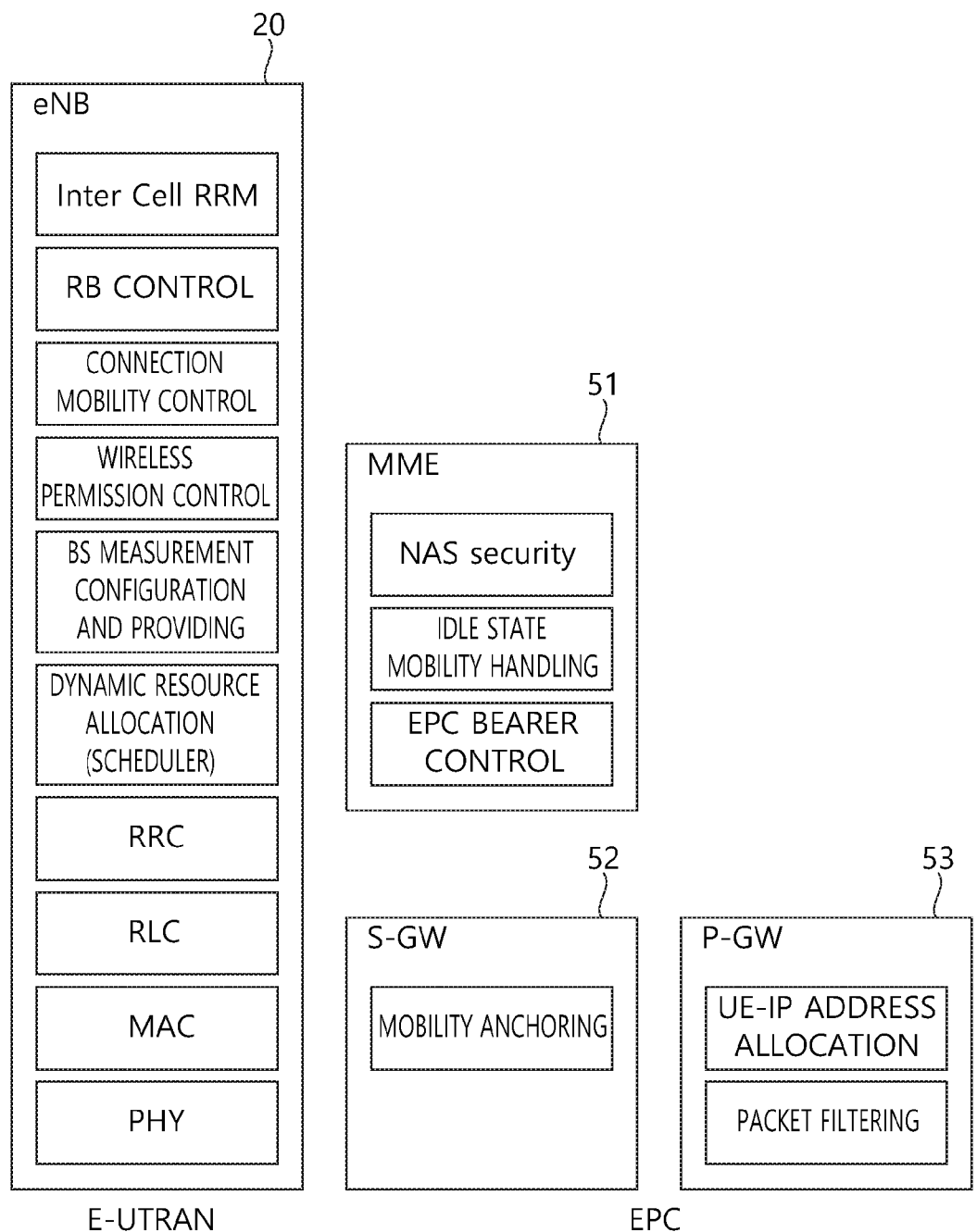
FIG. 2 is an exemplary diagram illustrating architectures of a general E-UTRAN and a general EPC.
Figure 3:
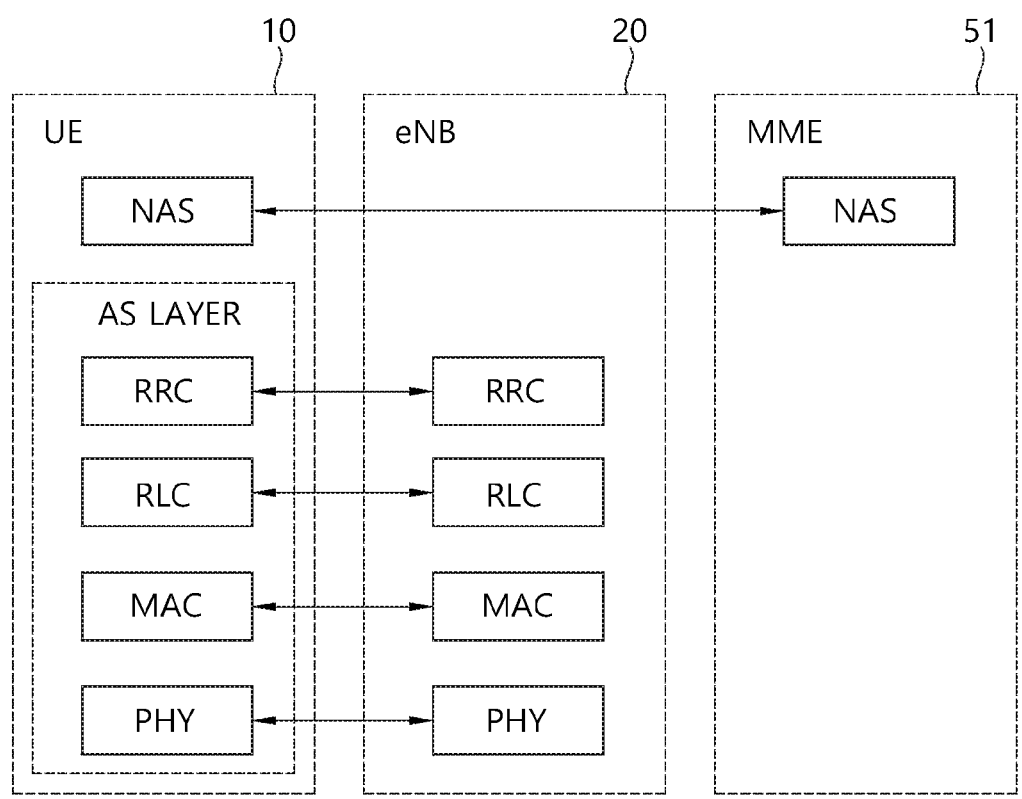
FIG. 3 is an exemplary diagram illustrating a structure of a radio interface protocol on a control plane between UE and eNodeB.
Figure 4:
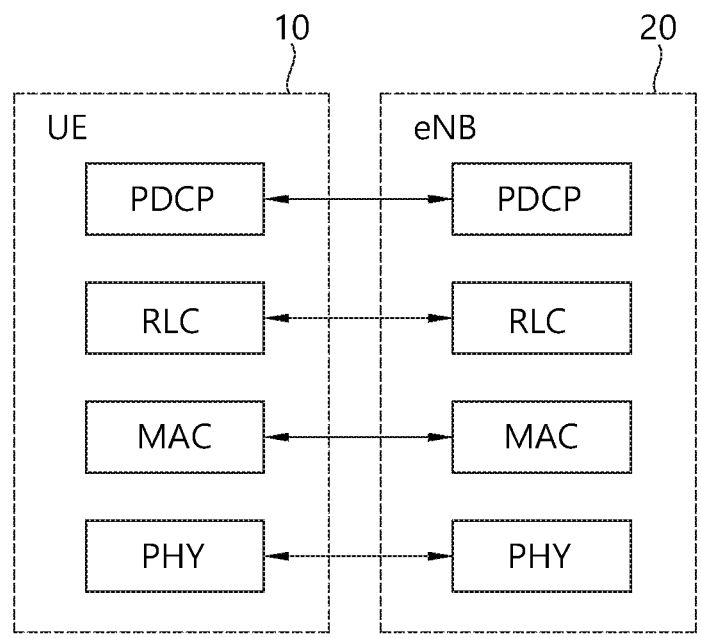
FIG. 4 is another exemplary diagram illustrating a structure of a radio interface protocol on a user plane between the UE and a base station.
Figure 5A:
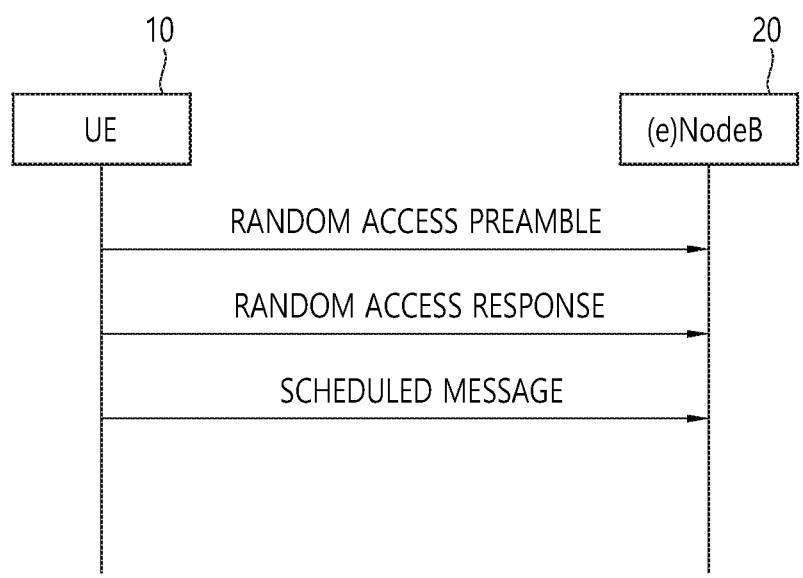
FIG. 5a is a flowchart illustrating a random access process in 3GPP LTE.
Figure 5B:
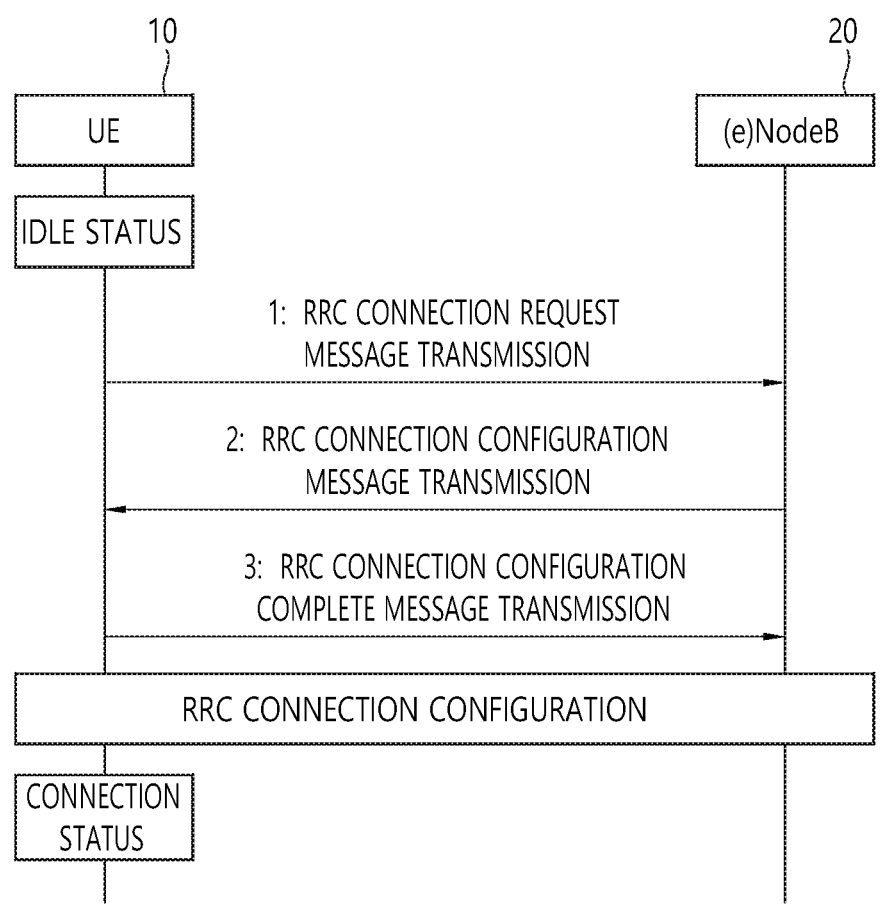
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/ handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classifed into a home PLMN (HPLMN) and a vistied PLMN (VPLMN).

Hereinafter, an aspect of the present specification is described with reference to the accompanying drawings.

Figure 6:
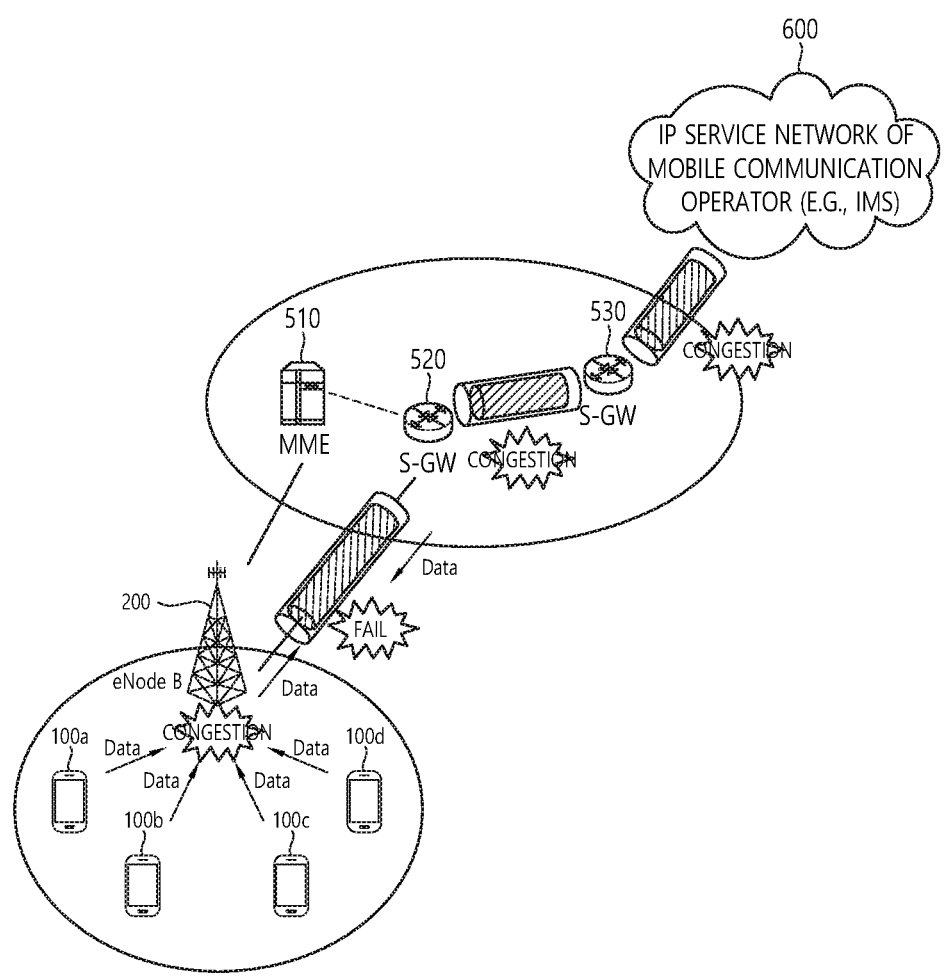
FIG. 6 illustrates a network overloaded state.

FIG. 6 shows a network overload state.

As shown in FIG. 6, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7:
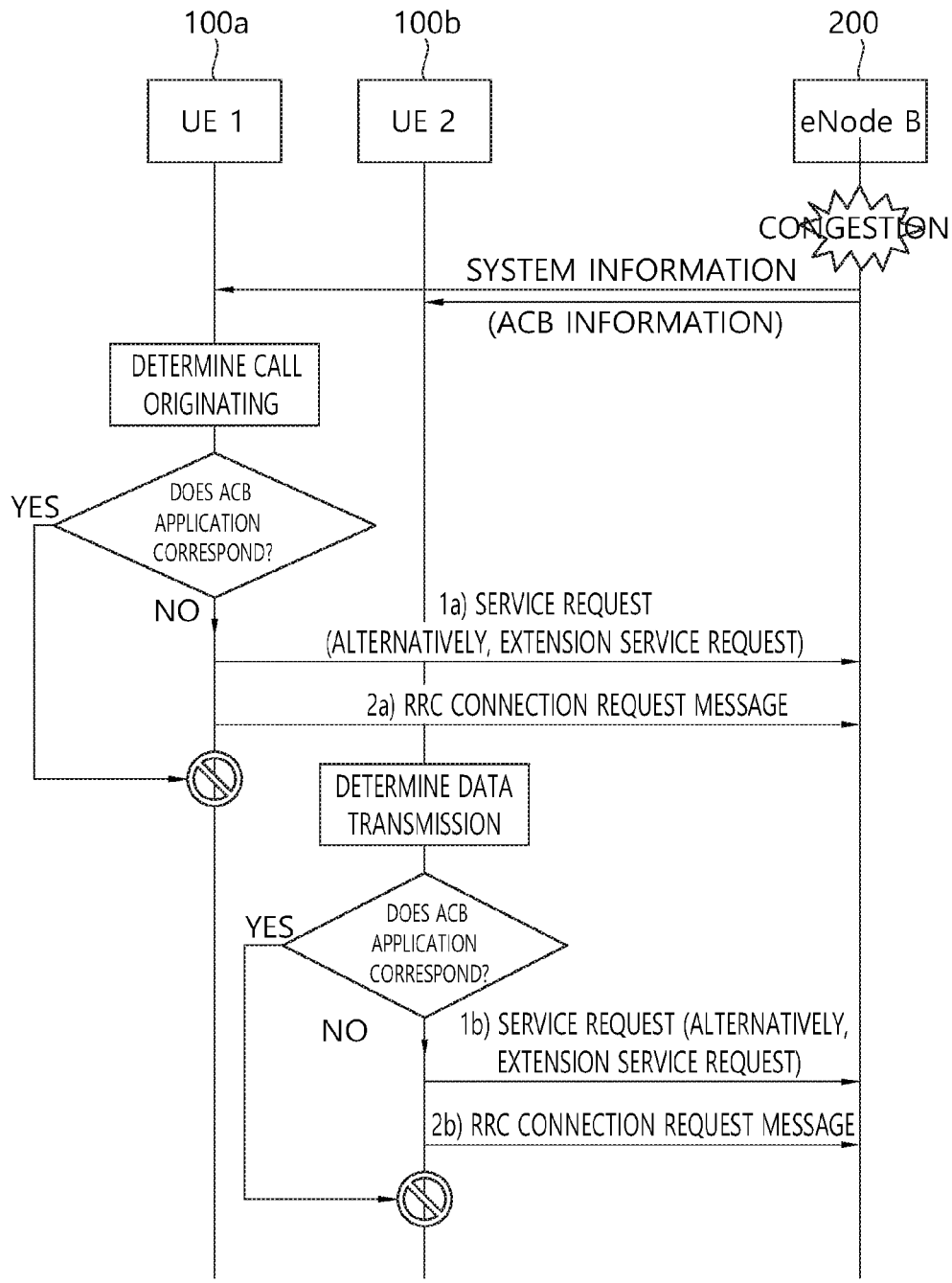
FIG. 7 is an exemplary flowchart illustrating an access barring operation in a network congested state.

FIG. 7 is an exemplary flowchart illustrating an access barring operation in a network congested state.

As illustrated in FIG. 7, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
| --- | --- |
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100a determines an IMS service, for example, mobile orienting of a call by VoLTE and generates a service request message. Similarly, UE2 100b determines mobile orienting of general data and generate the service request message.

Sequentially, the UE1 100a generates an RRC connection request message. Similarly, the UE2 100b generate the RRC connection request message.

Meanwhile, the UE1 100a performs access barring check (that is, whether the ACB is applied). Similarly, the UE2 100b performs access barring check (that is, whether the ACB is applied).

If the ACB is not applied, the UE1 100a and the UE2 100b may transmit a service request (alternatively, an extended service request) message and the RRC connection request message, respectively. However, when the ACB is applied, both the UE1 100a and the UE2 100b may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100a and the UE2 100b. Then, the UE1 100a and the UE2 100b verify whether the access barring is applied, by using a barring factor included in the received ACB-related information, based on the stored access class. The access barring check is performed in each access stratum (AS) layer, that is, an RRC layer of the UE1 100a and the UE2 100b.

The access barring check will be described in more detail as follows.

The ac-BarringPerPLMN-List is included in the SIB type 2 received by each of the UE1 100a and the UE2 100b, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100a and the UE2 100b perform the RRC connection request, the access barring check is performed by using T303 as Tbarring and using ac-BarringForMO-Data as a barring parameter.

When the barring is determined, each AS(RRC) layer of the UE1 100a and the UE2 100b notifies a failure of the RRC connection establishment to the higher layer.

Subsequently, as such, when the access is barred, each AS(RRC) layer determines whether a T302 timer or a Tbarring timer is driving. If the timer is not driving, the T302 timer or the Tbarring timer is driven.

Meanwhile, while the T302 timer or a Tbarring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, the access barring check performs general mobile originating (MO) services of the UE, for example, originating call, originating data, originating IMS voice, and originating IMS video. That is, the ACB is applied to access of all application programs (but, except for a response to an emergency service or paging).

Figure 8:
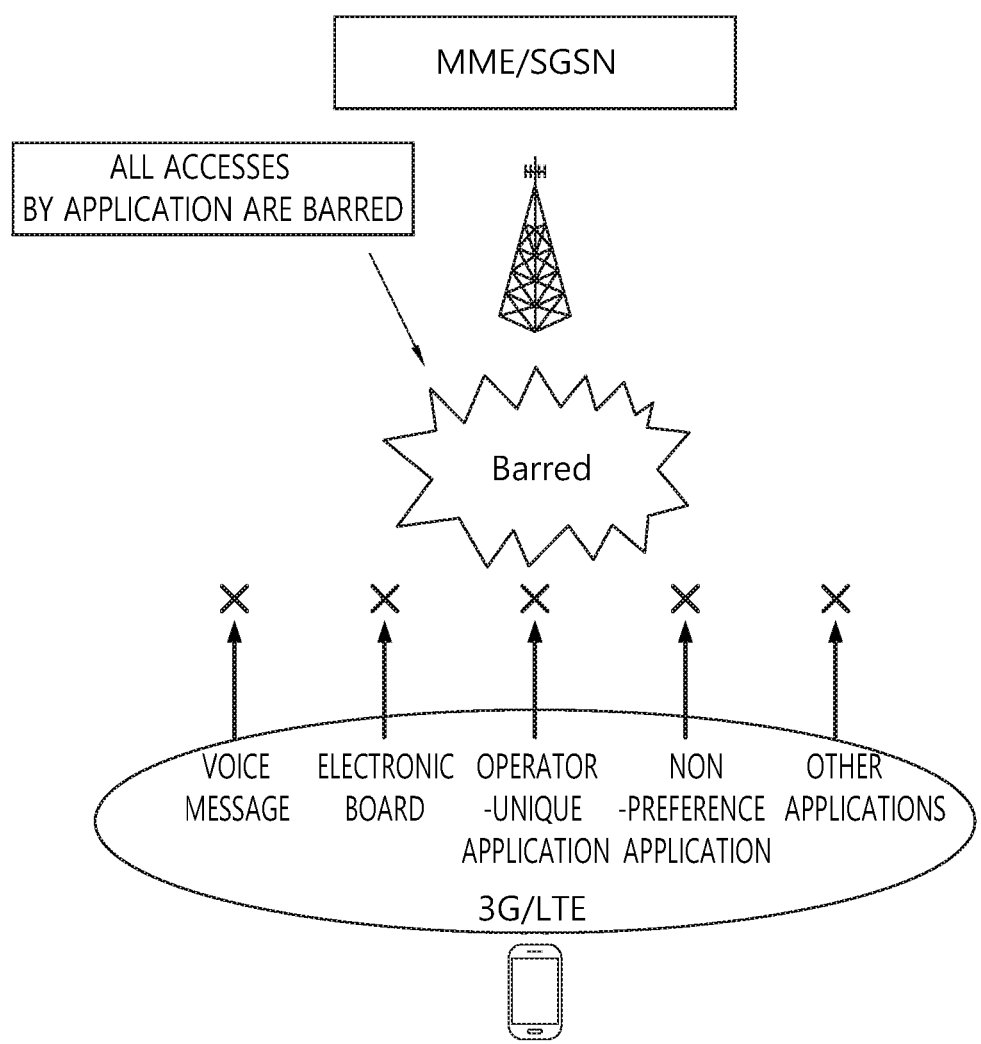
FIG. 8 illustrates an example in which an access due to all applications is barred, when ACB is applied.

FIG. 8 illustrates an example in which access due to all applications is barred, when ACB is applied.

As illustrated in FIG. 8, when it is determined that the ACB is applied, the access due to all of the applications of the UE (but, except for the response to an emergency service or paging) is fully barred.

As such, the access due to all of the applications is barred and thus, the differentiated service is impossible. The problem deteriorates network resource waste and user's experience.

Accordingly, in the network overload and congest situation, a method for differentiating an MO service for each specific application group/category (for example, originating call or originating data) is required. However, in the related art, there is no method of implementing the method.

<Disclosures of Present Invention>

Disclosures of the present invention provide a method for differentiating a general mobile originating (MO) service, for example, an originating call, originating data, an originating IMS voice, and an originating IMS video. The method is called an application specific congestion control for data communication (ACDC).

In order to differentiate a service of a specific application, the disclosures of the present invention proposes that the network (MME/SGSN/S-GW/P-GW, etc.) provides/announces application attribute related information, that is, application group/ACDC category/priority information/ID to the UE.

The network may announce to the UE the application attribute related information (that is, the application group/category/priority information/ID) through an attach procedure/TAU procedure/RAU procedure. That is, the network may announce the application attribute related information to the UE through an ATTACH acceptance message, TAU acceptance message, and an RAU acceptance message.

Alternatively, the application attribute related information may be provided to the UE through an NAS configuration management object (MO) or a new application management object (MO) (for example, an application specific access control MO).

Alternatively, the application attribute related information may be preconfigured in the USIM, etc., of the UE.

The application attribute related information may have a value of an ascending order according to a priority thereof. In detail, in the case where the application attribute related information, that is, the application group/category/priority information/ID=1 (alternatively, A, binary, and/or string), the case means a highest/primary priority. A service of an application having the highest/primary priority may mean that the UE should be able to pass through the ACB with the highest priority (that is, the barring rate is low). In the case where the application attribute related information, that is, the application group/category/priority information/ID=2 (alternatively, B, other binary, and/or string), the case means a second highest/primary priority. A case of a service of an application having the second highest priority may mean that the UE should be able to pass through the ACB with the second highest priority. In the case where the application attribute related information, that is, the application group/category/priority information/ID=n (alternatively, Z, binary, and/or string), the case means a lowest priority. A case of a service of an application having the lowest priority may mean that the UE should be able to pass through the ACB with the lowest priority (that is, the barring rate is high).

On the contrary, the application attribute related information (that is, the application group/category/priority information/ID) may have a value of a descending order. In the case where the application group/category/priority information/ID=1 (alternatively, A, binary, and/or string), the case may mean the lowest priority. A case of a service of an application having the lowest priority may mean that the UE should be able to pass through the ACB with the lowest priority (that is, the barring rate is high). In the case where the application group/category/priority/application information/ID=n (or Z, binary and/or string), the case may mean the highest/primary priority, and the case of the application service may mean that the ACB needs to be passed with the highest priority (that is, the barring rate is low).

Meanwhile, the network (for example, the base station) may provide to the UE ACDC barring information (that is, information such as barring rates, a barring factor, a mean barring time, roaming information, an ACB skip configuration, and the like for each application group/category/priority information/ID) through the SIB. Herein, the ACB skip configuration may be expressed as ACB skip=On/True or ACB skip=off/false. Herein, the roaming information may mean information on whether the UE applies a function (ACDC check) to differentiate whether the barring is performed for each application group/category/priority information/ID while roaming (whether the UE applies the function or not apply the function).

On the other hand, it is assumed the UE moves from the HPLMN to the VPLMN. In this case, it is assumed that the application attribute related information (for example, ACDC category information) is provided in the HPLMN and category specific ACDC barring information is provided through the SIB in the VPLMN. Then, the UE decides a category of an application which is being executed based on the application attribute related information in the HPLMN and performs the ACDC barring check based on ACDC barring information which matches the decided category among the category specific ACDC barring information provided in the VPLMN. In this case, when information is present, which does not match between the application attribute related information provided in the HPLMN and the ACDC barring information provided in the VPLMN (for example, when according to the application attribute related information provided in the HPLMN, for example, the ACDC category is present, but according to the ACDC barring information provided in the VPLMN, the ACDC category is not present), the ACDC barring check may be performed based on barring information corresponding to a lowest category (that is, a most restrictive access control) provided in the VPLMN. As another example, according to the information provided from the HPLMN or the VPLMN, when there is no ACDC category which does not match a specific application which is being executed (that is, the specific application is not categorized), the NAS layer recognizes that the specific application is not categorized and indication information indicating a (special) ACDC category (for example, ACDC category "0" or "99") or the application which is not categorized is provided to the AS layer (that is, the RRC layer). Based thereon, the ACDC barring check is performed based on the ACDC barring information corresponding to the lowest ACDC category (that is, the most restrictive access control) provided from the network (that is, an access control for RRC connection establishment for a service request or a TAU/RAU request is performed).

Moreover, multiple applications (including the application which is not categorized) is executed in the application layer, and as a result, multiple App-IDs are provided to the NAS layer, but when ACDC categories which match the App-ID are different from each other or when there is no category which App-IDs of some applications match, the NAS layer may provide only one ACDC category (that is, a highest ACDC category) to the AS layer (that is, the RRC layer). Alternatively, the NAS layer may provide an indication (an uncategorized indication) indicating a plurality of ACDC categories+(special) ACDC category or that the application is not categorized to the AS layer (that is, the RRC layer). Then, the AS layer (that is, the RRC layer) finally decides one ACDC category (for example, the highest ACDC category) to finally perform the ACDC barring check for the RRC connection establishment for the service request or TAU/RAU request based on the category specific ACDC barring information (for example, the barring factor and the barring time) provided fro the network together with the information.

I. Proposal 1—Group Based ACDC Barring Check Skip

According to Proposal 1 of the present invention, the AS layer (RRC) of the UE may receive the ACDC barring information (that is, the information such as barring rates, a barring factor, a mean barring time, roaming information, an ACB skip configuration, and the like for each application group/category/priority information/ID) provided form the network.

The AS layer (RRC) of the UE may announce the ACDC barring information to the application layer, the IMS layer, or the NAS layer.

When the access barring check is performed in the AS layer (that is, the RRC layer) of the UE, the access barring check may be skipped (that is, a skip of the ACDC check) for each application group/category/priority information/ID based on the ACB skip configuration information provided by the network (for example, the base station).

I-1. Proposal 1-1 of the Present Invention (Proposal 3-1 in Provisional Application)

Hereinafter, this will be described with reference to FIGS. 9 and 10.

Figure 9B:
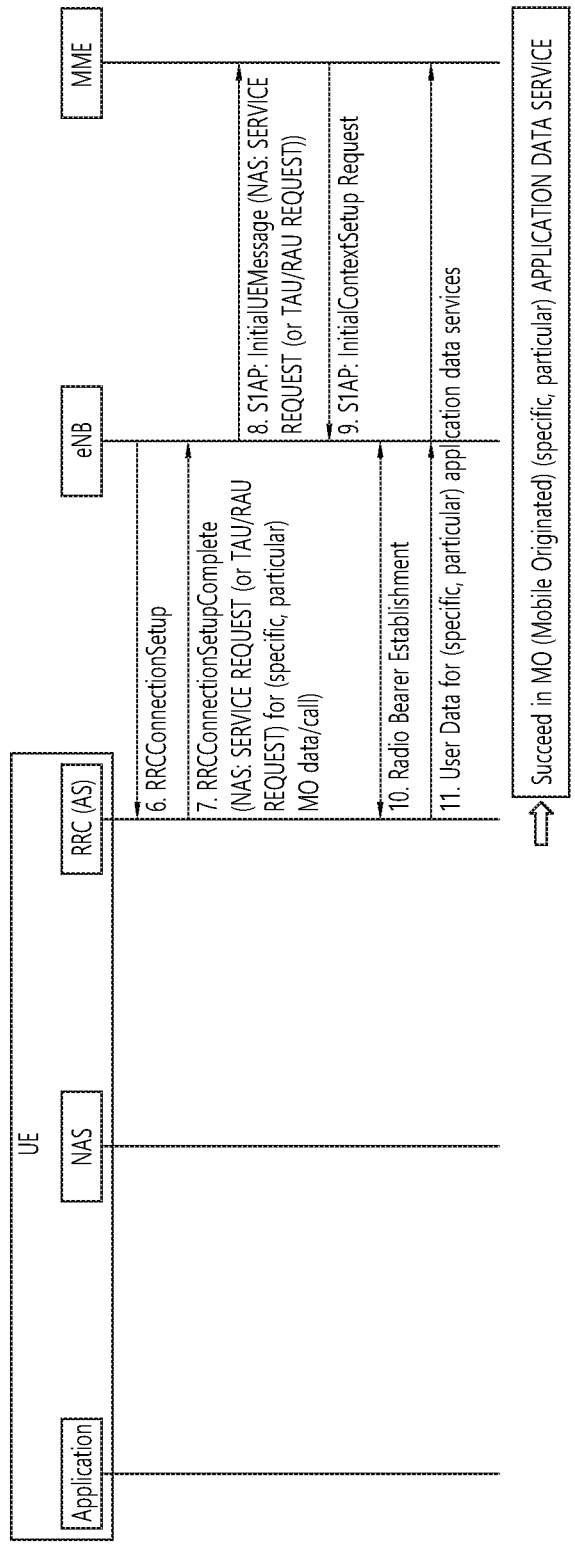
Figure 10A:
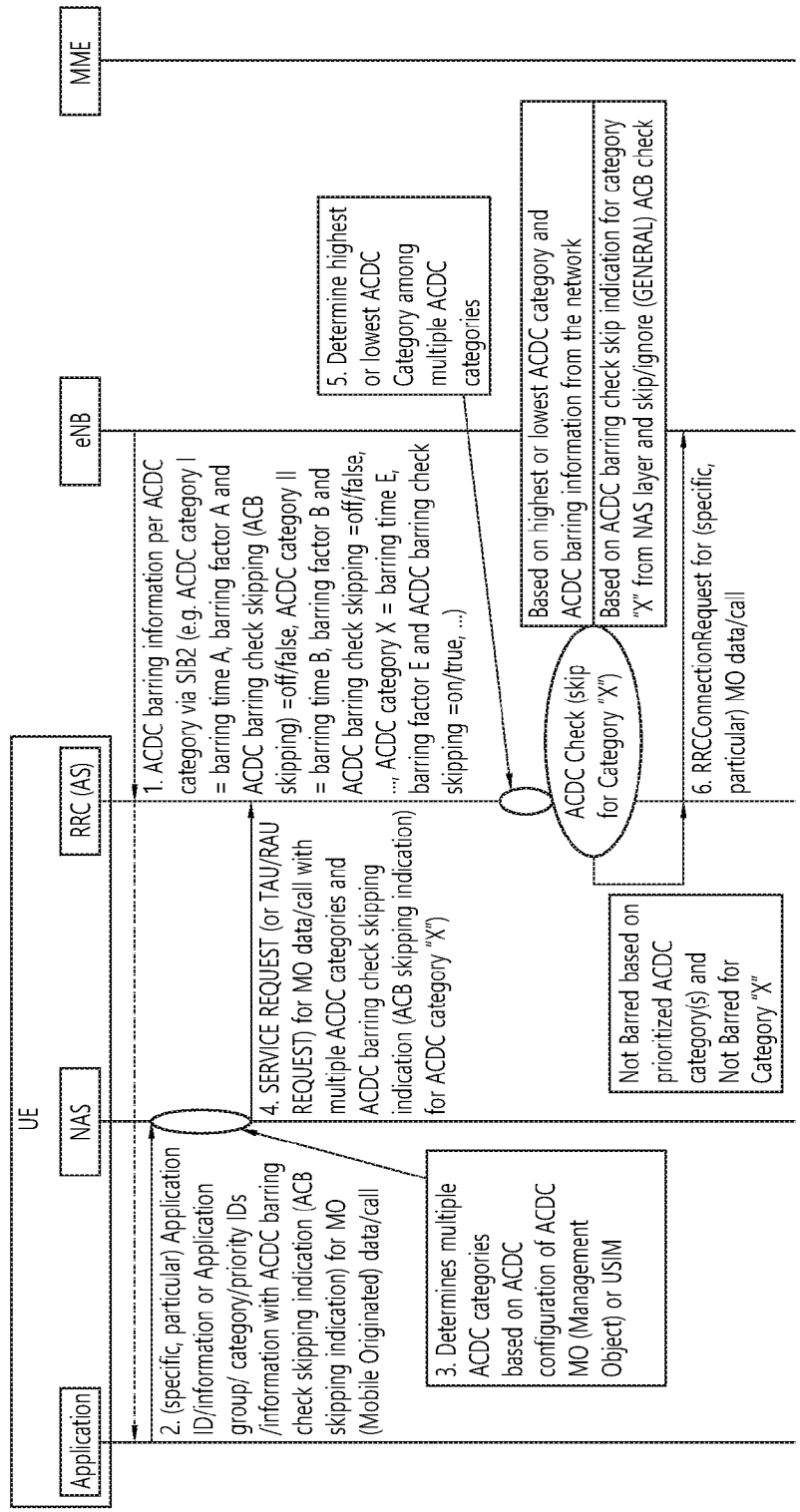
Figure 10B:
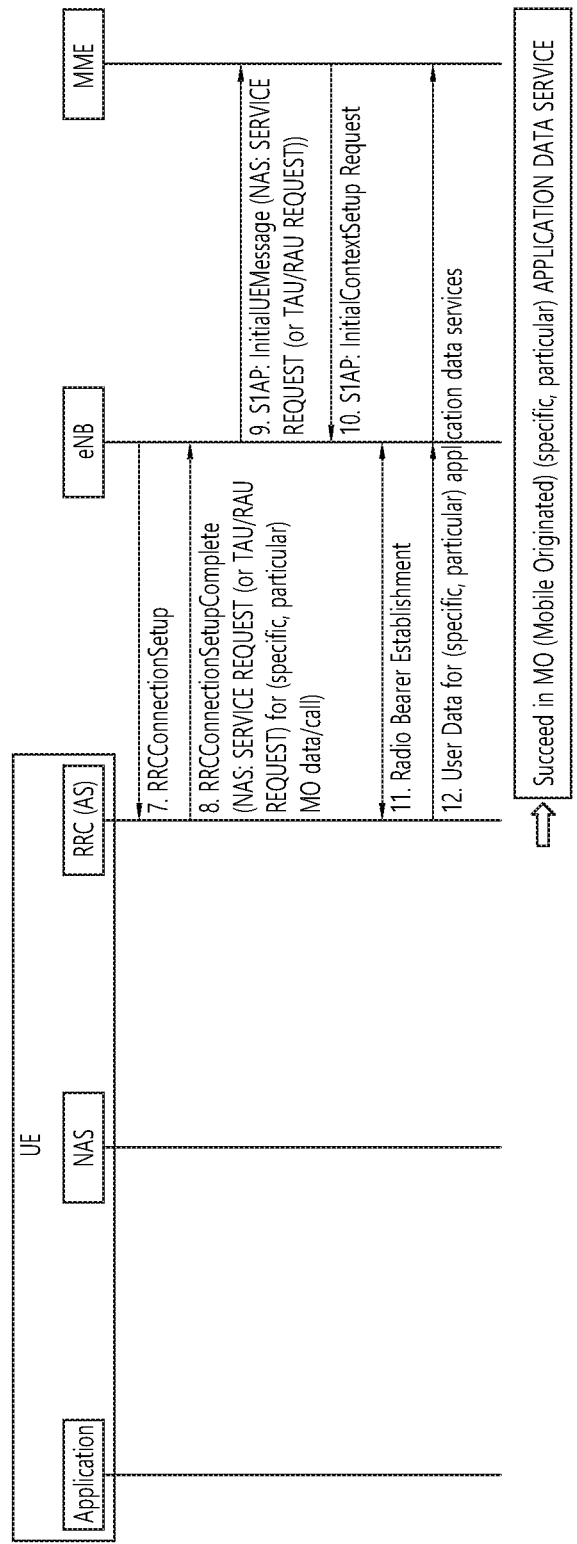

FIGS. 9a to 9b are signal flowcharts illustrating proposal 1-1a of the present invention. FIGS. 10a to 10b are signal flowcharts illustrating proposal 1-1b of the present invention.

(Step 1) The network (for example, the base station) provides to the UE ACDC barring information (that is, the information such as the barring rates, the barring factor, the mean barring time, the roaming information, the ACB skip configuration, and the like for each application group/category/priority information/ID) through the SIB.

The AS layer (that is, the RRC layer) of the UE receives the ACDC barring information from the network and the ACDC barring information may be provided to the application layer (alternatively, the NAS layer) and when the application layer starts a data communication service, the ACDC barring information may be provided by requesting information providing to the AS layer (that is, the RRC layer).

(Step 2) Meanwhile, the specific application is executed in the UE and when the data communication service is requested by the specific application, the application layer that controls the execution of the specific application provides the application attribute related information to the NAS layer. In this case, the application attribute related information may be configured/defined by the UE in advance. Alternatively, the AS layer (that is, the RRC layer) may receive the application attribute related information from the network and provide the application attribute related information to the application layer and when the application layer starts the data communication service, the application layer may receive the application attribute related information by requesting information providing to the AS layer (that is, the RRC layer).

Meanwhile, when the access class barring (ACB) skip configuration is set for each application attribute related information provided from the AS layer (that is, the RRC layer) of the UE, ACB skip start/setting indication information may be provided to the NAS layer (alternatively, the RRC layer) together with or apart from the application attribute related information. Herein, the ACB skip configuration may be expressed as ACB skip=On/True or ACB skip=off/false.

Alternatively, when the access class barring (ACB) skip configuration is not set for each application attribute related information provided from the AS layer (that is, the RRC layer) of the UE, ACB skip stop/reset indication information may be provided to the NAS layer (alternatively, the RRC layer) together with or apart from the application attribute related information.

(Step 3) the NAS layer transfers to the AS layer (alternatively, the RRC layer) the application attribute related information and the ACB skip related indication (for example, the ACB skip start/setting indication information or the ACB skip stop/reset indication) received from the application layer together when a service request procedure (that is, transmission and reception of a SERVICE REQUEST message or an EXTENDED SERVICE REQUEST message) or a tracking area updating (TAU) procedure (that is, transmission and reception of a TRACKING AREA UPDATE REQUEST message) for a service connection by the application starts. When the NAS layer receives the ACB skip start/setting indication information from the application layer, the NAS layer transfers the application attribute related information and the ACB skip related indication to the AS layer (alternatively, the RRC layer) when the service request procedure or the tracking area updating (TAU)/RAU procedure for the service connection by the application starts. However, When the NAS layer receives the ACB skip stop/reset indication information from the application layer, the NAS layer does not transfer the ACB skip related indication to the AS layer (alternatively, the RRC layer) when the service request procedure or the tracking area updating (TAU)/RAU procedure for the service connection by the application starts.

When the application attribute related information and the ACB skip related indication received from the application layer are simultaneously multiple or when the application attribute related information is changed (differently from the previous case) during an NAS recovery procedure, i) only the highest or lowest application-related attribute information is provided to the AS layer (that is, the RRC layer), or ii) all of the multiple application-related attribute information (the previous information and the changed information) may be provided to the AS layer (that is, the RRC layer).

The schemes i) and ii) are recognized and determined by the NAS layer, and in this case, either of the schemes i) and ii) may be implemented and operated by network configuration/policy, UE capability, and the like.

Alternatively, when the NAS layer receives the ACB skip stop/reset indication information from the application layer, the NAS layer may transfer only the application-related attribute information to the AS layer (alternatively, the RRC layer) and not transfer the ACB skip related indication (alternatively, the ACDC barring skip indication) when the service request procedure or the tracking area updating (TAU)/RAU procedure for the service connection by the application starts.

Alternatively, when the NAS layer receives the ACB skip stop/reset indication information from the application layer, the NAS layer may transfer the application attribute related information and the ACB skip related indication based on the application attribute related information to the AS layer (alternatively, the RRC layer) when the service request procedure or the tracking area updating (TAU)/RAU procedure for the service connection by the application starts.

When the NAS layer receives the ACB skip start/setting indication information from the application layer, if the ACB is applied and the UE is thus barred from accessing at present, the NAS layer ignores the barring state and starts/performs the service request procedure or the tracking area updating (TAU)/RAU procedure for the service connection by the application. When the service request procedure or the tracking area updating (TAU)/RAU procedure starts, the NAS layer transfers the application attribute related information and the ACB skip related indication based on the application attribute related information to the AS layer (that is, the RRC layer).

When the NAS layer receives the ACB skip stop/reset indication information from the application layer, if the ACB is applied and the UE is thus barred from accessing at present, the NAS layer thereafter may maintain the barring state without starting/performing the service request procedure or the tracking area updating (TAU)/RAU procedure for the service connection by the application.

(Step 4) When the AS layer (that is, the RRC layer) receives the application attribute related information (alternatively, the application attribute related information+the ACB skip related indication information) from the NAS layer, the AS layer determines permitting or not permitting a service connection (the service request procedure or the TAU/RAU procedure) access attempt by the application by using the ACDC barring information received from the network when the service request procedure or the tracking area updating (TAU)/RAU procedure for the service connection by the application of the NAS layer starts. When the AS layer receives the ACB skip related indication information from the NAS layer, the AS layer permits the service connection (the service request procedure or the TAU/RAU procedure) access attempt by the application by skipping the ACDC barring check regardless of the access barring state depending on the application of the ACB. That is, the RRC connection establishment is performed by starting/performing the service request procedure or the TAU/RAU procedure by ignoring the current access barring state. When the AS layer receives an RRC establishment factor value, a new call type, or service type (alternatively, configured by a combination) information for each application attribute related information from the NAS layer and further, when the ACB skip configuration received for each application attribute related information from the network is ACB skip off/false/reset, the ACDC barring check is applied/performed.

When multiple application-related attribute information and ACB skip-related indication are (simultaneously) provided from the NAS layer, i) whether the service connection attempt by the application is allowed or not is determined by using the ACDC barring information received from the network based on the highest or lowest application-related attribute information.

The scheme i) is determined by the AS layer (that is, the RRC layer), and in this case, either the highest or lowest information/ID scheme may be implemented and operated by network configuration/policy, UE capability, and the like.

In the present invention, when a change/variation (e.g. from ACB skipping set/true to ACB skipping reset/false (from ACB skipping to No ACB skipping) or from ACB skipping reset/false to ACB skipping set/true (from No ACB skipping to ACB skipping)) in an ACB skipping information status for each application group/category/priority/application information occurs from the network (eNB) (when the occurrence is sensed), immediately, the AS (RRC) layer may notify a change/variation in ACB skipping configuration information to the application layer or the NAS layer (or both application and NAS layers).

Thereafter, the application layer notifies the change/variation in ACDC barring information to the NAS layer or the AS layer (that is, the RRC layer). The NAS layer performs the service request procedure or the TAC/RAU procedure based on the change/variation in the ACB skip (ACDC barring check skip). The AS layer (that is, the RRC layer) may skip or not skip the final ACDC barring check for each application group/category/priority according to the change/variation in the ACB skip related indication information for each application attribute related information received fro the NAS or application layer.

When the ACDC barring information and the ACB information are simultaneously provided to the UE from the network (for example, the base station) through the SIB, the UE may skip the ACB by applying only the ACDC barring information of the present invention (performs only the ACDC check).

Or, the ACDC barring information and the ACB information is selectively applied to perform the ACB check or the ACDC check.

Alternatively, the ACDC check is first performed and when the ACDC check is passed, the AC layer (that is, the RRC layer) may perform the ACB check.

I-2. Proposal 1-2 of Present Invention (Proposal 3-2 in Provisional Application)

Figure 11A:
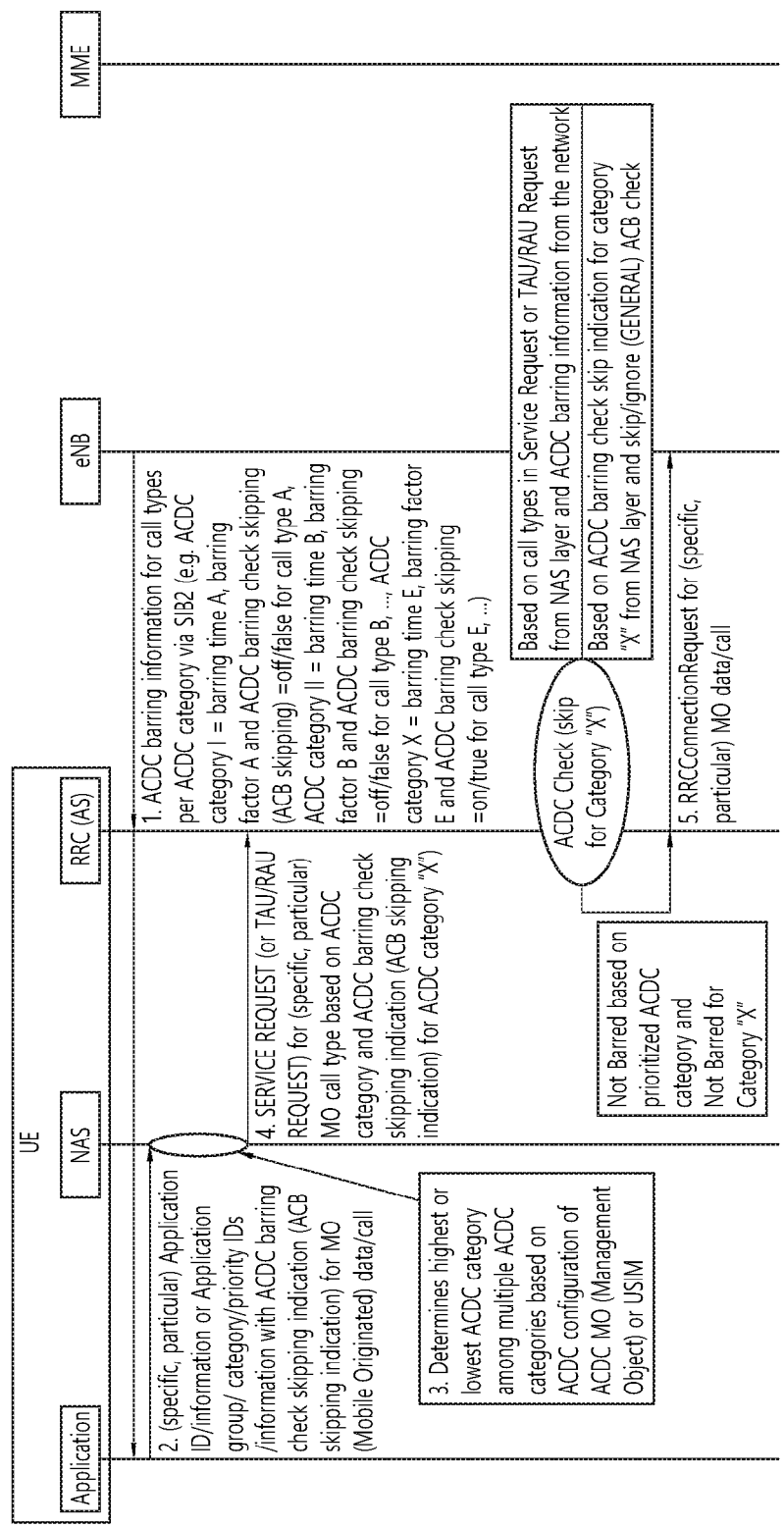
FIGS. 11a and 11b are signal flowcharts illustrating proposal 1-2a of the present invention.
Figure 11B:
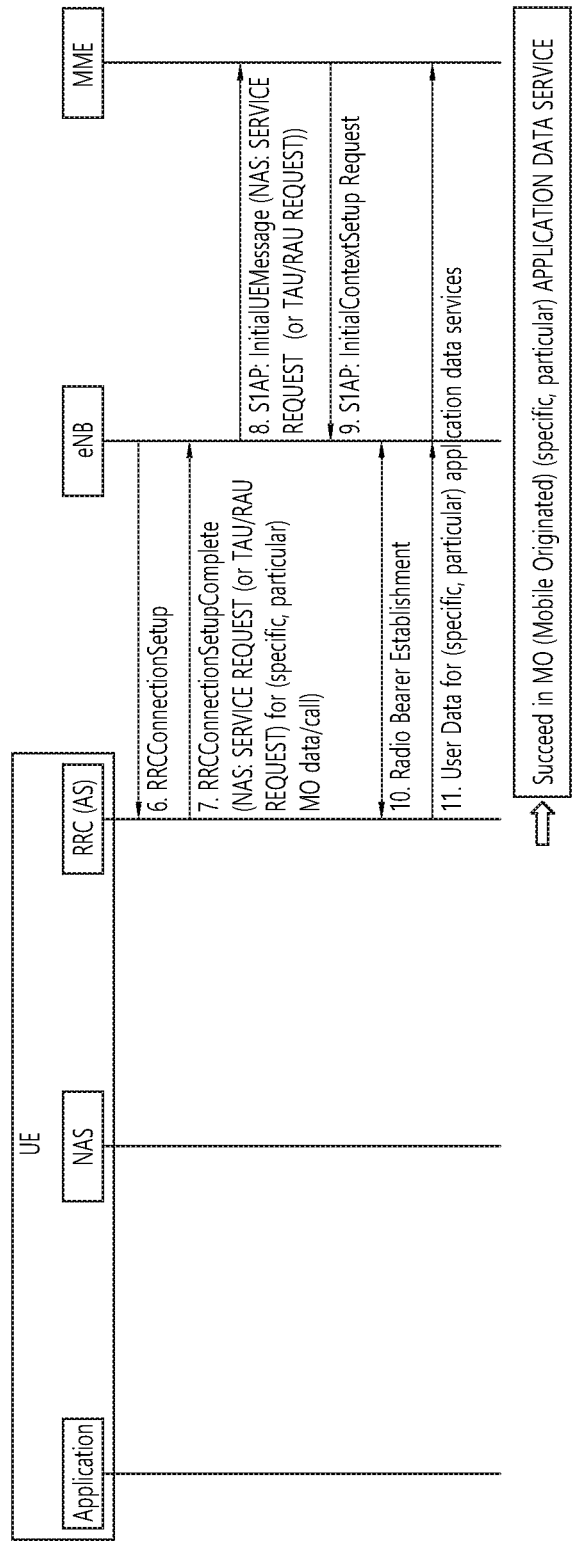

FIGS. 11a and 11b are signal flowcharts illustrating proposal 1-2a of the present invention.

The application attribute related information, the ACDC barring information, and a UE processing scheme of the information in proposal 1-2 are described similarly to proposal 1-1 described above.

(Step 1) is similar to proposal 1-1 given above.

(Step 2) is similar to proposal 1-1 given above.

(Step 3) The NAS layer transfers the application attribute related information or the application attribute related information+the ACB skip related indication received from the application layer by defining a new RRC establishment factor value, a new call type, or a service type together when the service request procedure or the TAU/RAU procedure for the service connection by the application starts. In this case, the new RRC establishment factor value, the new call type, or the service type are used independently (only alone) or may be defined and used in combination. When the NAS layer receives the ACB skip start/setting indication information from the application layer, the NAS layer transfers the ACB skip start/setting indication information to the AS layer (alternatively, the RRC layer) together when the service request procedure or the tracking area updating (TAU)/RAU procedure for the service connection by the application starts. When the NAS layer receives the ACB skip stop/reset indication information from the application layer, the NAS layer thereafter starts/performs the general service request procedure or TAU/RAU procedure for the service connection by the application. That is, the NAS layer performs the general service request procedure or TAU/RAU procedure to which the new RRC establishment factor value, the new call type, or the service type is not applied.

When the application attribute related information and the ACB skip related indication received from the application layer are simultaneously multiple or when the application attribute related information is changed (differently from the previous case) during the NAS recovery procedure, i) the new RRC establishment factor value, the new call type, or the service type is defined (for each application attribute related information) when a service request procedure (alternatively, a TAU/RAU procedure) starts on the basis of the highest or lowest application-related attribute information to transfer the defined new RRC establishment factor value, new call type, or service type to the AS layer (that is the RRC layer). In this case, the new RRC establishment factor value, the new call type, or the service type are used independently (only alone) or may be defined and used in combination.

The scheme i) is recognized and determined by the NAS layer, and in this case, either the highest or lowest information/ID scheme may be implemented and operated by network configuration/policy, UE capability, and the like.

(Step 4) is similar to proposal 1-1 given above.

I-3. Proposal 1-3 of Present Invention (Proposal 3-3 in Provisional Application)

Figure 12A:
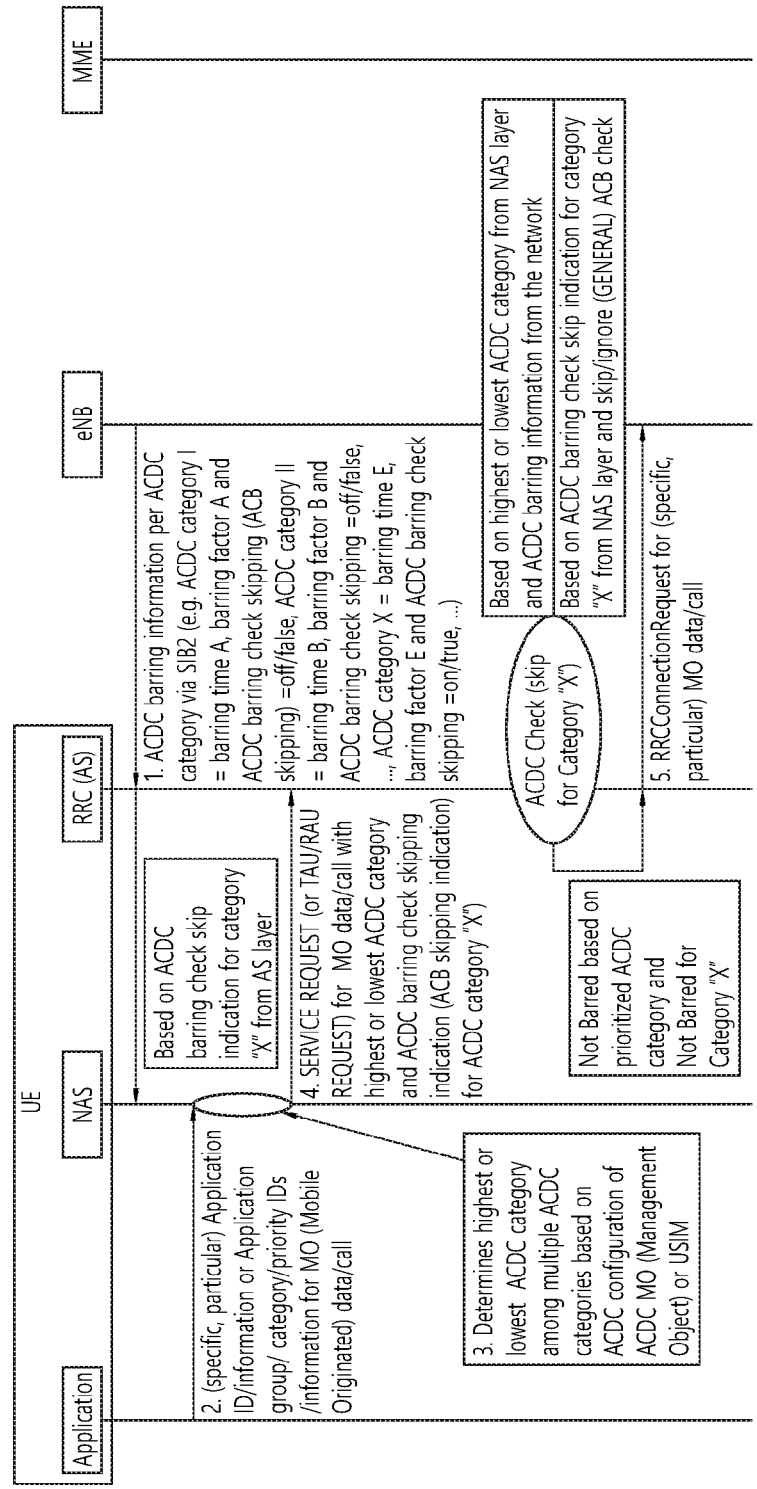
FIGS. 12a to 12b are signal flowcharts illustrating proposal 1-3a of the present invention and FIGS. 13a and 13b are signal flowcharts illustrating proposal 1-3b of the present invention.
Figure 12B:
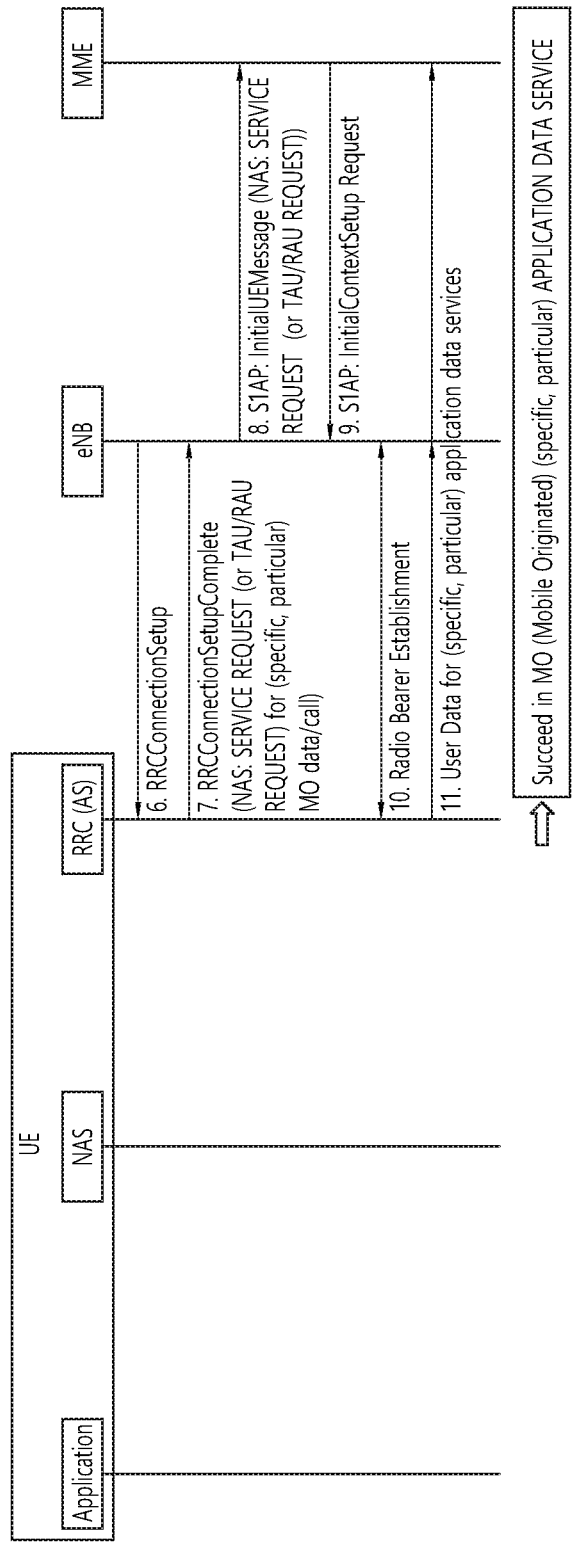
Figure 13A:
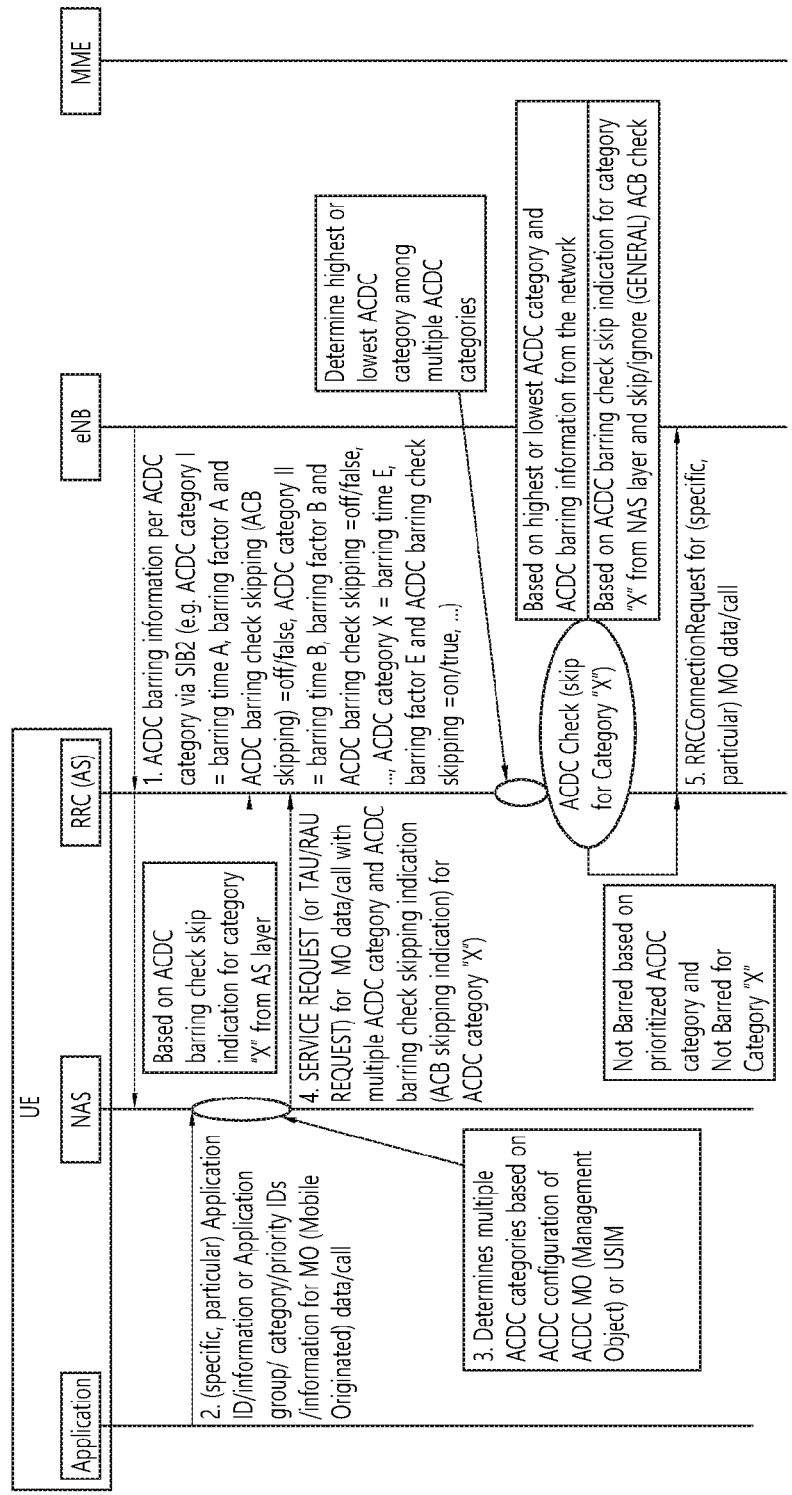
Figure 13B:
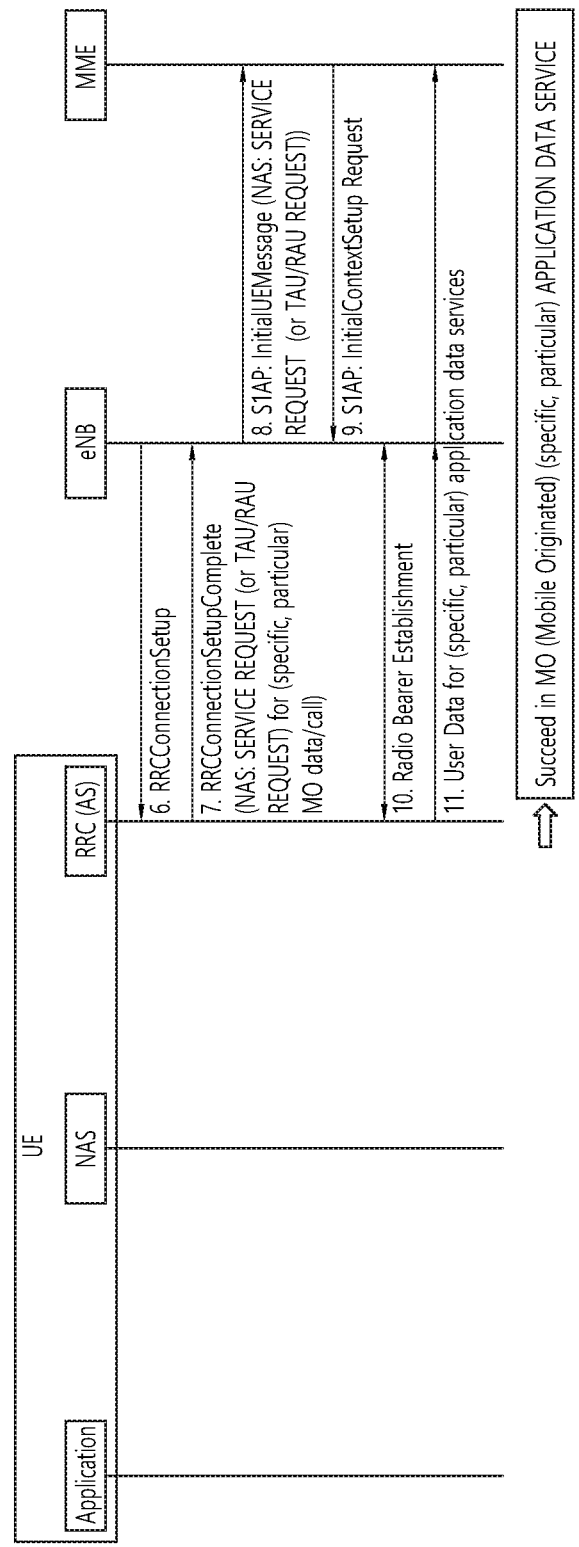
Figure 14A:
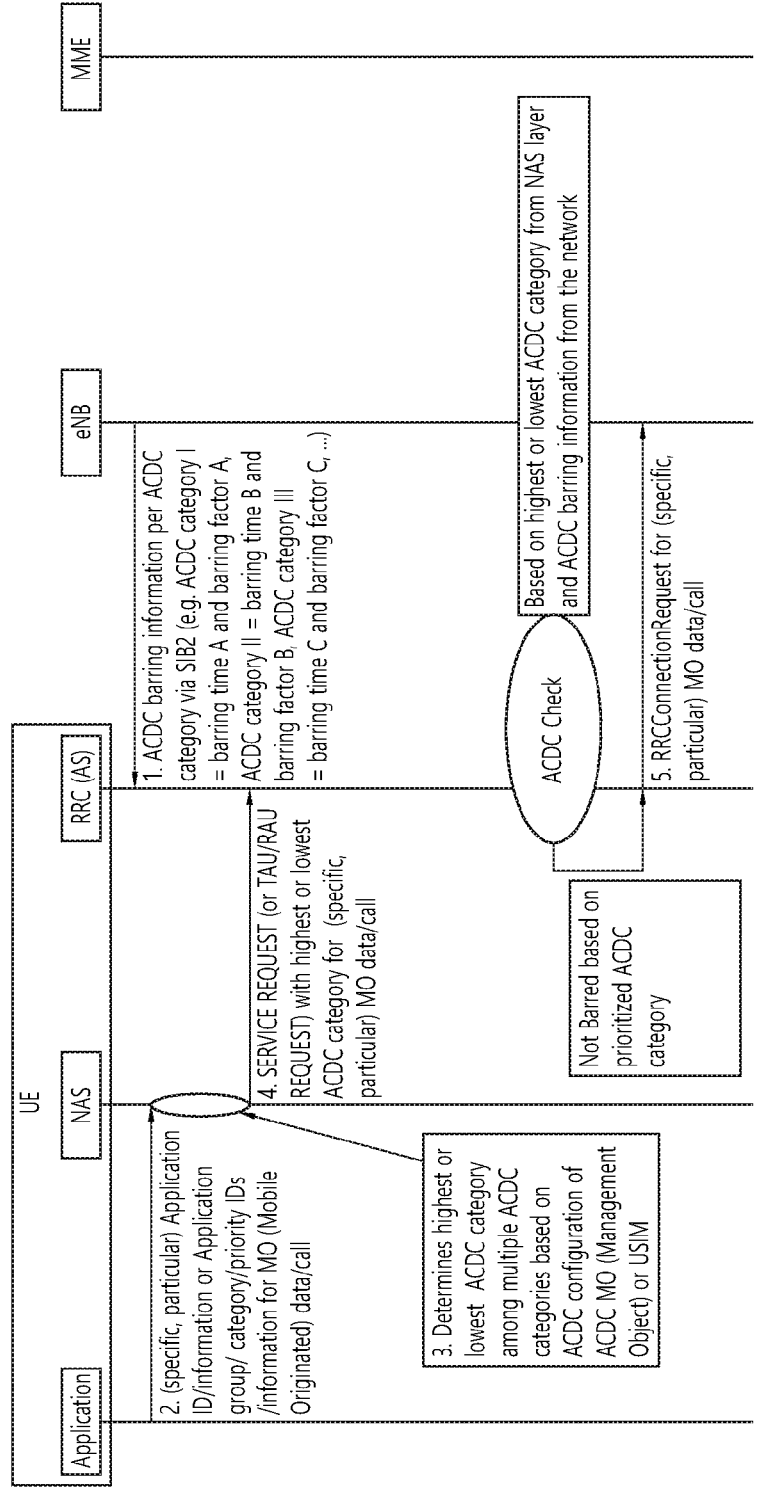
FIGS. 14a to 18b are signal flowcharts illustrating proposal 3 of the present invention.
Figure 14B:
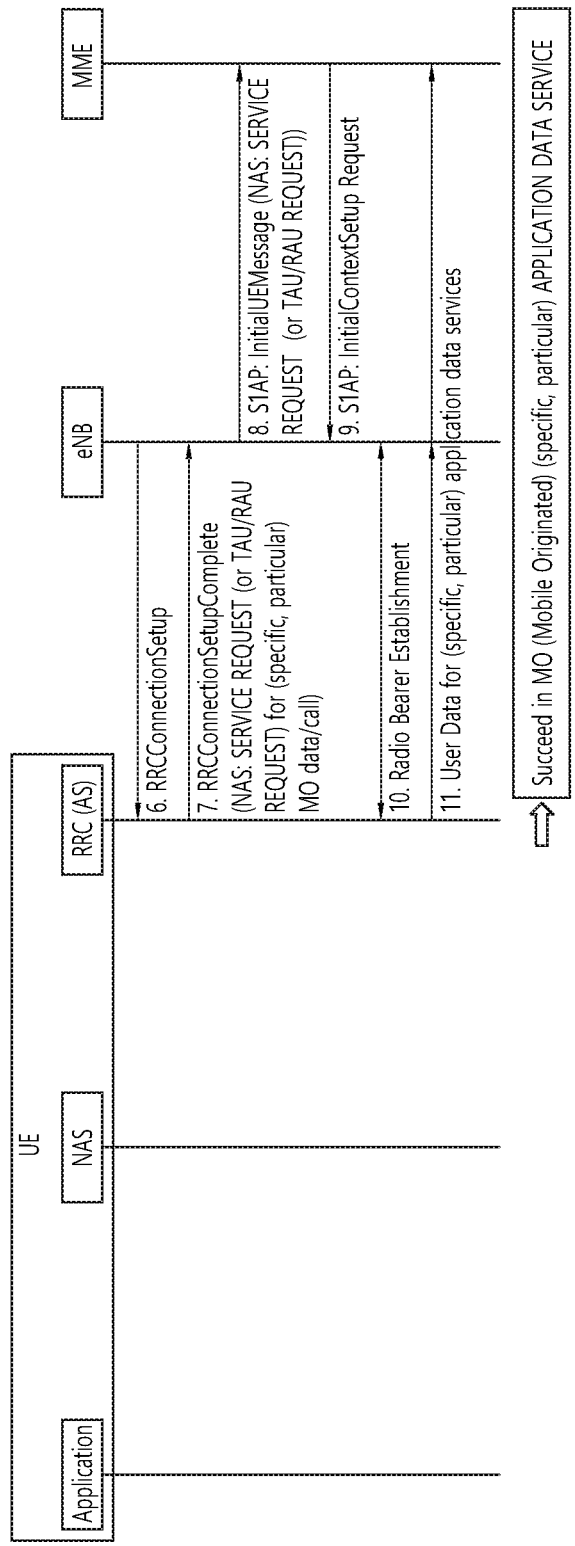
Figure 15A:
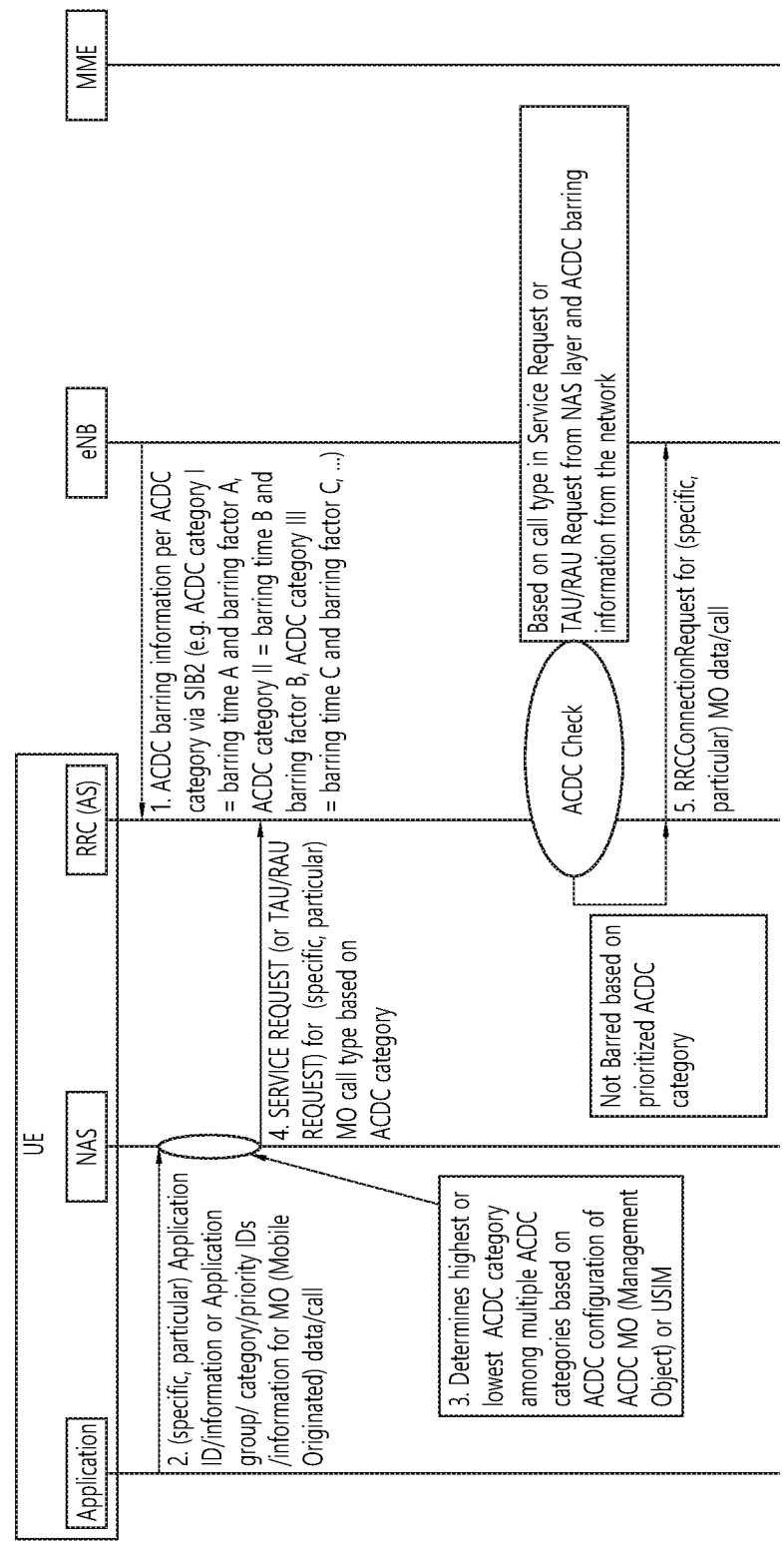
Figure 15B:
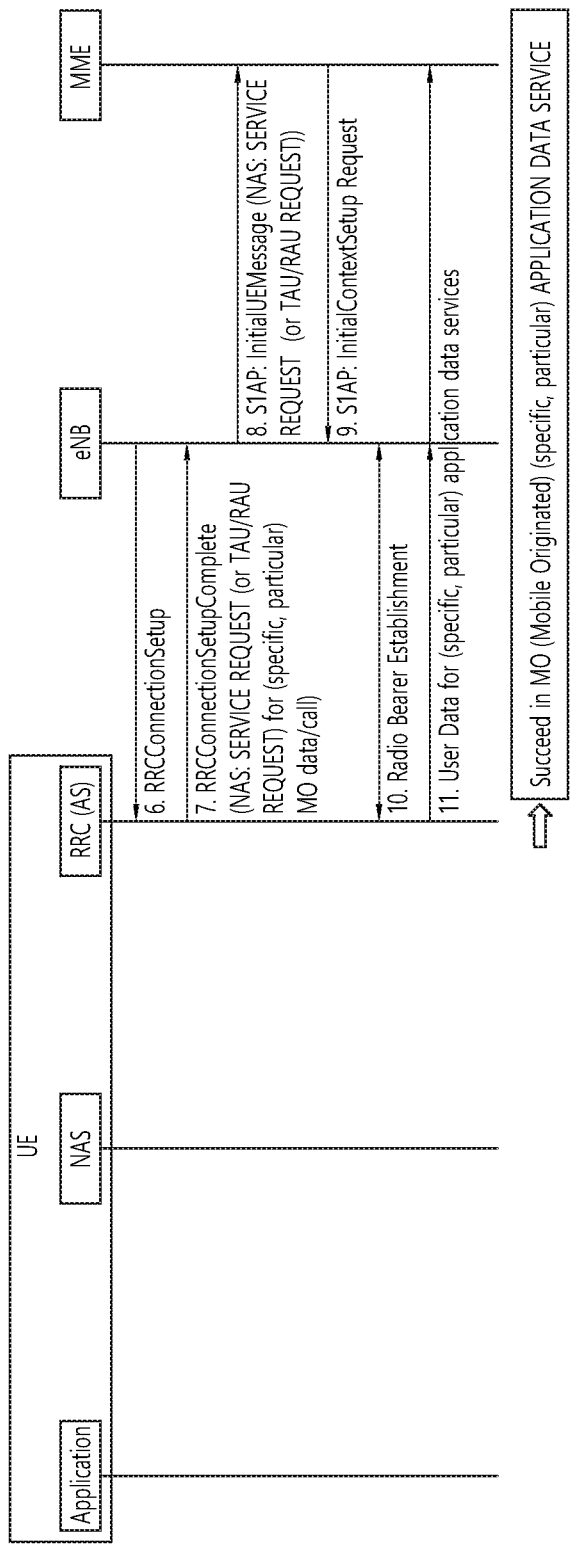
Figure 16A:
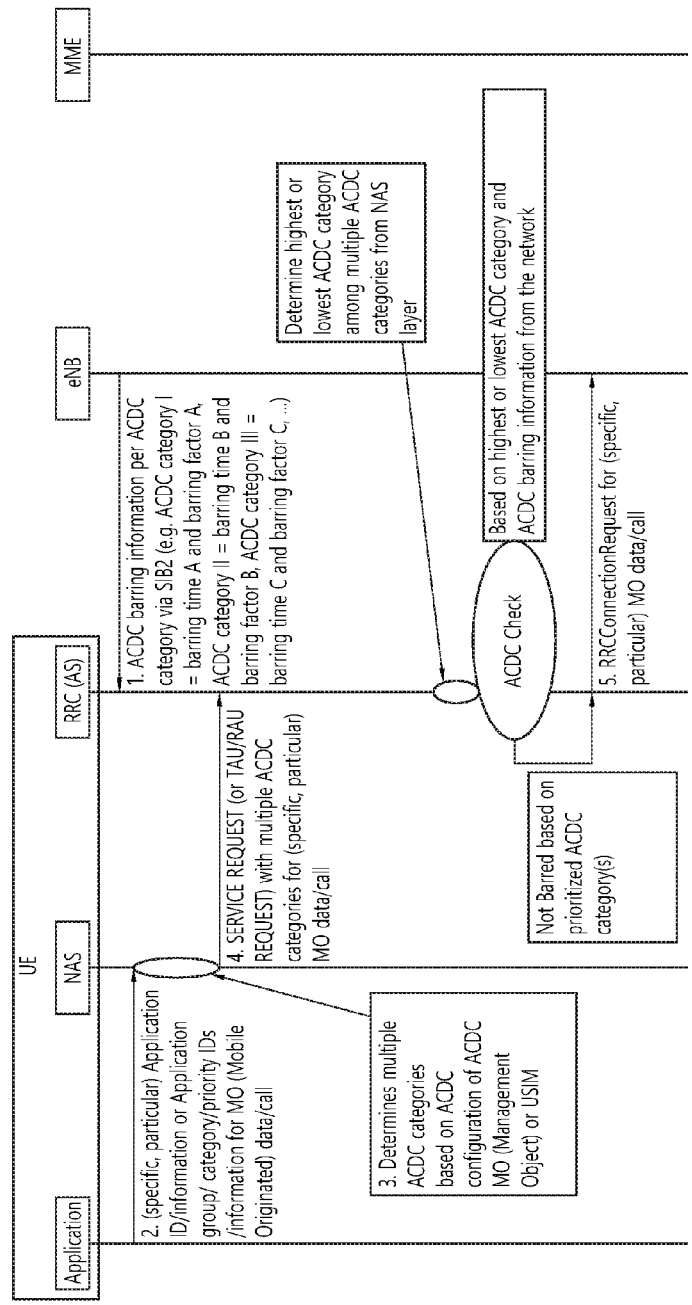
Figure 16B:
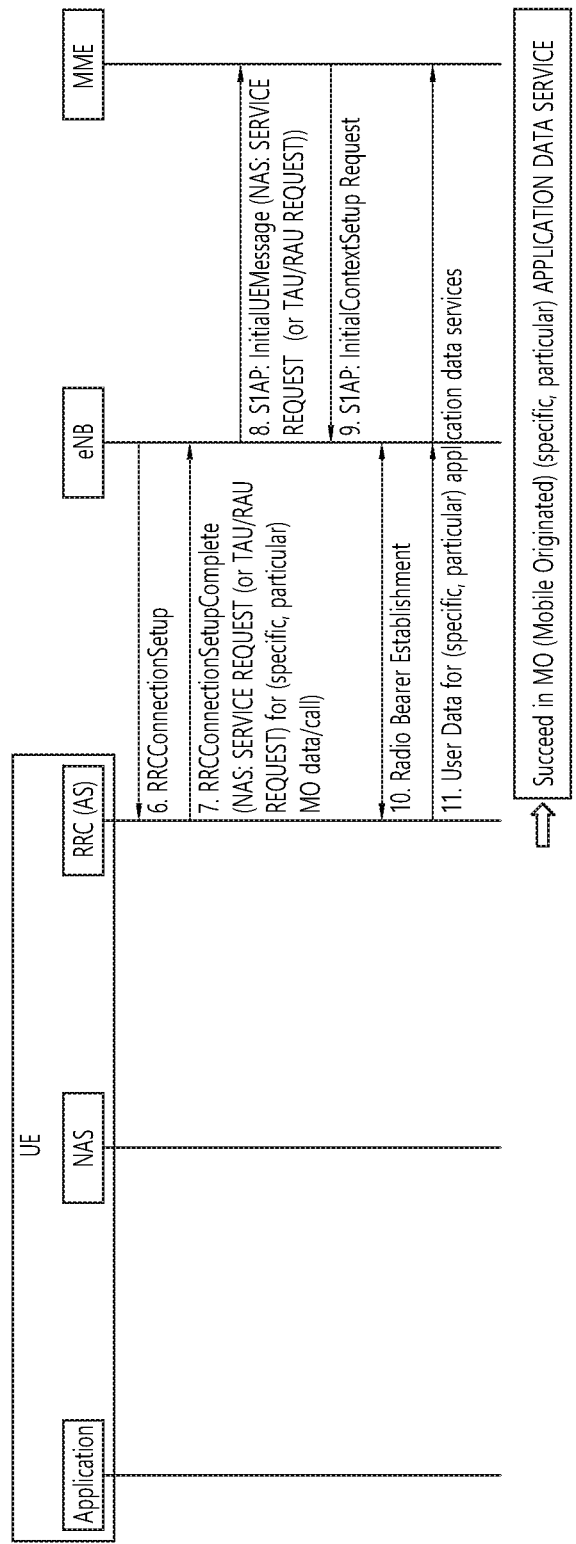
Figure 17A:
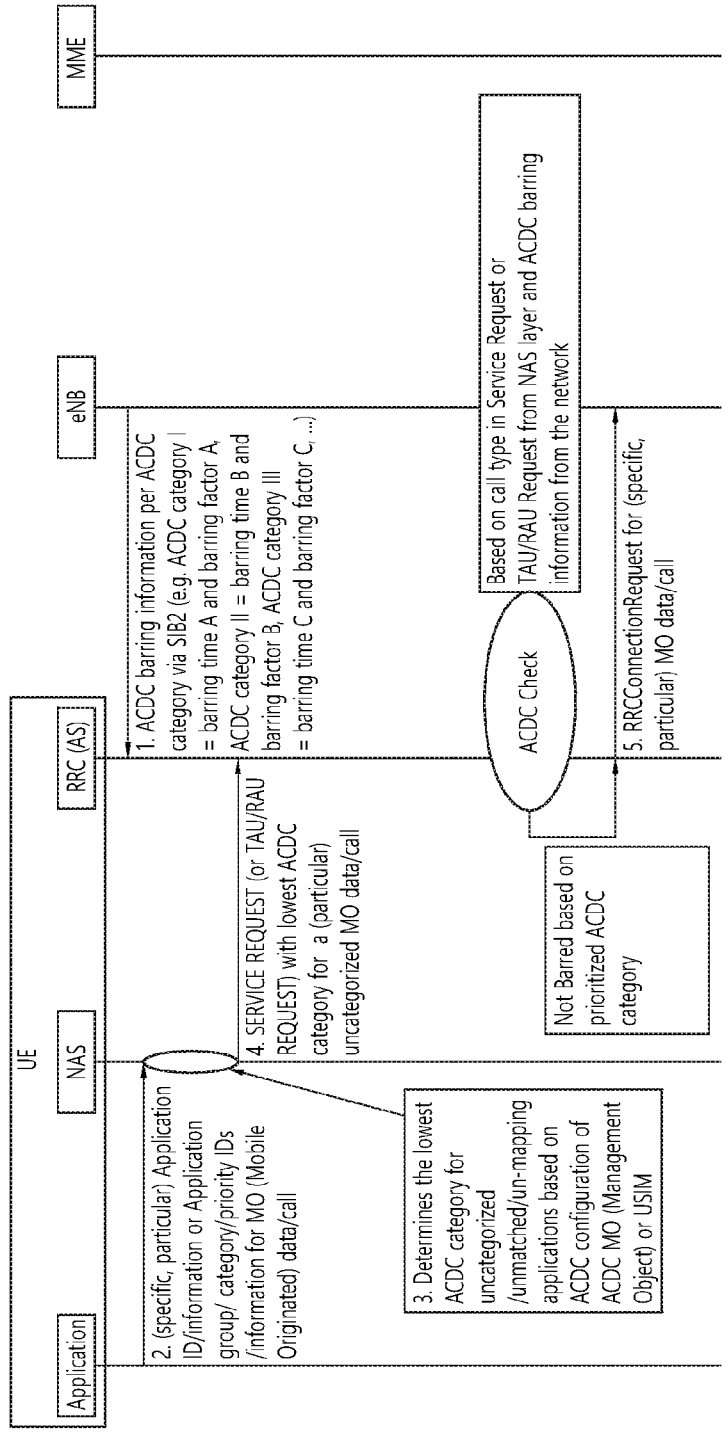
Figure 17B:
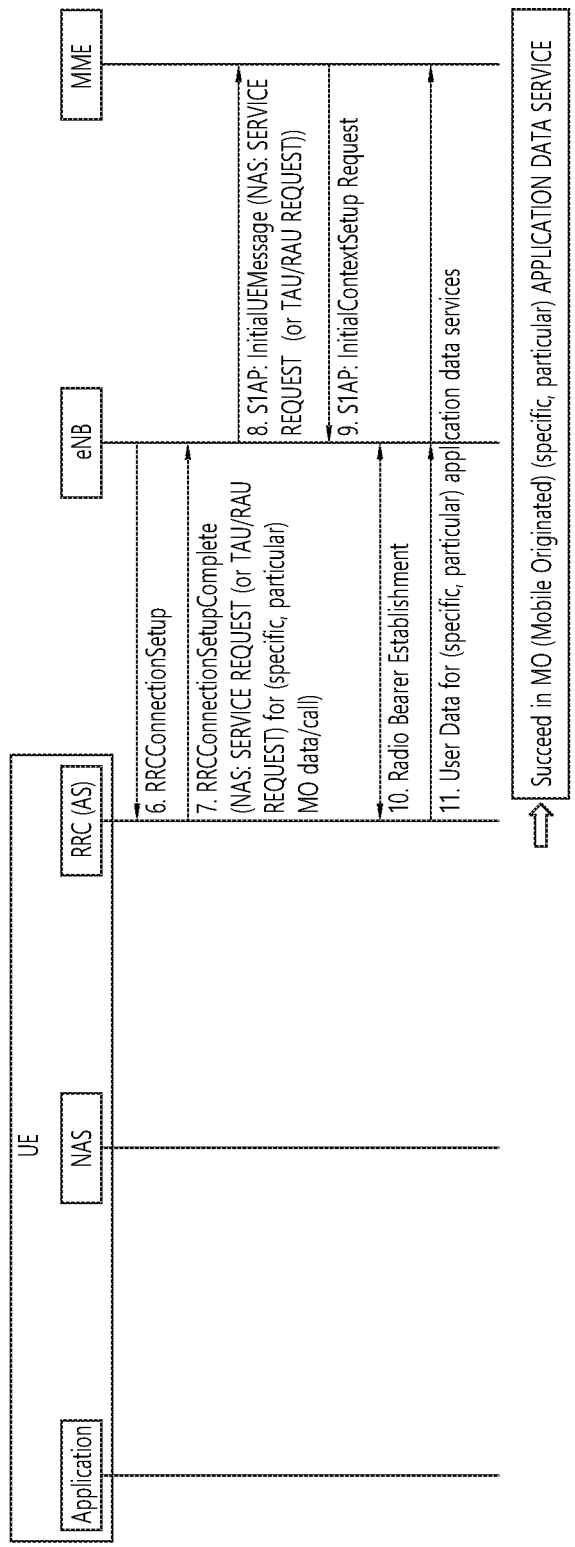
Figure 18A:
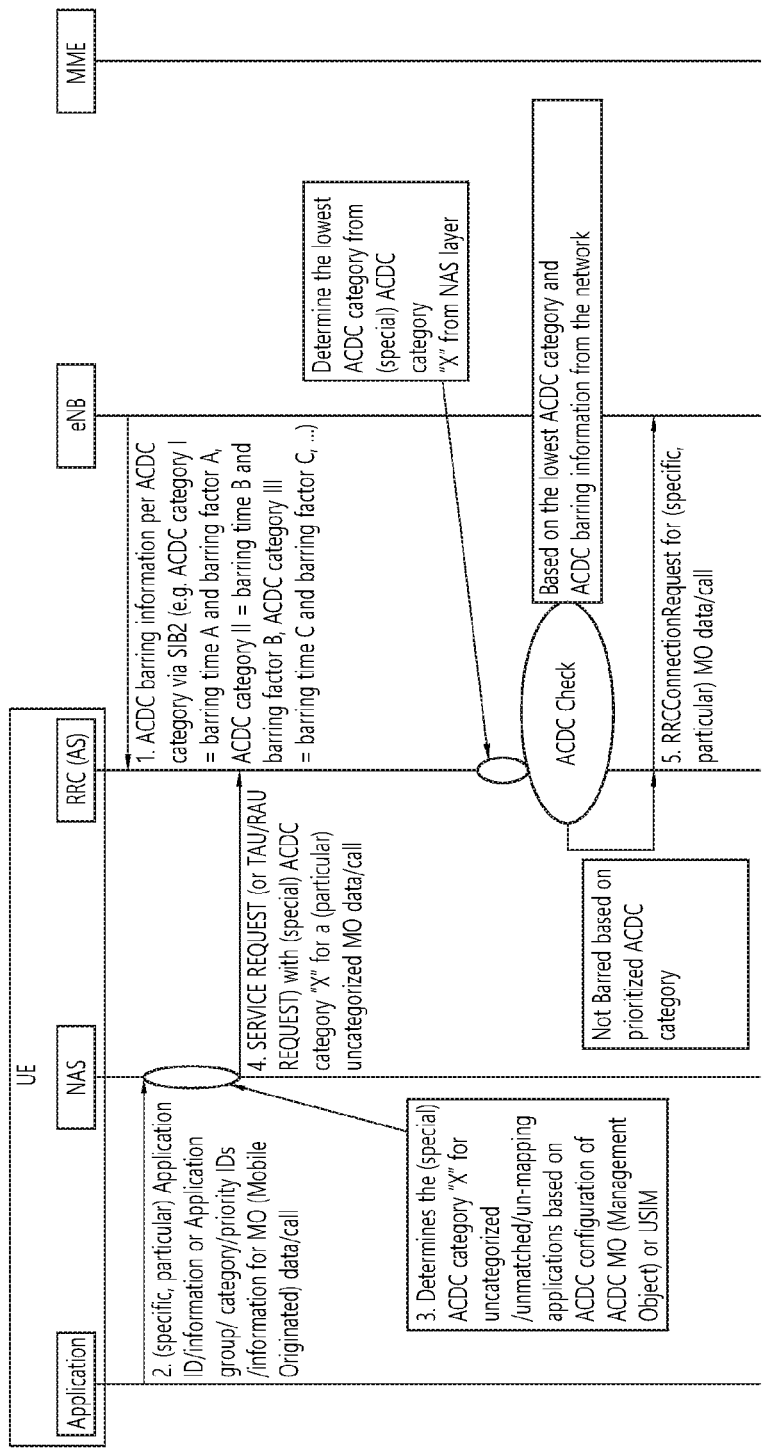
Figure 18B:
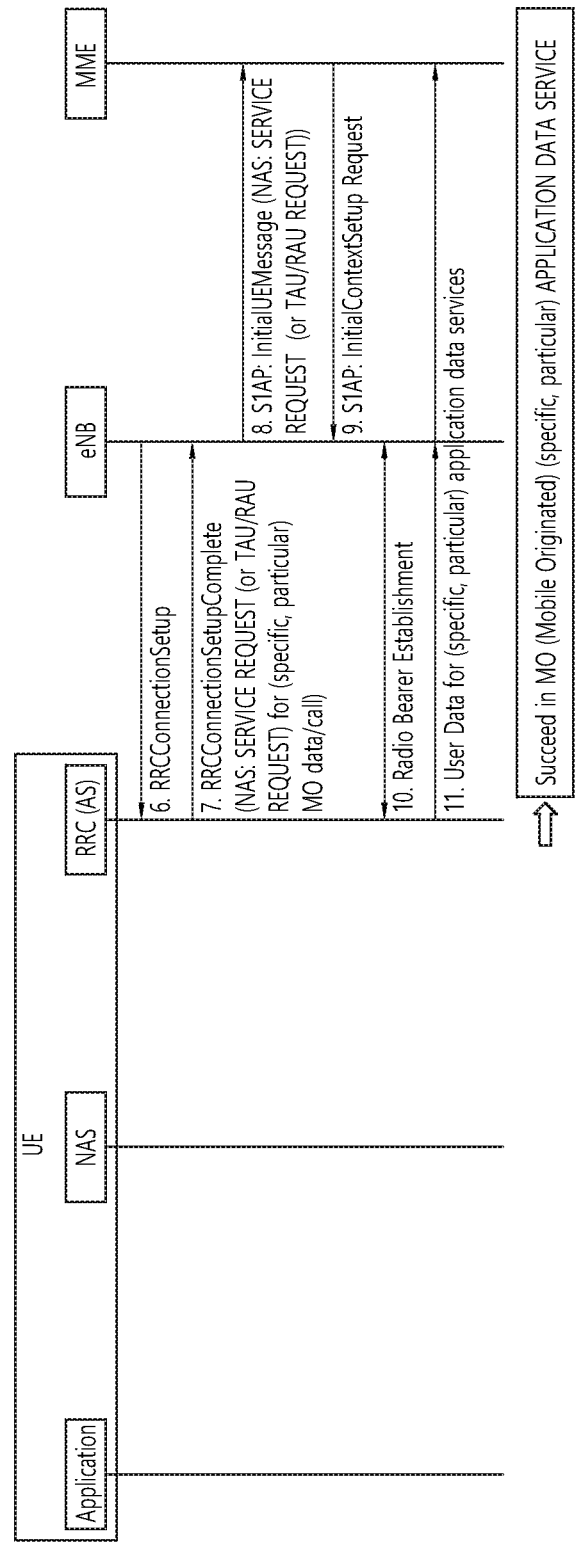
Figure 19A:
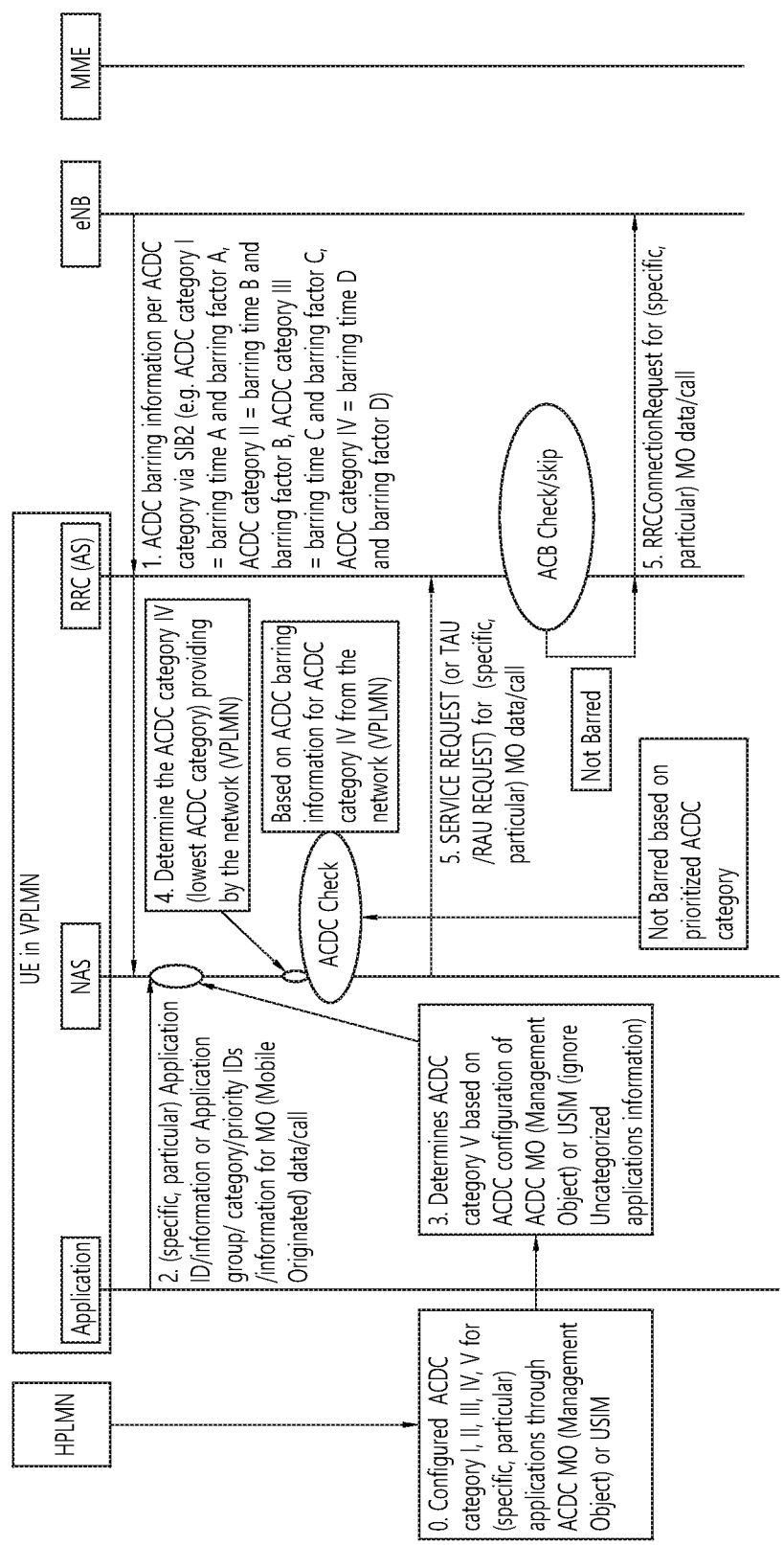
FIGS. 19a to 20b are signal flowcharts illustrating proposal 4-1 of the present invention.
Figure 19B:
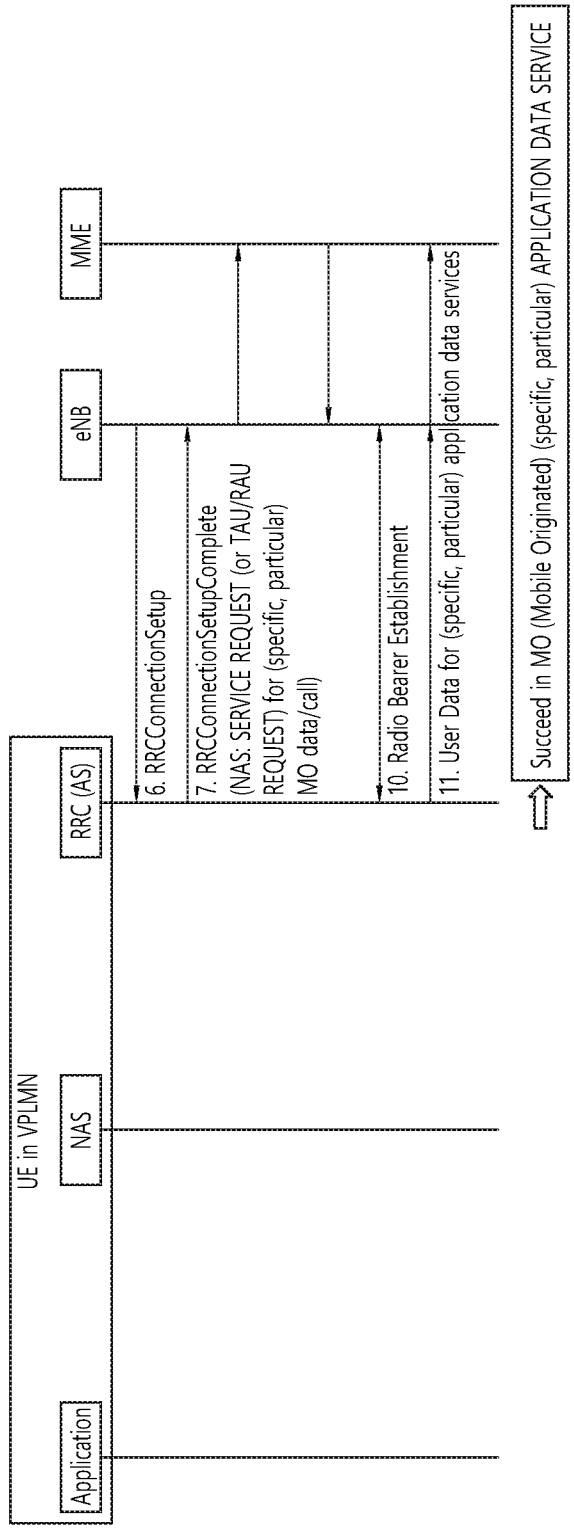
Figure 20A:
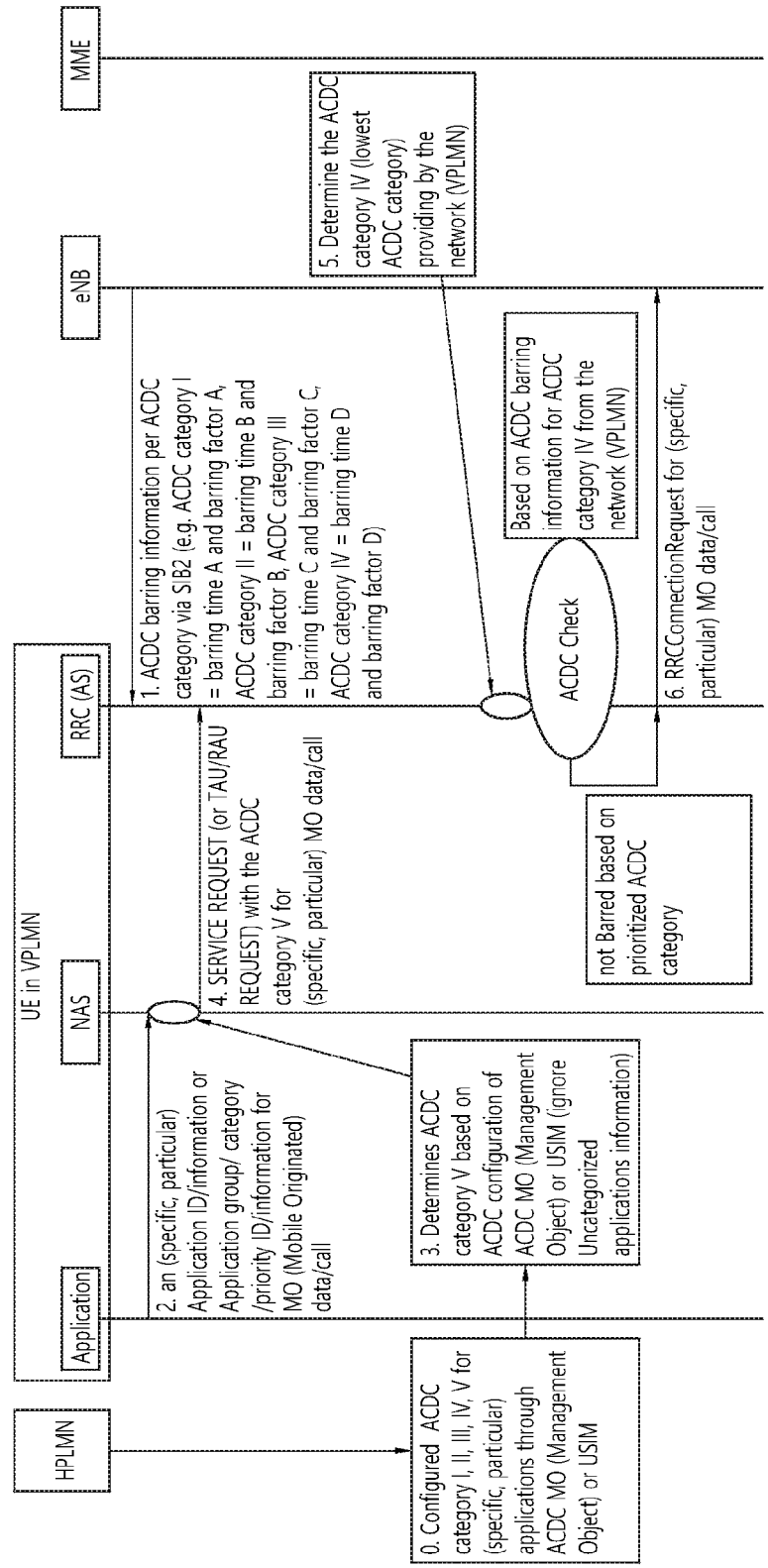
Figure 20B:
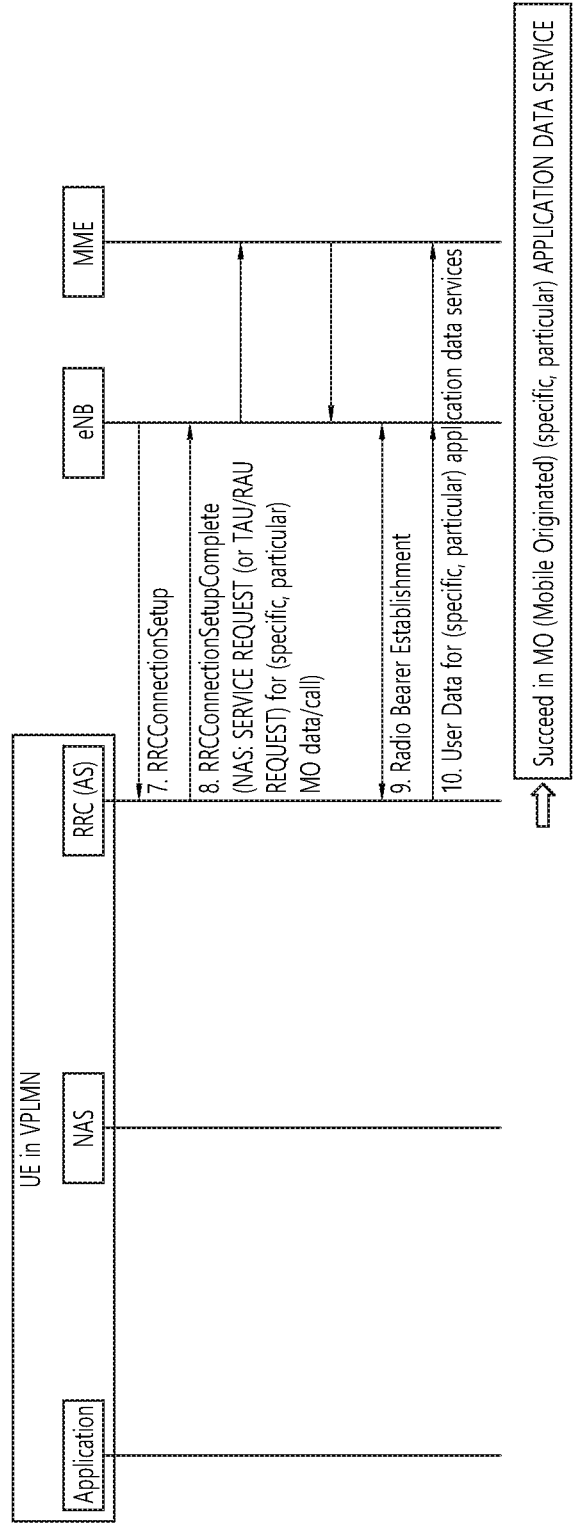

FIGS. 12a to 12ab are signal flowcharts illustrating proposal 1-3a of the present invention. FIGS. 13a and 13b are signal flowcharts illustrating proposal 1-3b of the present invention.

The application attribute related information, the ACDC barring information, and a UE processing scheme of the information in proposal 1-3 are described similarly to proposal 1-1 described above.

(Step 1) The network (for example, the base station) provides the ACDC barring information to the UE through the SIB. The AS layer (that is, the RRC layer) of the UE receives the ACDC barring information from the network and provides the information to the NAS layer.

The application layer may provide even the ACB skip related indication for each application attribute related information to the NAS (alternatively, the AS (RRC)) layer together with or a part from the application attribute related information.

(Step 2) is similar to proposal 1-1 of the present invention.

(Step 3) The NAS layer transfers the application attribute related information or the application attribute related information+the ACB skip related indication received from the application layer together when the service request procedure or the TAU/RAU procedure for the service connection by the application starts. When the NAS layer receives the ACB skip start/setting indication information from the application layer and further, when the ACB skip configuration received from the AS layer (that is, the RRC layer) is on/true/set (further, when the ACDC barring check skip is on/true/set), the NAS layer transfers the application attribute related information and the ACB skip related indication based on the application attribute related information to the AS layer (that is, the RRC layer) when the service request procedure or the TAU/RAU procedure for the service connection by the application starts.

(Step 4) is similar to proposal 1-1 of the present invention.

II. Proposal 2 of Present Invention (Proposal 8 in Provisional Application)

The application attribute related information and the ACDC barring information may be provided to the UE for each PLMN (that is, for each PLMN operator).

In this case, when the UE receives the ACDC barring information from a plurality of PLMNs, the UE may differentiate the ACB (perform the ACDC) by applying only primary (alternatively, main or master) ACDC barring information. In this case, the UE may differentiate the ACB (perform the ACDC) by applying only the ACDC barring information provided in the corresponding PLMN according to PLMN preference information provided through a predetermined or management object (MO).

Alternatively, the UE differentiates the service connection by the application by determining the ACDC barring information provided in the HPLMN to be effective. The UE ignores the application attribute related information and the ACDC barring information received from the VPLMN and the UE differentiates the service connection by the application according to the application attribute related information and the ACDC barring information received from the HPLMN. For example, when according to information received from LG U+ which is the HPLMN of the UE, Google talk is mapped to category II, but according to information received from Verizon which is the VPLMN, Google talk is mapped to category V, in the case where the UE moves to Verizon which is the VPLMN to execute Google Talk, the service connection by the application is differentiated based on the ACDC barring information corresponding to category II provided in Verizon.

When the UE does not provide the application attribute related information and the ACDC barring information in the HPLMN and provides the application attribute related information and the ACDC barring information in the VPLMN, the UE ignores the information provided from the VPLMN and does not differentiate the service connection by the application.

Or, the UE may apply the application attribute related information and the ACDC barring information received from the VPLMN and ignore the application attribute related information and the ACDC barring information received from the HPLMN in the related art. That is, the UE differentiates the service connection by the application according to the application attribute related information and the ACDC barring information received from the VPLMN.

Or, the UE may determine whether to apply the application attribute related information and the ACDC barring information received from the HPLMN or whether to apply the application attribute related information and the ACDC barring information received from the VPLMN according to the PLMN preference information of the management object (MO) received from the network.

For example, a UE operation is described below in brief with respect to Proposal 2 of the present invention.

It is assumed that according to the application attribute related information provided by LG U+(HPLMN), the UE operation is classified into categories I, II, III, IV, and V and according to the application attribute related information provided by Verizon (VPLMN), the UE operation is classified into categories I, II, III, and IV. In this case, the UE assumes that Google Talk is mapped to category V according to the application attribute related information received from LG U+(HPLMN). When the UE executes Google Talk by roaming to Verizon (VPLMN) under such a situation, although category V is not provided in Verizon (VPLMN), it is determined that Verizon (VPLMN) corresponds to category IV which is the lowest category provided by Verizon (VPLMN) and thereafter, the ACDC barring information is applied based on the determined category IV to perform the service connection differentiation (ACDC check).

Alternatively, in the roaming scenario, when the UE moves to the VPLMN to execute Google Talk, the UE does not provide category V in Verizon (VPLMN), and as a result, the UE may not perform the service connection differentiation (ACDC check) by the application in the case of Google Talk. In this case, general ACB for the Google Talk application may be performed.

Alternatively, when the application which the UE executes is not mapped even to any category according to the application attribute related information provided from the network, the application may be mapped to a category having highest barring rate.

Alternatively, when the application which the UE executes is not mapped even to any category according to the application attribute related information provided from the network, the application may be mapped to a category having lowest barring rate.

Whether to apply the category having the highest barring rate or the category having the lowest barring rate may be determined according to network configuration or UE capability information.

III. Proposal 3 of Present Invention (Proposal 12 in Provisional Application)

Hereinafter, proposal 3 of the present invention will describe an access differentiating method (category specific ACDC barring check method) for each application attribute related information.

The application attribute related information, the ACDC barring information, and a UE processing scheme of the information in proposal 3 are described similarly to proposal 1-1 described above. Hereinafter, a UE operation method different from proposal 1-1 of the present invention will be described.

When the application attribute related information is provided to the UE through an NAS configuration MO or a new application MO depending on an OMA DM protocol or predetermined in the USIM, the application attribute related information may be provided/transferred to the NAS layer or the application layer of the UE.

In this case, according to the application attribute related information, a special application ID configured by a wildcard may be present and a special category for the special application ID may be present. For example, an ID of a specific application may be xxx which is a wildcard type.

FIGS. 14a to 18b are signal flowcharts illustrating proposal 3 of the present invention.

(Step 0) The network (alternatively, an operator) provides/configures the application attribute related information to the UE. The application attribute related information may be provided to the UE from the network (operator) periodically or at a specific time.

Accordingly, the NAS layer or the application layer of the UE may acquire the application attribute related information.

In this case, as described above, the special application ID configured by the wildcard may be present and the special category for the special application ID may be present.

(Step 1) is similar to proposal 1-1 of the present invention. When the information provided from the application layer to the NAS layer just makes a service connection attempt for providing the application service, the application attribute related information is provided to the NAS layer. In this case, service connection session information may be together provided to the NAS layer.

(Step 2) The operation of the NAS layer is fundamentally similar to proposal 3-1 of the present invention. However, in this case, the application attribute related information on the application attribute related information and the related information/indication and a new RRC establishment factor value, a new call type, or a service type may be together transferred to the AS layer (that is, the RRC layer) based on the application attribute related information acquired in step 0).

When multiple application attribute related information received from the application layer is provided or when the application attribute related information is changed (differently from the previous case) during the NAS recovery, the NAS layer operates similarly to proposal 1-1 or proposal 1-2 of the present invention.

In this case, when a category which matches the application which is being executed is not p resent in the acquired application attribute related information, the NAS layer applies and selects the lowest category (the category having the highest barring rate) and notifies the applied and selected category to the AS layer (that is, the RRC layer).

Meanwhile, as described above, when the ID of the application which is being executed is the wildcard, the application may be applied to the special category and notified to the AS layer (that is, the RRC layer). The ACDC check may be performed with respect to the special category as described below.

Alternatively, when the category which matches the application which is being executed is not present in the acquired application attribute related information, the NAS layer may not transfer the application attribute related information to the AS layer (that is, the RRC layer). In this case, the ACDC check may not be performed and only the ACB check may be performed.

(Step 3) The operation of the AS layer (that is, the RRC layer) is fundamentally similar to proposal 1-1 of the present invention. However, when the application attribute related information is received from the NAS layer, the ACDC check is performed based on the ACDC barring information for each application attribute related information.

When multiple application attribute related information received from the NAS layer is (simultaneously) provided, the AS layer operates as described in proposal 1-1 of the present invention.

When the NAS layer acquires the new establishment factor value, the new call type, or the service type for each application attribute related information at the time of starting the service request procedure or the TAU/RAU procedure, the NAS layer operates similarly to proposal 1-2.

When the ACB skip related indication (ACDC barring check skip indication) is received additionally or separately from the NAS layer, the ACB check skip (ACDC check skip) is performed regardless of the current barring or not to permit an attempt of the service connection (the service request procedure or the TAU/RAU procedure) by the application. That is, the RRC connection establishment is performed by starting/performing the service request procedure or the TAU/RAU procedure by ignoring the current barring state.

The aforementioned contents may be combined with other proposals.

IV. Proposal 4 of the Present Invention (Proposal 16 Disclosed in Provisional Application)

The proposal 4 of the present invention assumes the following scenario. That is, according to the application-related attribute information provided by LG U+(HPLMN), the categories are classified into I, II, III, IV, and V, and according to the application-related attribute information provided by Verizon (VPLMN), the categories are classified into I, II, III, and IV. In this case, in the UE, according to the application-related attribute information provided from the LG U+(HPLMN), Google Talk is mapped in the category V. However, when the UE moves to VPLMN to execute the Google Talk, the UE may operate like a proposal to be described below.

IV-1. Proposal 4-1 of the Present Invention (Proposal 16a in Provisional Application)

FIGS. 19a to 20b are signal flowcharts illustrating proposal 4-1 of the present invention.

(step 0) Step 0 of the proposal 4-1 is the same as step 0 of the proposal 1 of the present invention.

(step 1) The UE operation of the proposal 1 (1-1, 1-2, 1-3) or the proposal 3 of the present invention is followed. However, the AS layer provides the ACDC barring information to the NAS layer (alternatively, the IMS layer or the application layer). The information provision may be performed periodically, during event occurring/changing, or when the NAS layer (alternatively, the IMS layer or the application layer) requests the information provision.

When the ACDC barring information and the ACB information of the present invention are simultaneously provided from the network (for example, the base station) to the AS layer (that is, the RRC layer) of the UE through the SIB, the AS layer (that is, the RRC layer) of the UE may provide both the ACDC barring information and the ACB information to the NAS layer (alternatively, the IMS layer or the application layer). The information provision may be performed by the AS (RRC) layer periodically, during event occurring/ changing, or when the NAS layer (alternatively, the IMS layer or the application layer) requests the information provision.

The application layer provides executing application-related attribute information/indication to the NAS layer when attempting the service access. Further, the application layer may provide information on a service access section to the NAS layer together.

(step 2a) The NAS layer basically follows the operation of the proposal 1 (1-1, 1-2, 1-3) or the proposal 3 of the present invention. In this case, the NAS layer determines a category matched with the corresponding application on the basis of the application-related attribute information acquired in step 0). Thereafter, the NAS layer performs the ACDC check for the application service start request on the basis of the ACDC barring information received from the AS layer (that is, the RRC layer). When the ACDC check is passed, the service request procedure or the TAU/RAU procedure is performed. When the ACDC check is not passed, the service request procedure or the TAU/RAU procedure is not performed.

When the application-related attribute information received from the application layer is (simultaneously) several or changed unlike the previous process in the NAS recovery process, i) on the basis of the application-related attribute information acquired in step 0), a category matched with the corresponding application is determined. In this case, the highest or lowest category is selected. Thereafter, the NAS layer performs the ACDC check for the application service start request on the basis of the ACDC barring information received from the AS layer (that is, the RRC layer).

In the scheme i) is recognized and determined by the NAS layer, and in this case, the network configuration/policy, UE capability, and the like may be considered.

(step 2b) When the NAS layer receives the application service start from the application layer, the service request procedure or the TAU/RAU procedure is performed. In this case, on the basis of the application-related attribute information acquired in step 0), a category of the corresponding application is determined.

When the application-related attribute information received from the application layer is (simultaneously) several or changed unlike the previous process in the NAS recovery process, basically, the UE operation of the proposal 1 (1-1, 1-2, 1-3) or the proposal 3 of the present invention is followed.

(step 3a) The AS layer (that is, the RRC layer) may additionally perform an ACB check even after the NAS layer performs the ACDC check. When he ACB check is passed, the AS layer (that is, the RRC layer) performs the RRC connection establishment procedure.

In step 2), when the service request procedure or the TAU/RAU procedure of the NAS layer starts, in the case where the ACB skip-related indication is additionally provided/transferred, the ACB check is not performed. Thereafter, the AS layer (that is, the RRC layer) performs the RRC connection establishment procedure.

If not, the AS layer (that is, the RRC layer) does not perform the ACB check, but immediately performs the RRC connection establishment procedure when the NAS layer performs the ACDC check.

(step 3b) Step 3b of the proposal is the same as step 3 of the proposal 1 of the present invention.

When the service request procedure or the TAU/RAU procedure for the service access by the application of the NAS layer starts, on the basis of the application-related attribute information acquired in step 0), a new RRC establishment factor value, a new call type, or a service type is defined and provided together from the NAS layer, the step 3b of the proposal operates the same as the proposal 1-2 of the present invention.

When the ACB skip-related indication is additionally or separately received from the NAS layer, the service access (the service request procedure or the TAU/RAU procedure) attempt is allowed by skipping the ACB check regardless of whether the current access is barred.

That is, in the scenario in the proposal 4 of the present invention, even though the category V is not provided in the Verizon (VPLMN), the service access differentiation (the ACDC check) by the application may be performed on the basis of the ACDC barring information corresponding to the category IV provided in the Verizon (VPLMN).

If not, in the scenario in the proposal 3 of the present invention, when the Google Talk is the category V, the ACDC check may not be performed by applying the proposals of the present invention. In this case, the NAS service request procedure or the TAU/RAU procedure is performed and the RRC connection establishment procedure is not barred and may be performed in the AS layer (that is, the RRC layer).

Alternatively, in the scenario, when the Google Talk is the category V, the ACDC check may not be performed by applying the proposals of the present invention. In this case, the NAS service request procedure or the TAU/RAU procedure is performed and a general ACB check may be performed in the AS layer (that is, the RRC layer).

IV-2. Proposal 4-2 of the Present Invention (Proposal 16b in Provisional Application)

According to a scenario of the proposal 4-2 of the present invention, the UE may operate as follows.

Figure 21A:
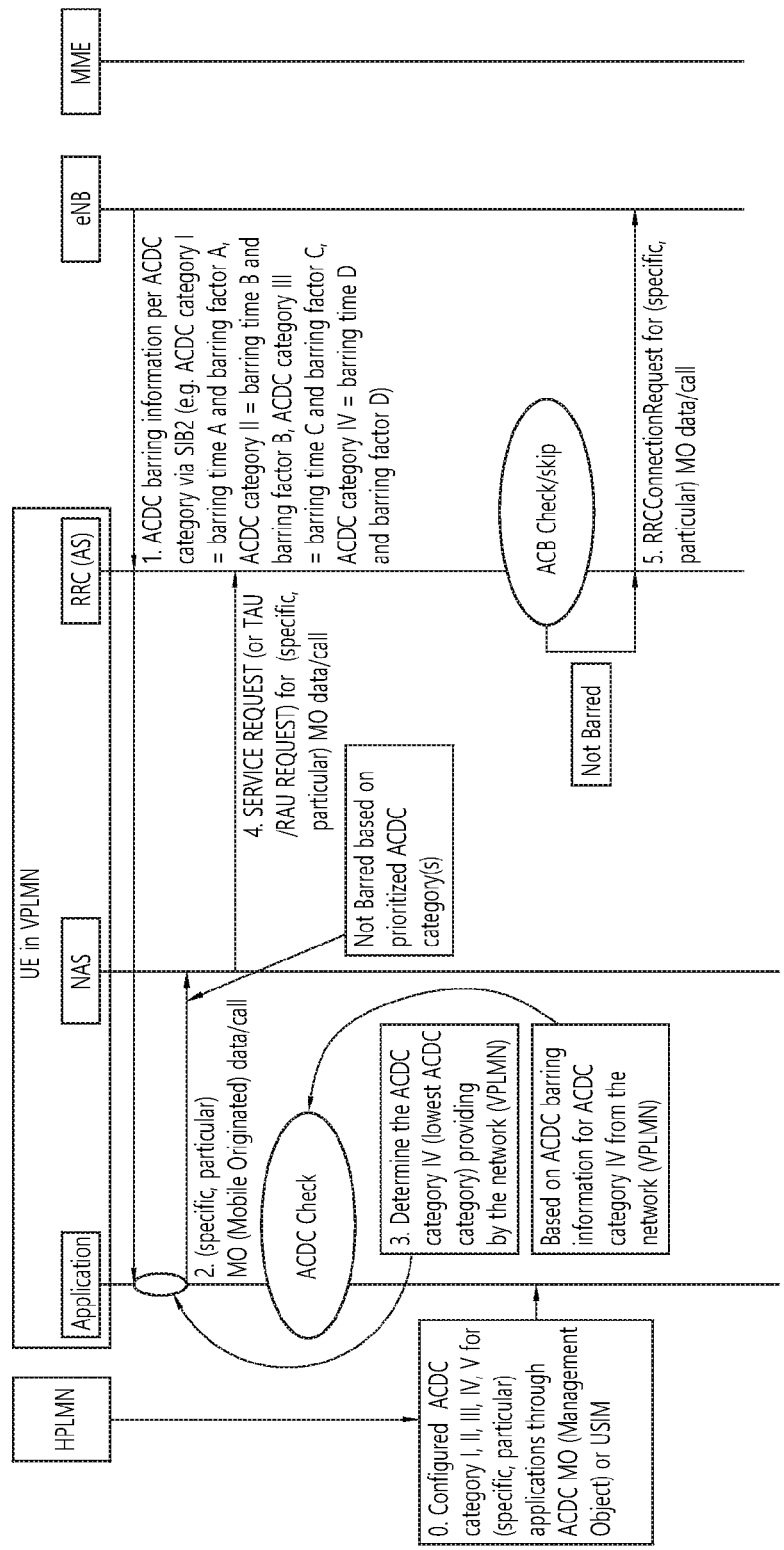
FIGS. 21a and 21b are signal flowcharts illustrating proposal 4-2 of the present invention.
Figure 21B:
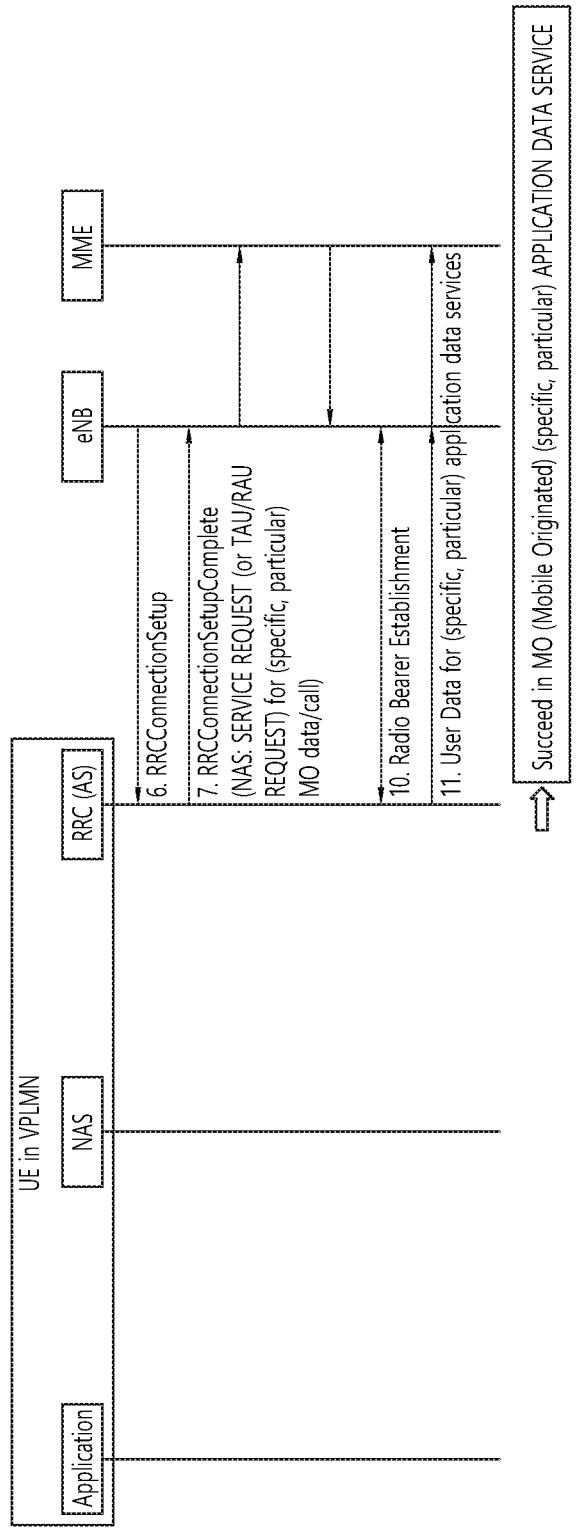
Figure 22A:
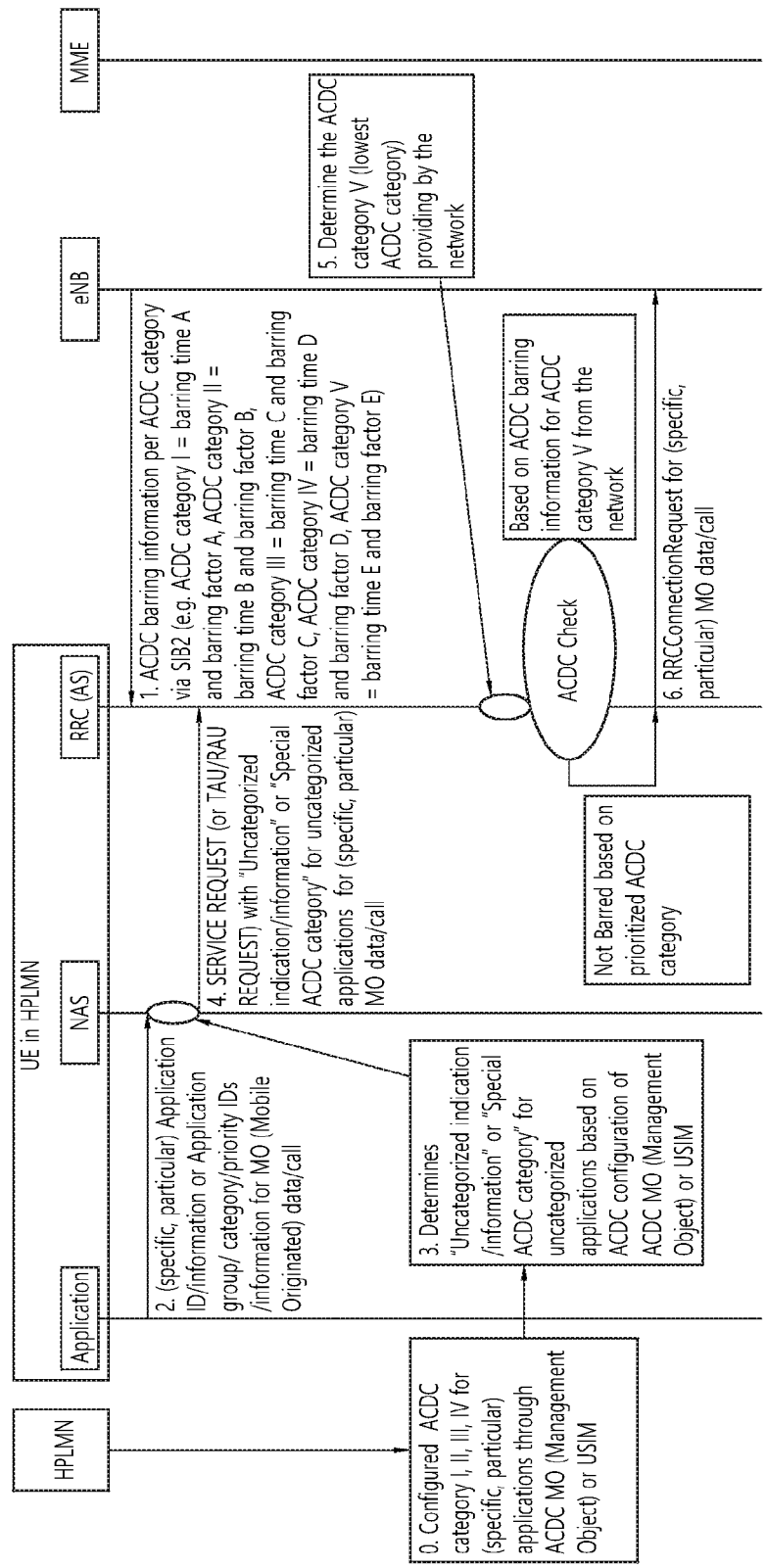
FIGS. 22a to 24b are signal flowcharts illustrating proposal 4-2 of the present invention.
Figure 22B:
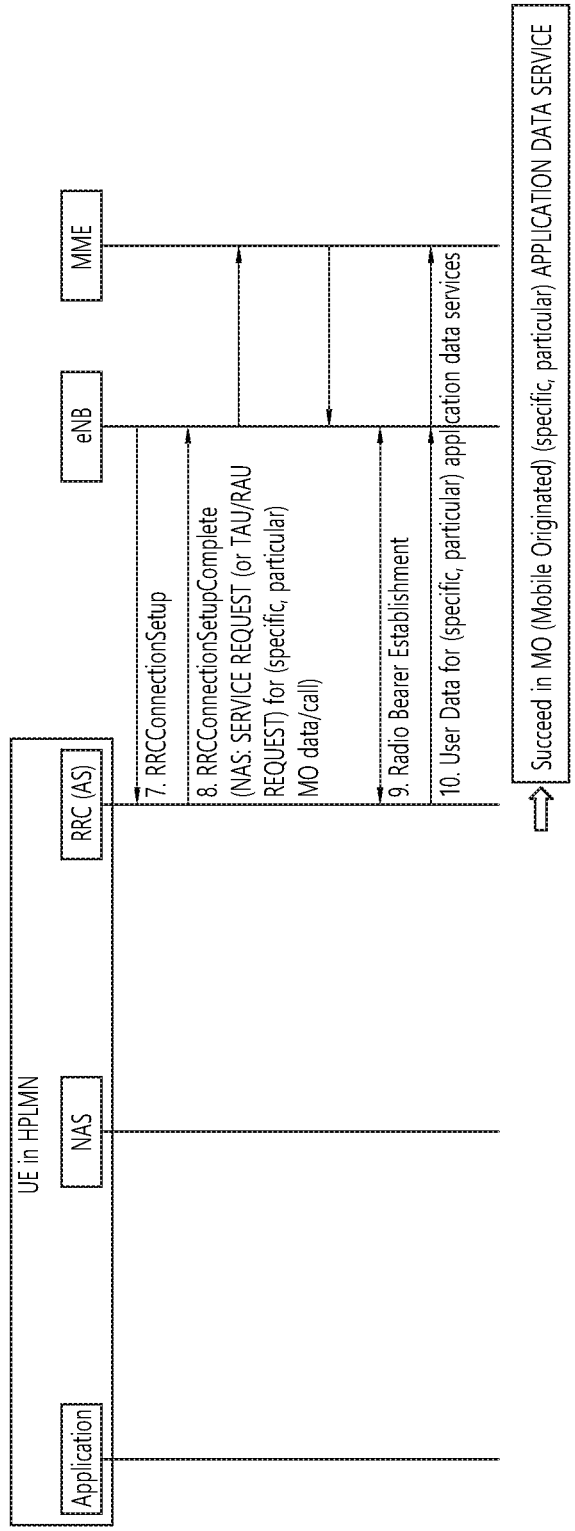
Figure 23A:
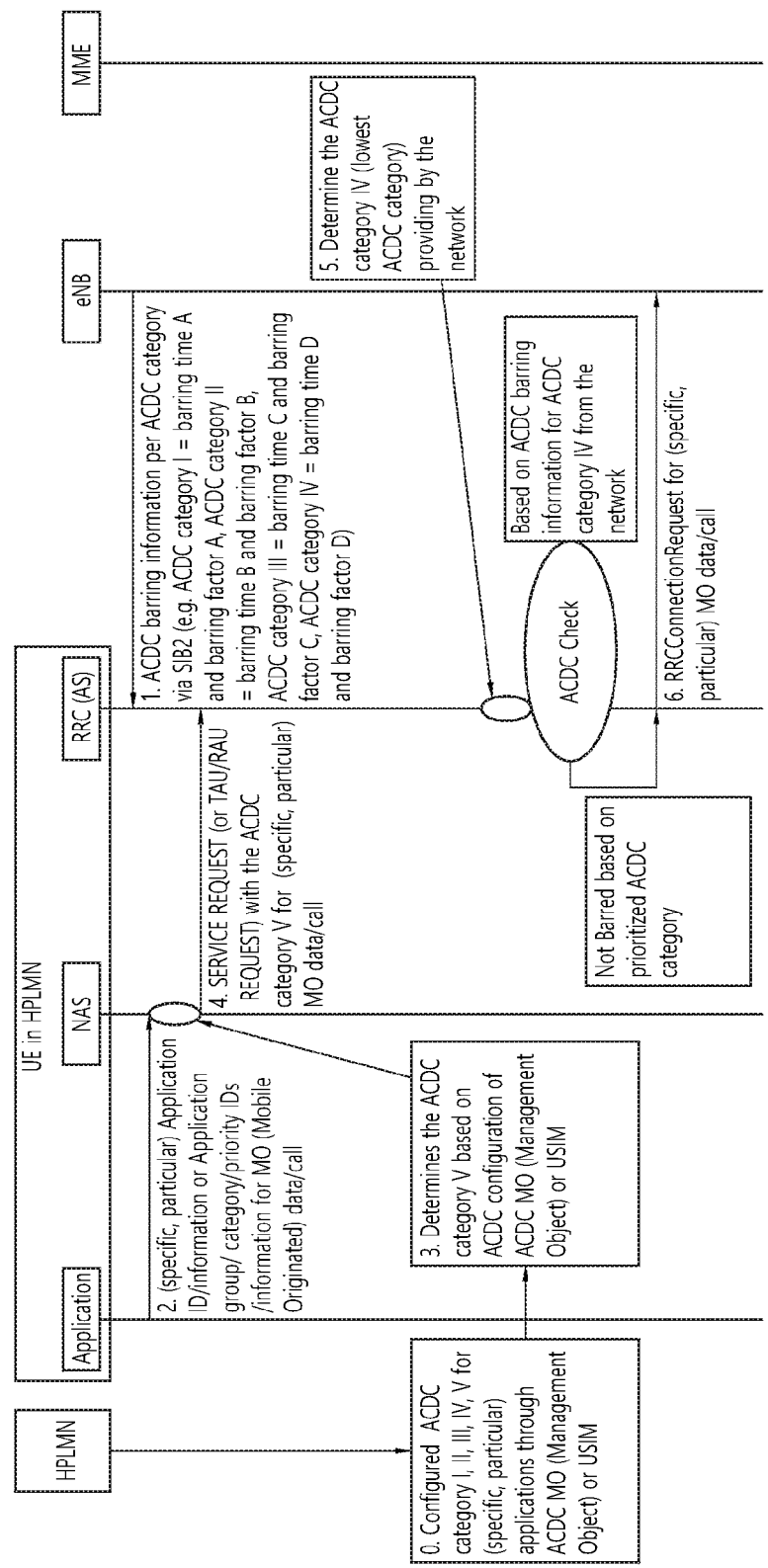
Figure 23B:
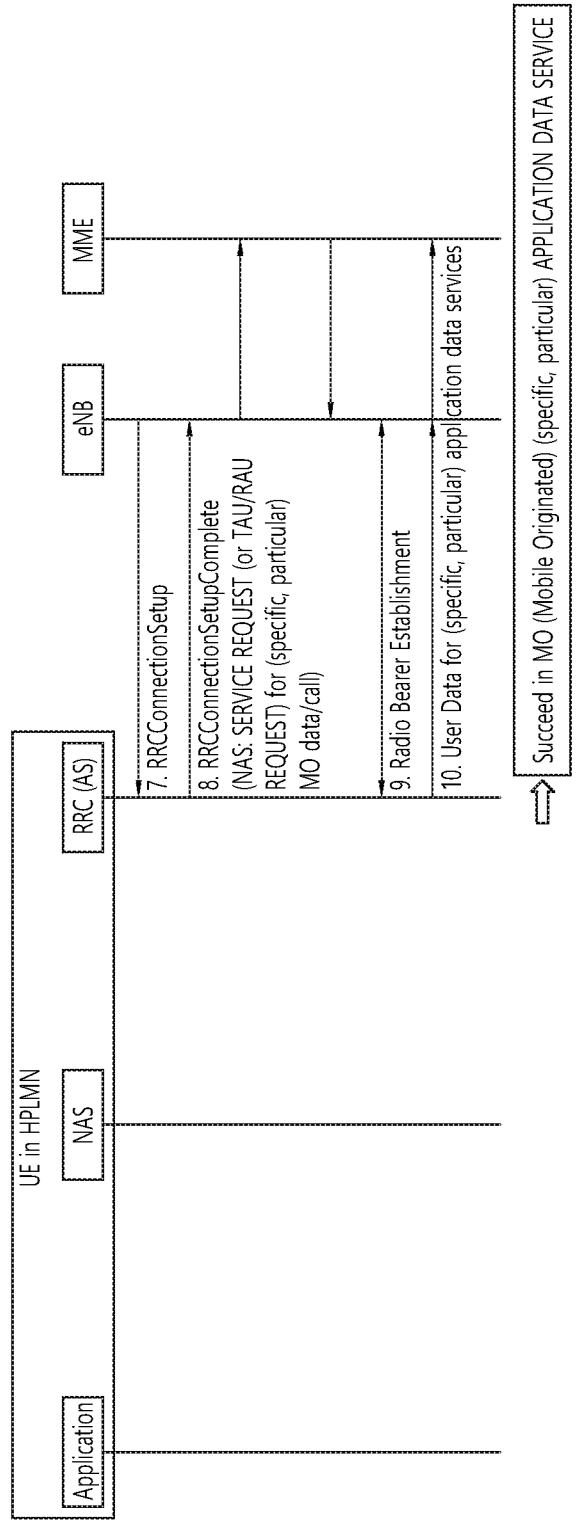
Figure 24A:
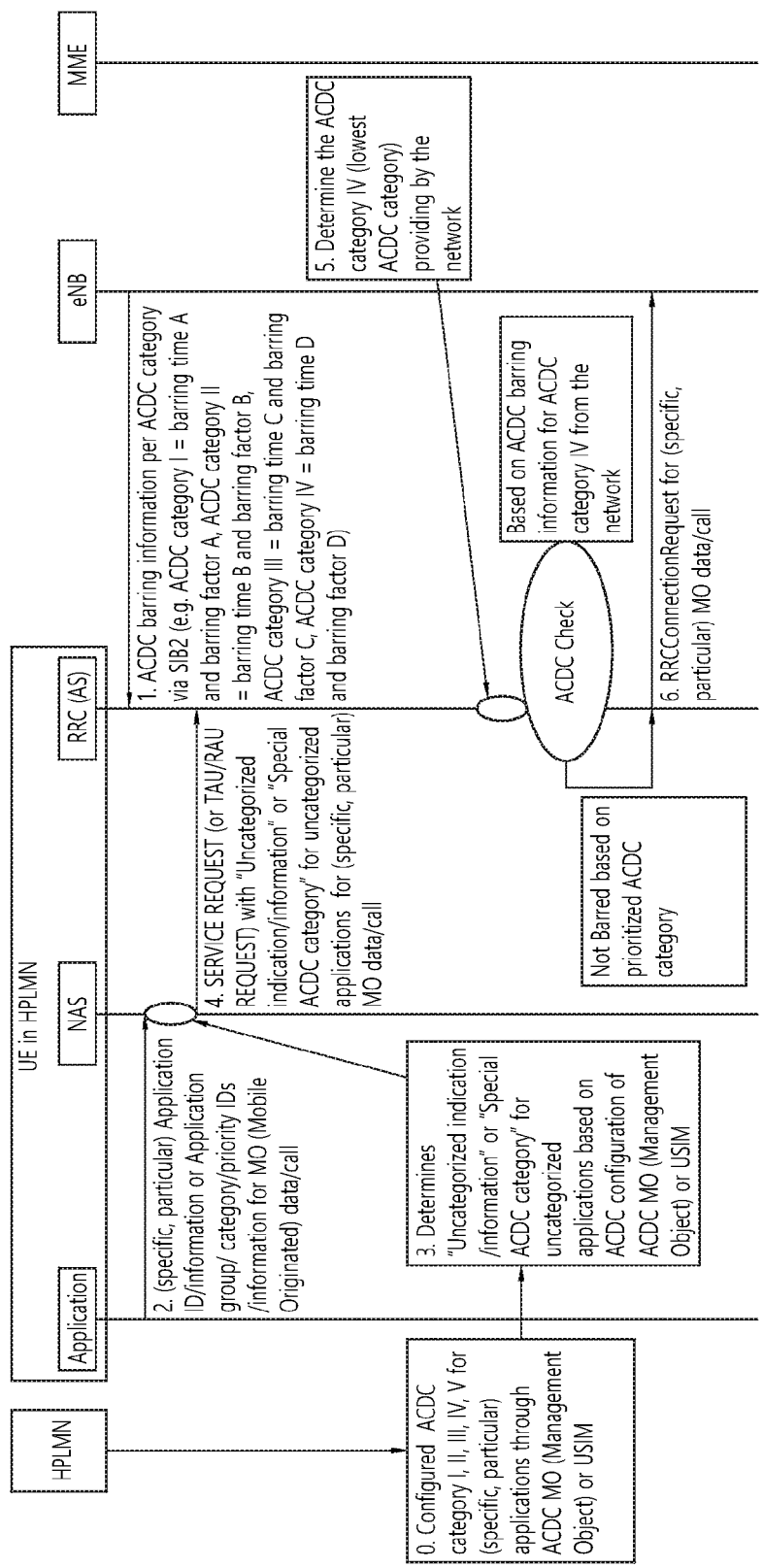
Figure 24B:
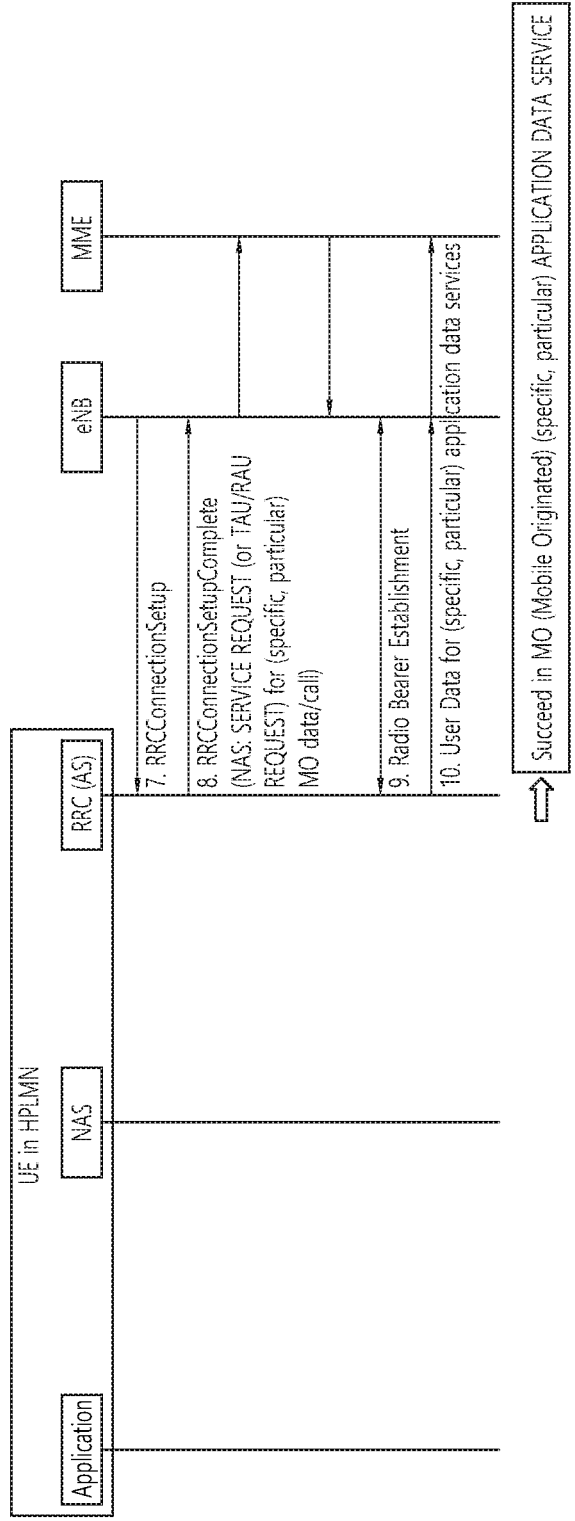
Figure 25A:
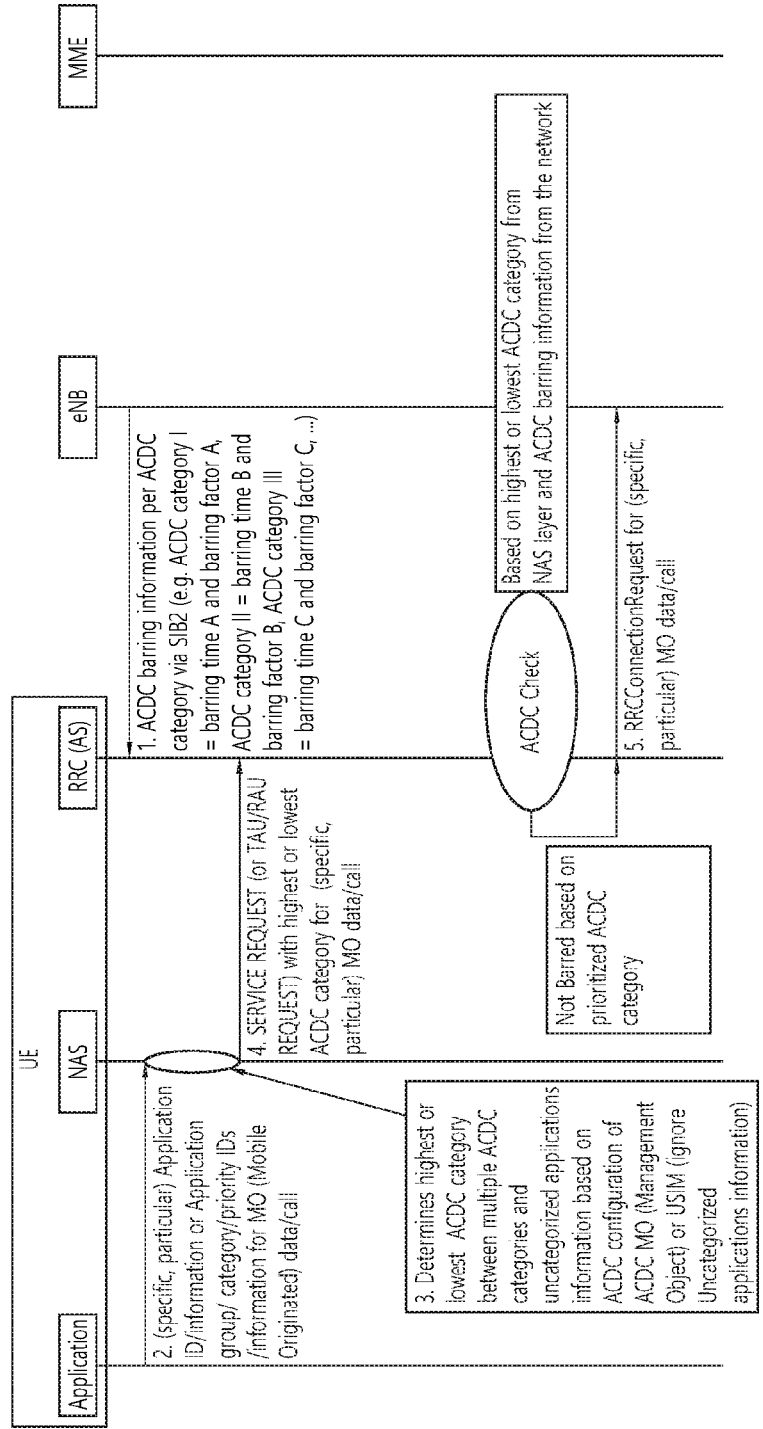
FIGS. 25a to 28b are signal flowcharts illustrating proposal 5-2 of the present invention.
Figure 25B:
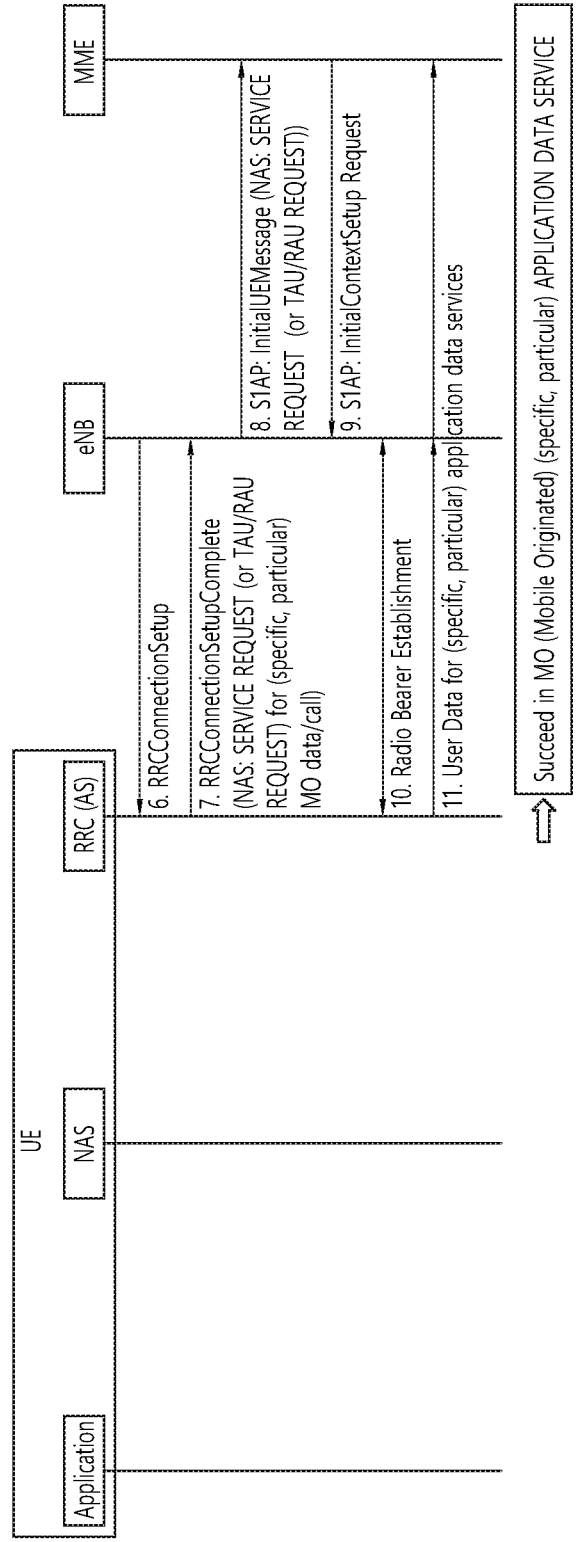
Figure 26A:
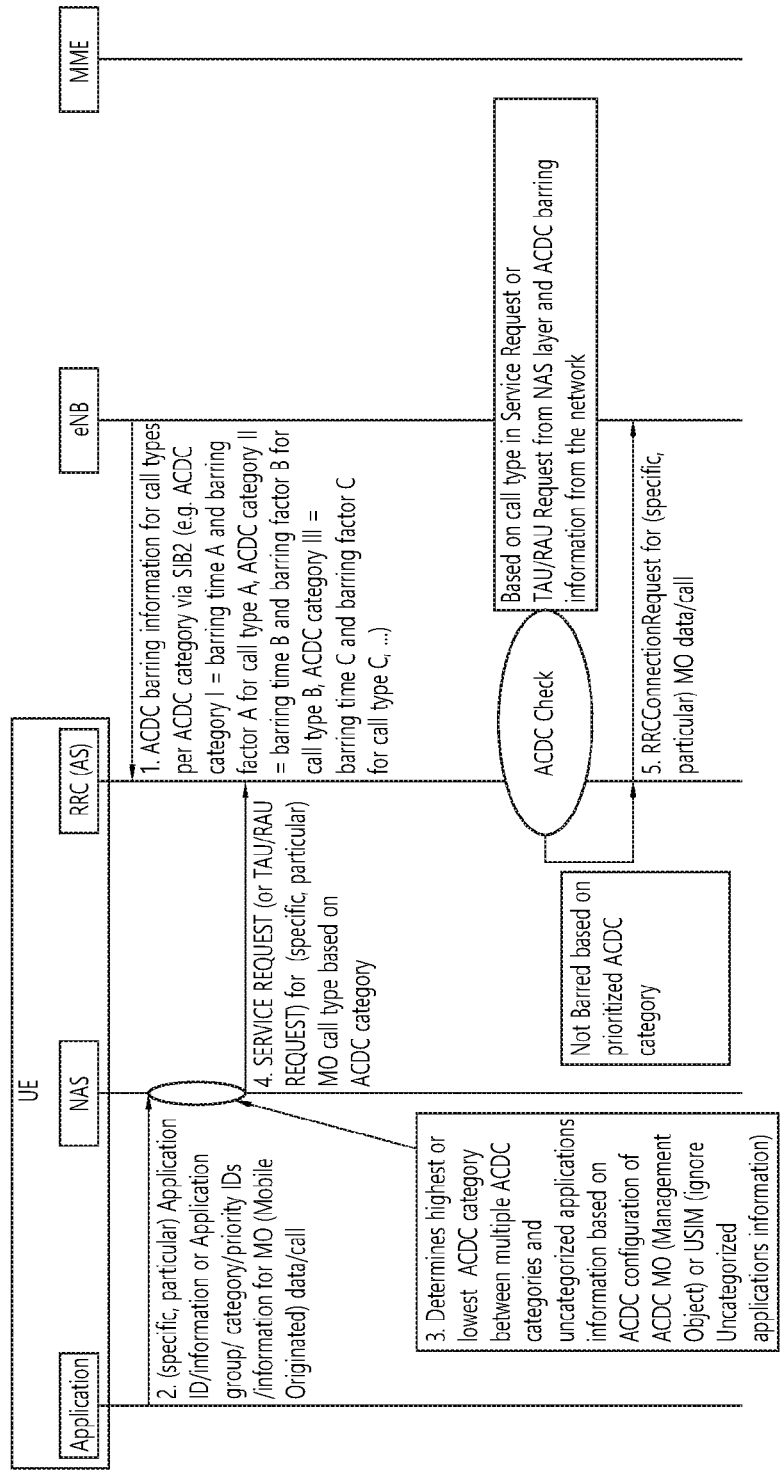
Figure 26B:
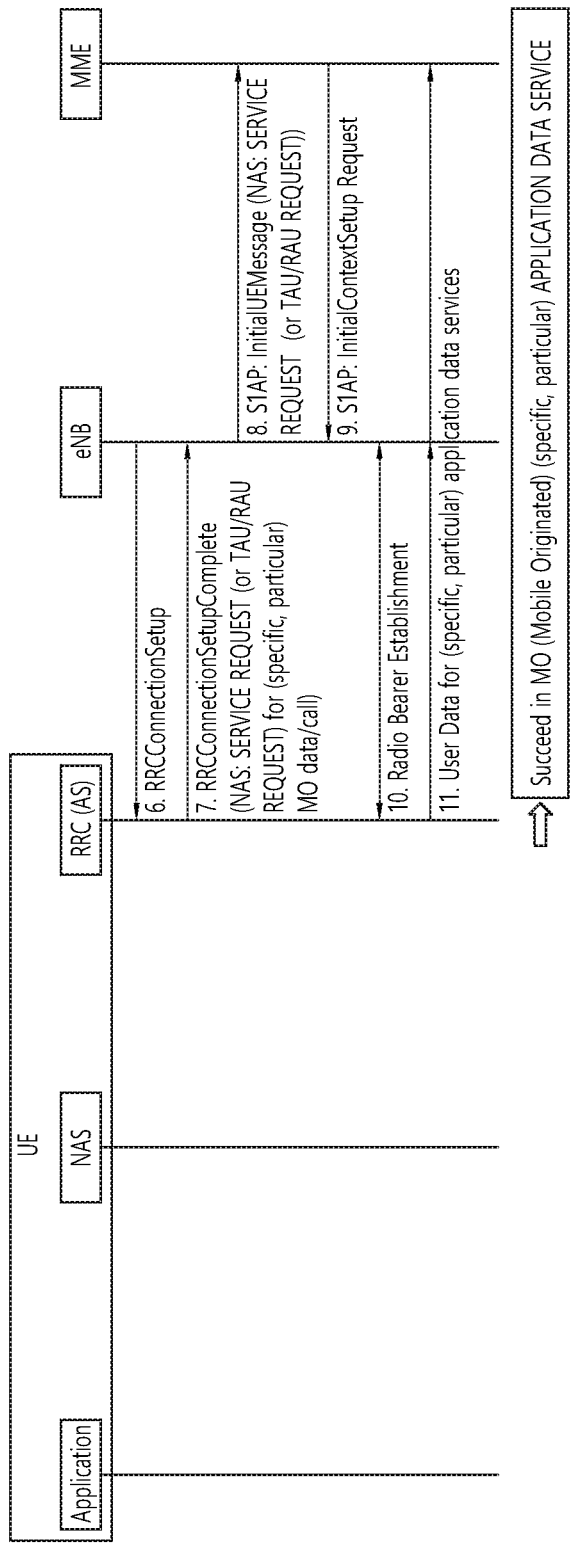
Figure 27A:
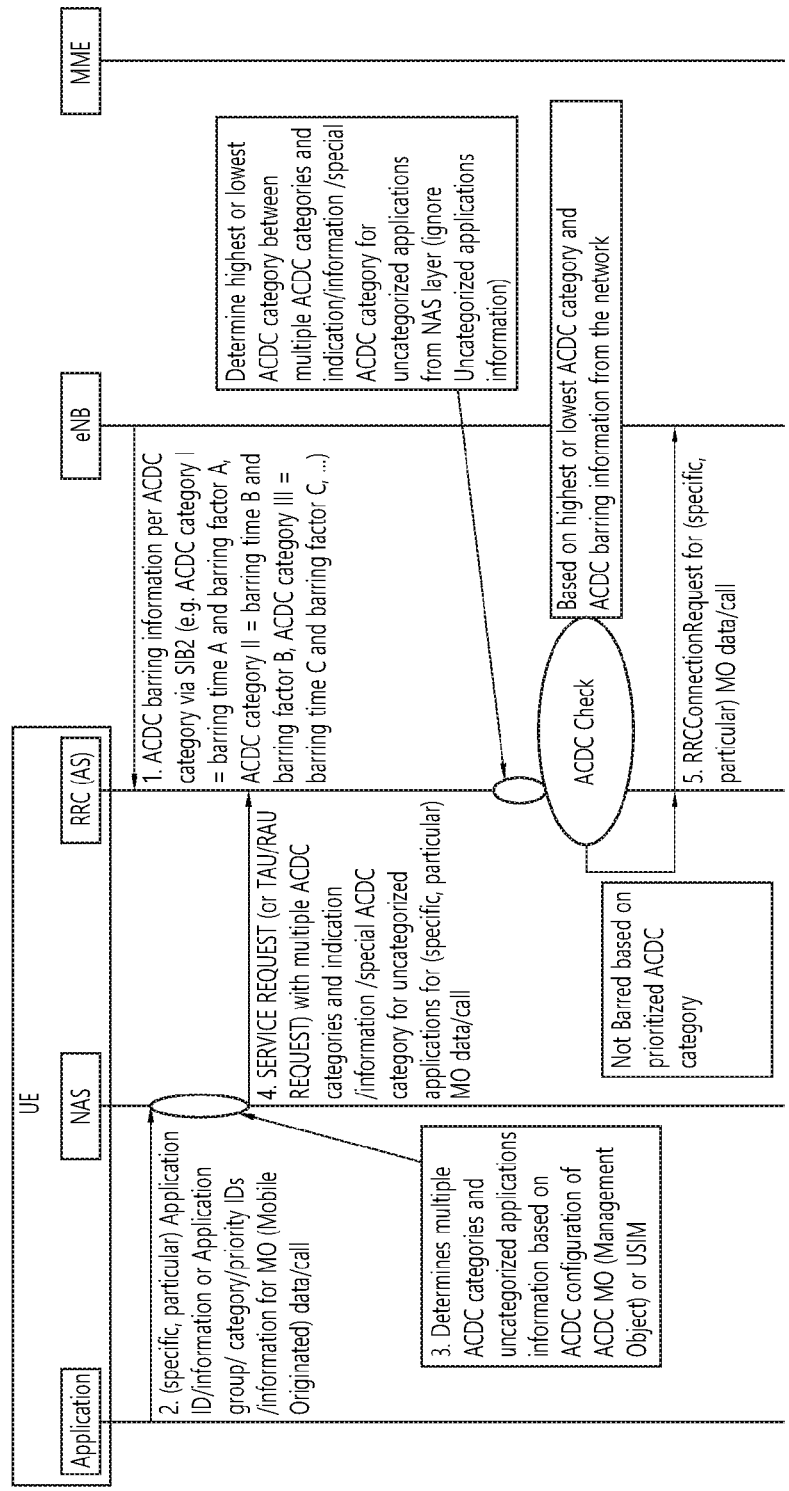
Figure 27B:
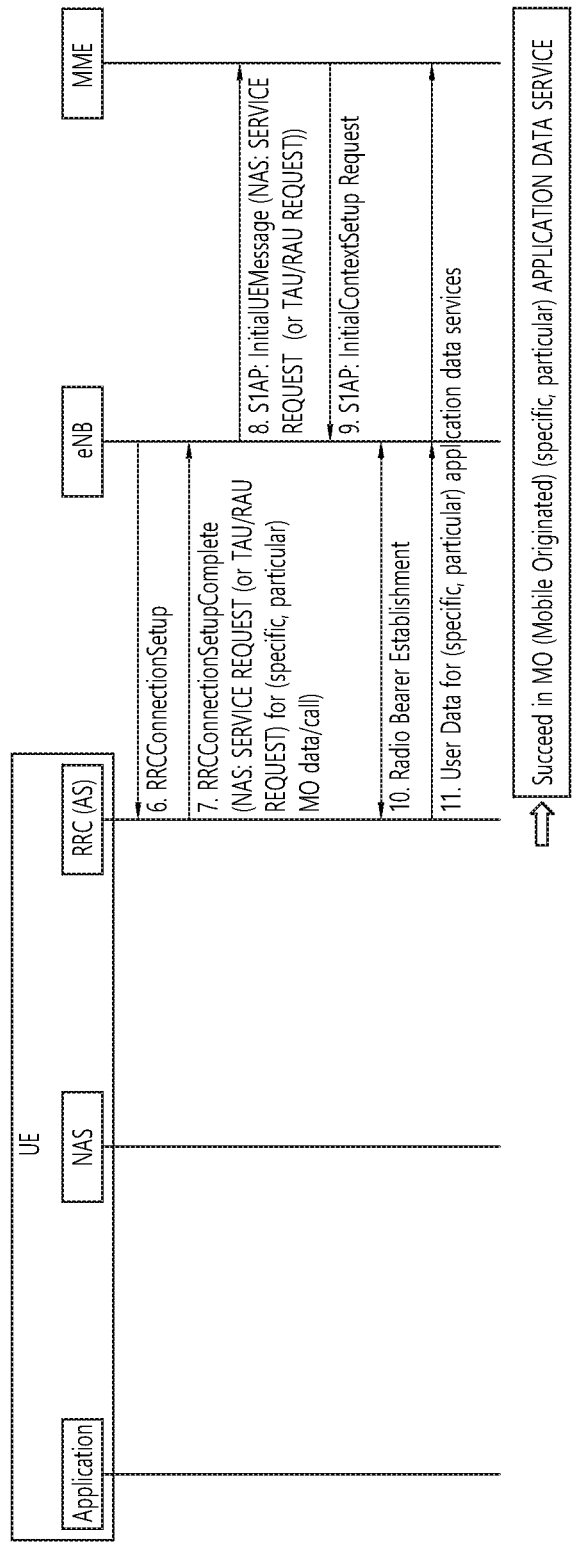
Figure 28A:
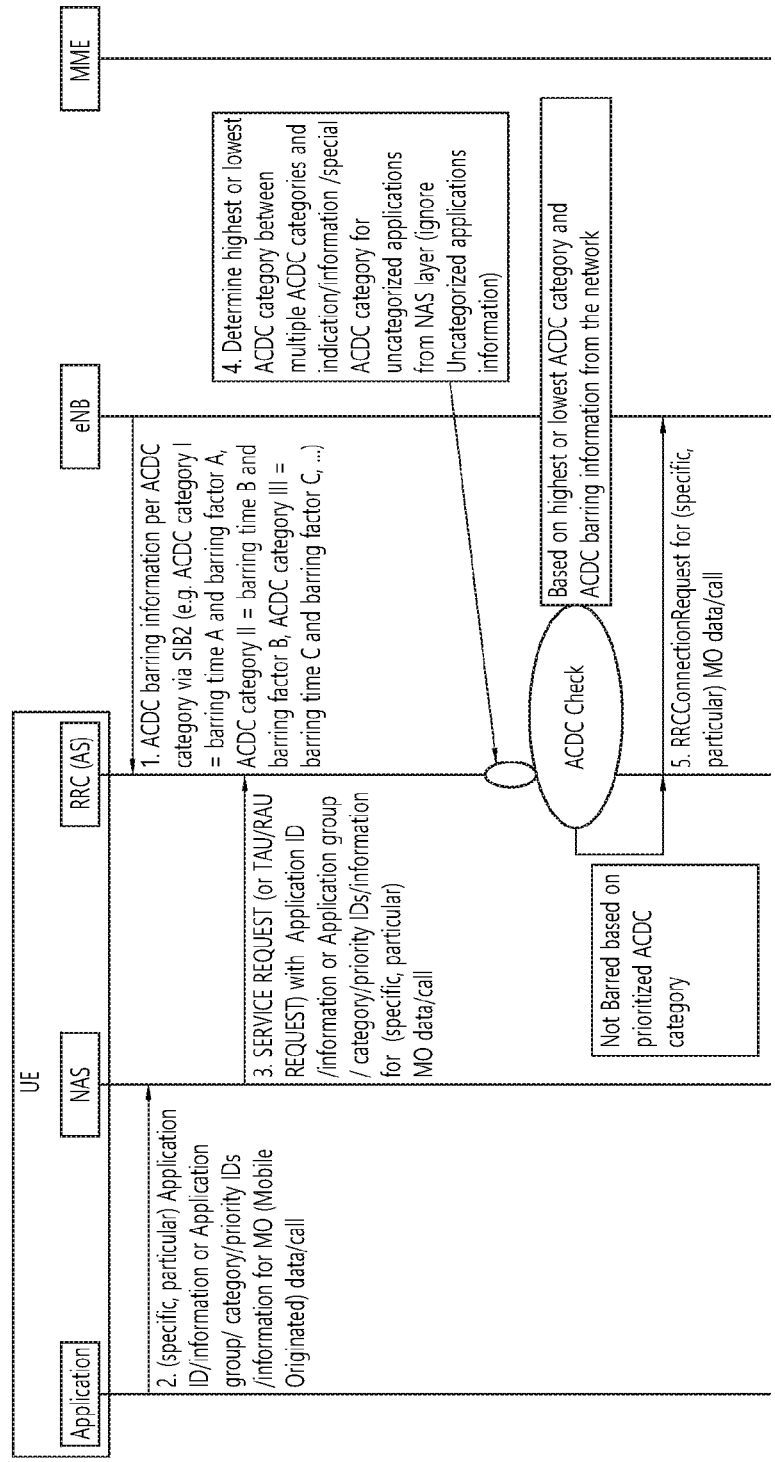
Figure 28B:
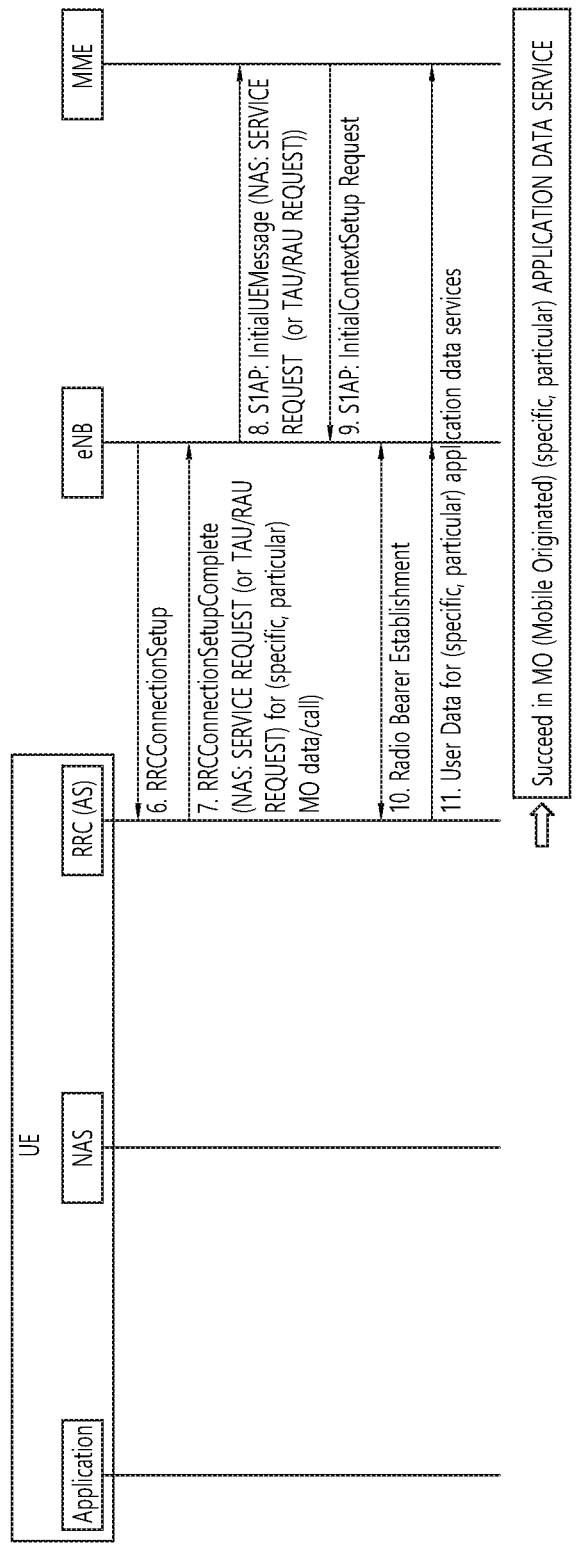
Figure 29A:
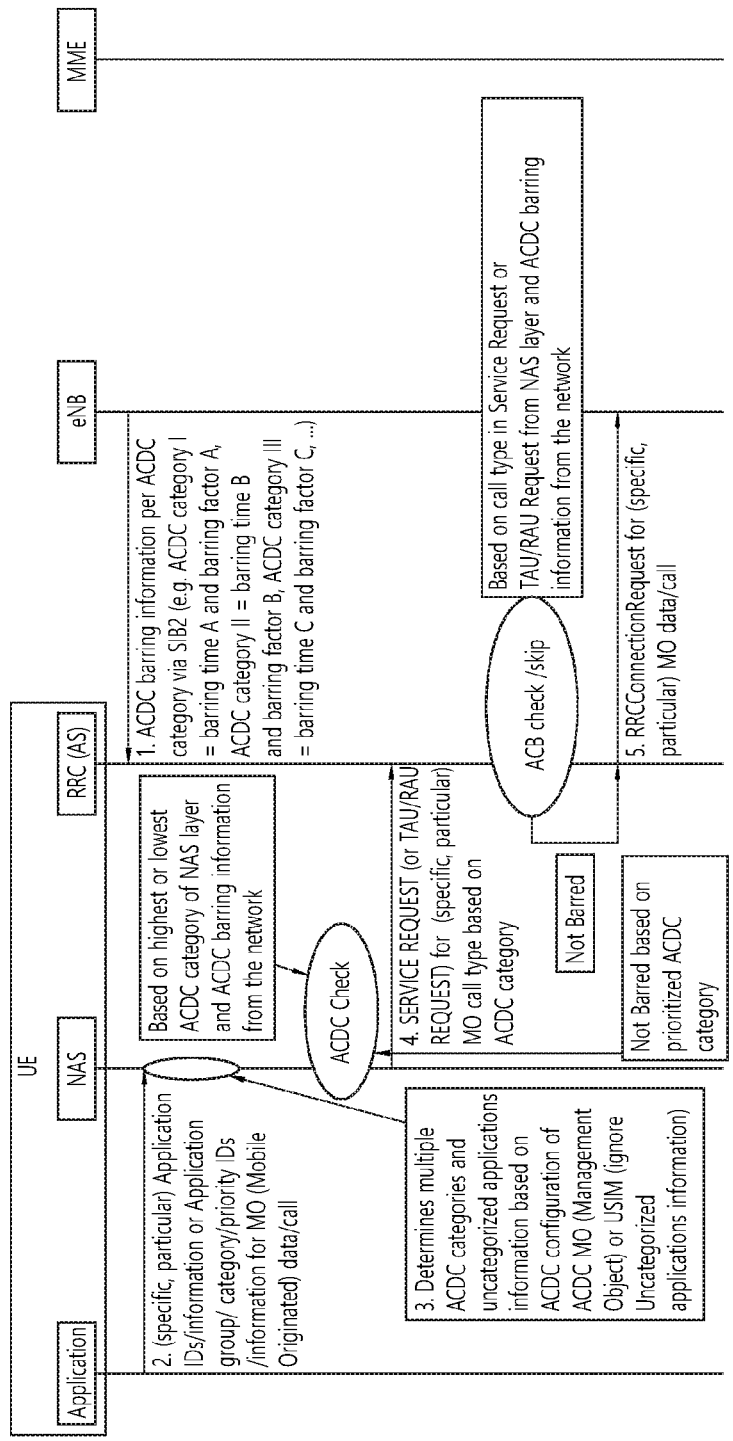
FIGS. 29a to 30b are signal flowcharts illustrating proposal 5-3 of the present invention.
Figure 29B:
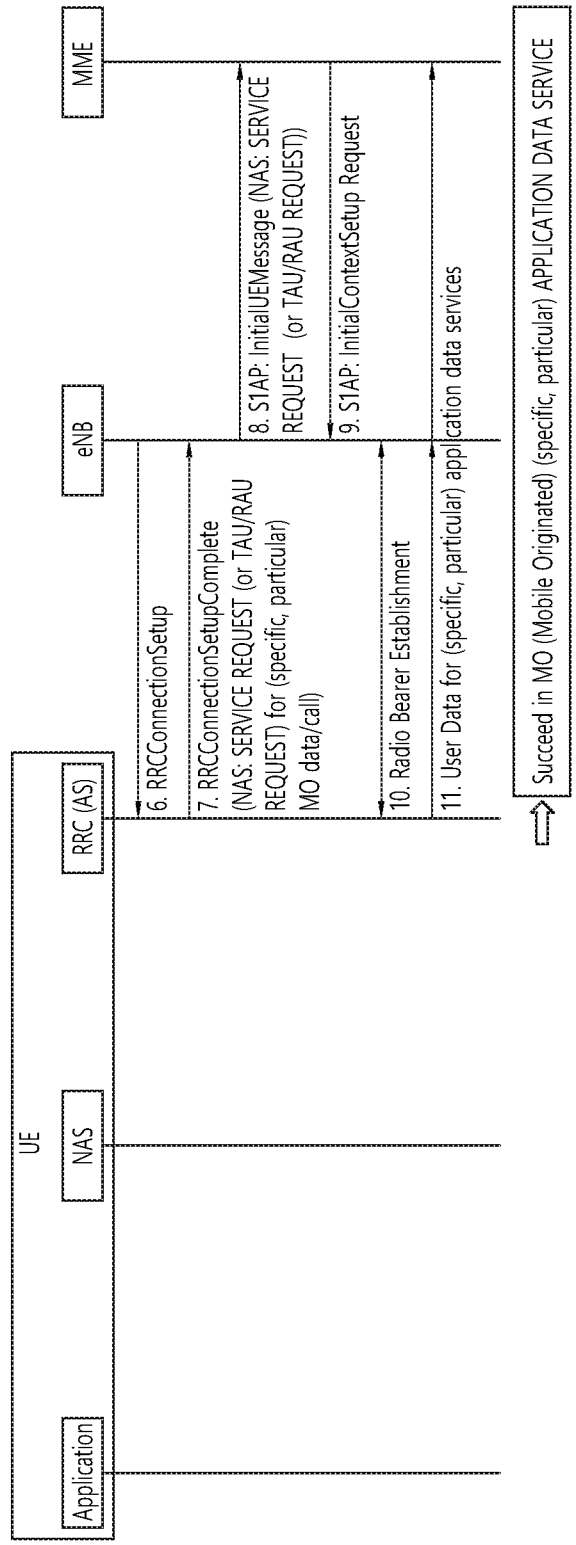
Figure 30A:
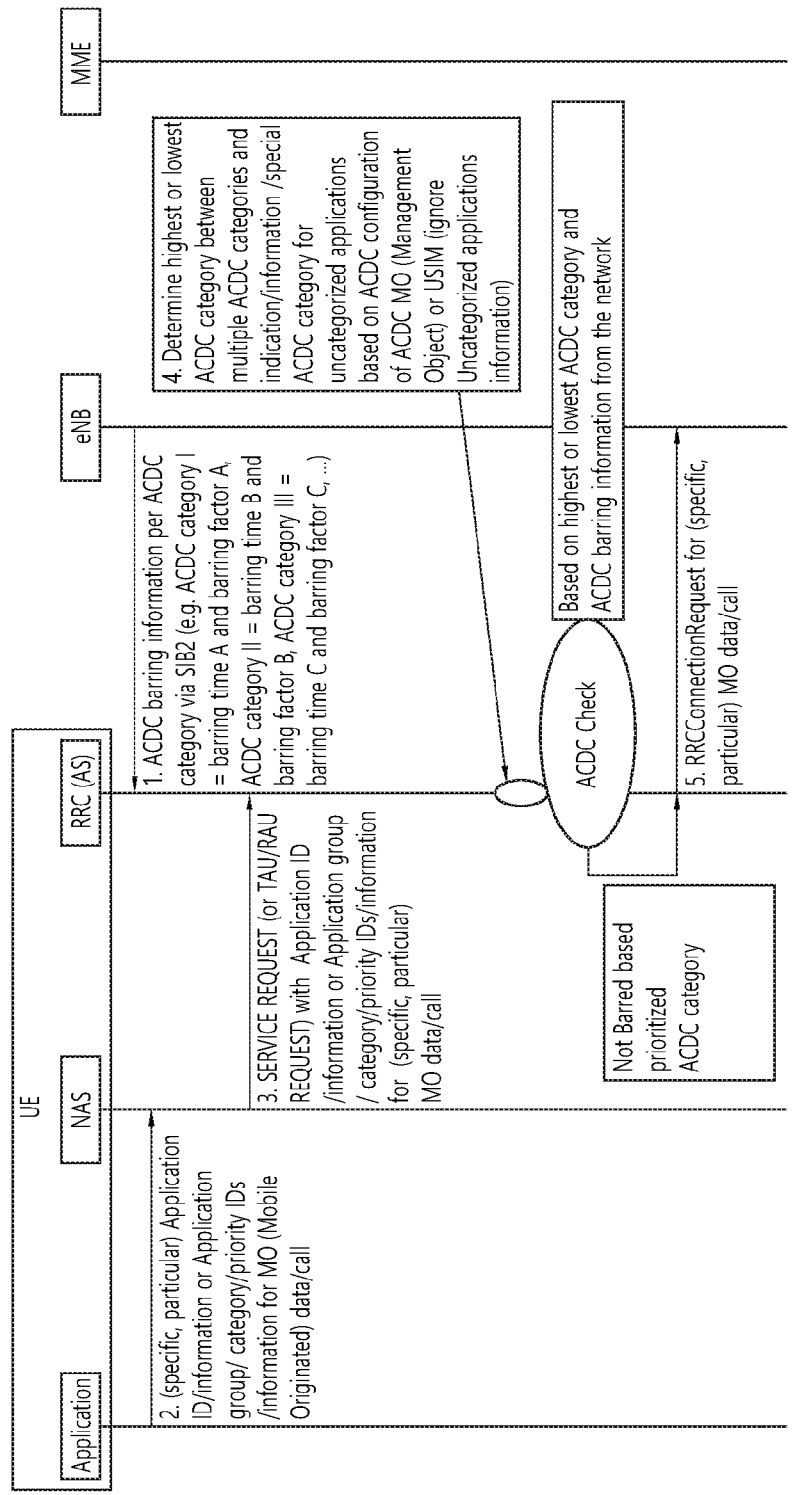
Figure 30B:
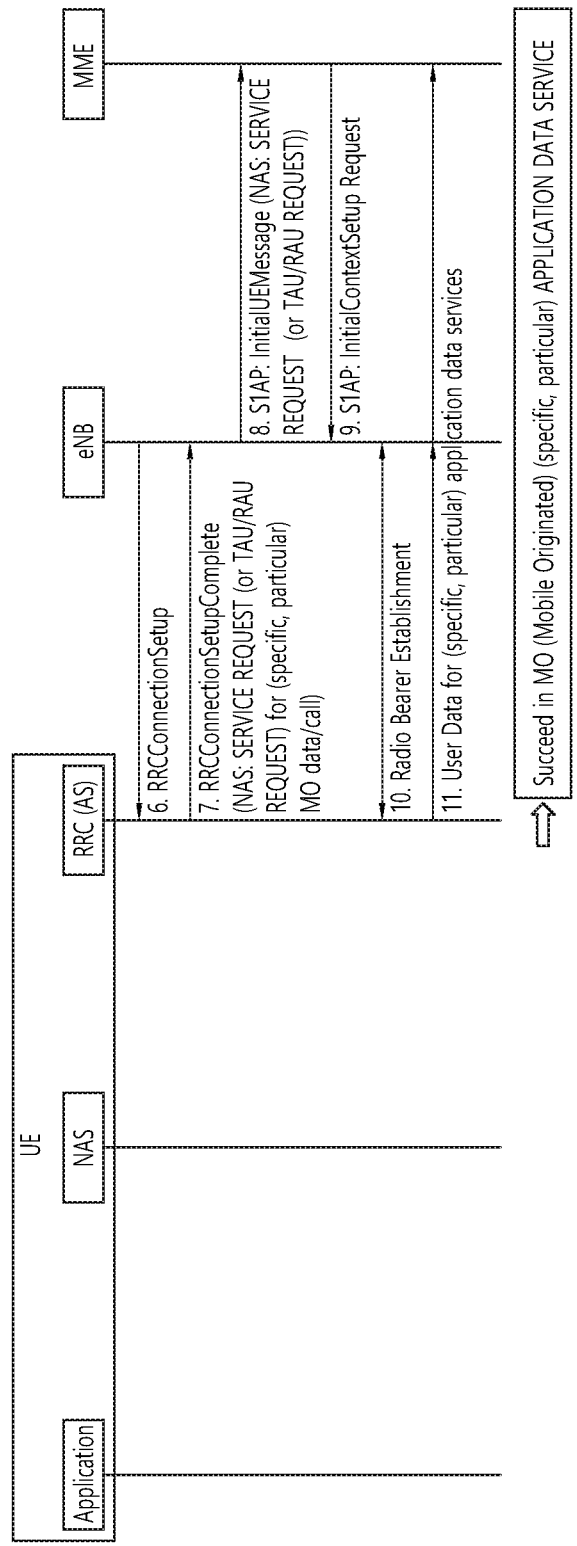

FIGS. 21a and 21b are signal flowcharts illustrating proposal 4-2 of the present invention.

(step 0) Step 0 of the proposal 4-2 is the same as step 0 of the proposal 3 of the present invention.

(step 1) When the application layer starts a data communication service, the application layer receives the ACDC barring information from the AS layer (that is, the RRC layer). In this case, the application layer may request and receive the ACDC barring information provision to the AS layer (that is, the RRC layer), and if not, the AS layer (that is, the RRC layer) may provide the ACDC barring information received from the network to the application layer without the request.

When an application data service (for example, Internet, GoogleMap, Google Talk, etc) starts, whether the service access attempt by the IP-based application is allowed or not is determined by using the application-related attribute information acquired in step 0) and the ACDC barring information received from the AS layer (that is, the RRC layer).

(step 2) If the service access attempt by the IP-based application is allowed in step 1, the network service section connection proceeds through the NAS layer and the AS layer (that is, the RRC layer). That is, the NAS layer performs the service request procedure or the TAU/RAU procedure for the service access by the IP-based application.

In this case, in step 1), in the case where the NAS layer additionally receives the ACB skip-related information from the application layer, when the service request procedure or the TAU/RAU procedure starts, the NAS layer may provide/transfer the ACB skip-related information to the AS layer (that is, the RRC layer).

(step 3) A basic UE operation is the same as the basic UE operation in (step 3a) of the proposal 4-1 of the present invention.

When the ACDC barring information and the ACB information are simultaneously provided to the UE through the SIB from the network (for example, the base station), the UE performs only the ACDC check and may not perform the ACB check.

If not, the UE may perform only one check (the ACDC check or the ACB check) by selectively applying the ACDC barring information and the ACB information according to the configuration from the network (MME/SGSN/eNB/NB and the like).

Alternatively, when the ACDC barring information and the ACB information are simultaneously provided to the UE through the SIB from the network (for example, the base station), the UE first performs the ACDC check and then the AS layer (that is, the RRC layer) may perform the ACB check by applying only the ACDC barring information.

IV-3. Proposal 4-3 of the Present Invention (Proposal 16c in Provisional Application)

Hereinafter, a UE operation method by the uncategorized application in a roaming situation or a non-roaming situation and a UE operation method when the application-related attribute information (for example, the ACDC category information) provided from the HPLMN and the VPLMN are mismatched with each other will be described.

FIGS. 22a to 24b are signal flowcharts illustrating proposal 4-2 of the present invention.

When the application-related attribute information (for example, the ACDC category information) is configured through the USIM or the ACDC management object (MO), the NAS layer of the UE may receive the configured application-related attribute information (for example, the ACDC category information) by using an AT-command and the like. When the application is executed in the UE, the UE provides the application-related attribute information from the application layer to the NAS layer, and the NAS layer determines the ACDC category corresponding to the application-related attribute information received from the application layer. In this case, when the ACDC category corresponding to the application-related attribute information received from the application layer is not present, the NAS layer provides "uncategorized indication/information" or an ACDC category "0" (a special ACDC category for the uncategorized application) to the AS layer (that is, the RRC layer) when the service request procedure or the TAU/RAU procedure stats. Herein, the "uncategorized indication/information" means that the ACDC category mapping is not present in the corresponding application, and the ACDC category "0" means that the ACDC category mapping is not present. For example, when the ACDC categories are four according to the ACDC barring information provided from the network, the ACDC category "0" means that the ACDC category mapping is not present, ACDC category "1" means the highest ACDC category (the barring probability is lowest), and ACDC category "4" may mean the highest ACDC category (the barring probability is highest).

When the AS layer (that is, the RRC layer) receives the "uncategorized indication/information" or the ACDC category "0" from the NAS, the lowest ACDC category (the barring probability is lowest) provided from the current network (base station) is applied when performing the ACDC check for the RRC connection establishment for the service request procedure or the TAU/RAU procedure. This is the same in the roaming situation and the non-roaming station.

If not, if the application-related attribute information (for example, the ACDC category information) is not provided from the NAS layer to the AS layer (that is, the RRC layer), the AS layer (that is, the RRC layer) may apply the highest ACDC category (the barring probability is lowest) provided from the network (the base station) when performing the ACDC check for the RRC connection establishment for the service request procedure or the TAU/RAU procedure.

i) The non-roaming situation will be descried below as an example. It is assumed that in the current configured application-related attribute information (for example, the ACDC category information), ACDC category 0 (=reserved), ACDC category I (the highest category ACDC), ACDC category II, ACDC category III, and ACDC category IV (the lowest category ACDC) are present. In addition, according to the ACDC barring information provided from the network (the base station), it is assumed that ACDC barring information on the ACDC category I (the highest category ACDC), ACDC barring information on the ACDC category II, ACDC barring information on the ACDC category III, ACDC barring information on the ACDC category IV, and ACDC barring information on the ACDC category V (the lowest category ACDC) are present. In this case, when the UE executes the Google Talk, the application layer provides ID information on the Google Talk application to the NAS layer. However, when the corresponding application-related attribute information (for example, the ACDC category information) is not present in the NAS layer, the UE provides the "uncategorized indication/information" or the ACDC category "0" to the AS layer (that is, the RRC layer). When the AS layer (that is, the RRC layer) receives the "uncategorized indication/information" or the ACDC category "0" from the NAS, the AS layer (that is, the RRC layer) applies the ACDC barring information for the lowest ACDC category V (the barring probability is highest) provided from the current network (base station) is applied when performing the ACDC check for the RRC connection establishment for the service request procedure or the TAU/RAU procedure.

If not, if the application-related attribute information (for example, the ACDC category information) is not provided from the NAS layer to the AS layer (that is, the RRC layer), the AS layer (that is, the RRC layer) may apply the ACDC barring information for the lowest ACDC category V provided from the network (the base station) when performing the ACDC check for the RRC connection establishment for the service request procedure or the TAU/RAU procedure.

i) The non-roaming situation will be descried below as another example. It is assumed that in the current configured application-related attribute information (for example, the ACDC category information), ACDC category 0 (=reserved), ACDC category I (the highest category ACDC), ACDC category II, ACDC category III, ACDC category IV, and ACDC category V (the lowest category ACDC) are present. In addition, according to the ACDC barring information provided from the network (the base station), it is assumed that ACDC barring information for the ACDC category I (the highest category ACDC), ACDC barring information for the ACDC category II, ACDC barring information for the ACDC category III, and ACDC barring information for the ACDC category IV are present. When the UE executes the Google Talk, in the case where the application layer provides ID information on the Google Talk application to the NAS layer and the NAS layer verifies that the corresponding application is the ACDC category V (that is, in the case where ACDC category mapping information on the Google Talk is the ACDC category V), the UE provides the ACDC category V information to the AS layer (that is, the RRC layer). Even if the AS layer (that is, the RRC layer) receives the ACDC category V information from the NAS, the ACDC barring information for the ACDC category V received from the current network is not present, and thus, the AS layer (that is, the RRC layer) applies the ACDC barring information for the lowest ACDC category IV provided from the current network (base station) when performing the ACDC check for the RRC connection establishment for the service request procedure or the TAU/RAU procedure.

i) The non-roaming situation will be descried below as yet another example. It is assumed that in the current configured application-related attribute information (for example, the ACDC category information), ACDC category 0 (=reserved), ACDC category I (the highest category ACDC), ACDC category II, ACDC category III, ACDC category IV, and ACDC category V (the lowest category ACDC) are present. In addition, according to the ACDC barring information provided from the network (the base station), it is assumed that ACDC barring information for the ACDC category I (the highest category ACDC), ACDC barring information for the ACDC category II, ACDC barring information for the ACDC category III, and ACDC barring information for the ACDC category IV are present. In this case, when the UE executes the Google Talk, the application layer provides ID information on the Google Talk application to the NAS layer. However, when the corresponding application-related attribute information (for example, the ACDC category information) is not present in the NAS layer (that is, when the ACDC category mapping information for the Google Talk is not present), the UE provides the "uncategorized indication/information" or the ACDC category "0" (the special ACDC category for the uncategorized application) to the AS layer (that is, the RRC layer). When the AS layer (that is, the RRC layer) receives the "uncategorized indication/information" or the ACDC category "0" from the NAS, the AS layer (that is, the RRC layer) applies ACDC barring information for the lowest ACDC category IV provided from the current network (base station) when performing the ACDC check for the RRC connection establishment for the service request procedure or the TAU/RAU procedure.

Meanwhile, if the NAS layer does not provide the application-related attribute information (for example, the ACDC category information) to the AS layer (that is, the RRC layer), the AS layer (that is, the RRC layer) may apply the ACDC barring information for the lowest ACDC category IV provided from the network (the base station) when performing the ACDC check for the RRC connection establishment for the service request procedure or the TAU/RAU procedure.

On the other hand, the roaming situation will be descried below as an example. In the UE, when the ACDC barring information provided from the current HPLMN and the ACDC barring information provided from the VPLMN network (base station) are different from each other, the UE operation may operate the same as the UE operation in the case of each of non-roaming scenarios i), i), and iii).

V. Proposal 5 of the Present Invention (Proposal 18 in Provisional Application)

In proposal 5 of the present invention, a situation in which a plurality of application (some application are not categorized) is being executed in the UE and thus, a plurality of ACDC categories is present will be described.

V-1. Proposal 5-1 of the Present Invention (Proposal 18a in Provisional Application)

FIGS. 25a to 28b are signal flowcharts illustrating proposal 5-2 of the present invention.

When multiple application-related attribute information, ACB skip-related indication, and uncategorized application information are (simultaneously) provided from an application layer, i) only the highest or lowest application-related attribute information is provided to the AS layer (that is, the RRC layer), in which the uncategorized application information is ignored; or ii) both the multiple application-related attribute information and the uncategorized application information may be provided to the AS layer (that is, the RRC layer).

The uncategorized application information means a special ACDC category (for example, an ACDC category of "0" or "99") for the uncategorized application information.

The schemes i) and ii) are recognized and determined by the NAS layer, and in this case, one of the schemes i) and ii) may be implemented and operated by network configuration/policy, UE capability, and the like.

Alternatively, in this case, the NAS layer defines a new RRC establishment factor value, a new call type, or a service type when a service request procedure (alternatively, a TAU/RAU procedure) starts on the basis of the highest or lowest application-related attribute information to transfer the defined new RRC establishment factor value, new call type, or service type to the AS layer (that is the RRC layer). In this case, the new RRC establishment factor value, the new call type, or the service type are used independently (only alone) or may be defined and used in combination. In this case, the uncategorized application information is ignored; or The uncategorized application information means a special ACDC category (for example, an ACDC category of "0" or "99") for the uncategorized application information.

The scheme i) is recognized and determined by the NAS layer, and in this case, either the highest or lowest information/ID scheme may be implemented and operated by network configuration/policy, UE capability, and the like.

When multiple application-related attribute information and ACB skip-related indication are (simultaneously) provided from the application layer, i) whether a service connection attempt by the application is allowed or not is determined by applying ACDC barring information based on the highest or lowest application-related attribute information. In this case, the uncategorized application information is ignored;

The uncategorized application information means a special ACDC category (for example, an ACDC category of "0" or "99").

The scheme i) is recognized and determined by the AS layer (that is, the RRC layer), and in this case, either the highest or lowest information/ID scheme may be implemented and operated by network configuration/policy, UE capability, and the like.

When the multiple application-related attribute information, the ACB skip-related indication, and the uncategorized application information which are received from the NAS layer are provided, the operation of the AS layer (that is, the RRC layer) is the same as a case where the information is simultaneously received from the application layer.

V-2. Proposal 5-2 of the Present Invention (Proposal 18b in Provisional Application)

A basic UE operation is the same as that of the proposal 5-1 of the present invention, but information transmitted and received among the application layer, the NAS layer, the AS layer (that is, the RRC layer) has a difference.

In the proposal 5-2 of the present invention, the NAS layer provides the application-related attribute information or provides the application-related attribute information+the application-related attribute information to the AS layer (that is, the RRC layer). In this case, an operation method of the UE (the NAS and the AS) is basically the same as that of the proposal 5-1 of the present invention.

V-3. Proposal 5-3 of the Present Invention (Proposal 18c in Provisional Application)

FIGS. 29a to 30b are signal flowcharts illustrating proposal 5-3 of the present invention.

When the multiple application-related attribute information, ACB skip-related indication, and uncategorized application information which are received from the application layer are (simultaneously) provided, i) on the basis of the application-related attribute information acquired in step 0), a category of the application is determined. In this case, the highest or lowest category may be selected. Thereafter, the ACDC check is performed on the basis of the ACDC barring information received from the AS layer (that is, the RRC layer). When the ACDC check is passed, the service request procedure or the TAU TAU/RAU procedure therefor is performed. When the ACDC check is not passed, the service request procedure or the TAU TAU/RAU procedure is not performed. In this case, the uncategorized application information is ignored.

Hereinabove, the uncategorized application information means a special ACDC category (for example, an ACDC category of "0" or "99").

The scheme i) is recognized and determined by the NAS layer, and in this case, either the highest or lowest category may be selected by network configuration/policy, UE capability, and the like. Herein, in step 0), the NAS layer acquires the related information.

When the application-related attribute information and the uncategorized application information are present which are received from the NAS layer (alternatively, the application layer) are in plural, i) on the basis of the application-related attribute information acquired in step 0), a category of the application is determined. In this case, the highest or lowest category may be selected, and the ACDC check may be performed on the basis of the selected highest or lowest category. In this case, the uncategorized application information may be ignored.

Meanwhile, the proposals 1, 4, and 5 will be described as follows according to parts for the EAB and the ACDC in section F of the 3GPP standard TS 24.301 document.

When the US configures the ACDC, the NAS layer determines whether any ACDC category is applied to the request on the basis of the application ID and the configuration information which are transferred from the higher layer. When the application ID is not mapped even in any ACDC category, the NAS layer considers that the application is not categorized and considers that the application corresponds to the special ACDC category (for example, the category of 0 or 99).

When one ACDC category is applied, the EMM sublayer may notify the ACDC category to the lower layer for the purpose of the access control, and when a plurality of ACDC categories is applied, the EMM sublayer may notify the ACDC category having the highest rank to the lower layer for the purpose of the access control.

Alternatively, when one ACDC category is applied, the EMM sublayer may notify the ACDC category to the AS layer (that is, the RRC layer) for the purpose of the access control, and when a plurality of ACDC categories is applied, the EMM sublayer may notify all of the ACDC categories to the lower layer for the purpose of the access control.

Alternatively, when any ACDC category is not applied, the EMM sublayer may notify the special ACDC category (for the uncategorized application) to the AS layer (that is, the RRC layer) for the purpose of the access control or indication information notifying the uncategorized application.

Alternatively, when the plurality of ACDC categories and the special category are applicable, the EMM sublayer may notify the highest (alternatively, lowest) ACDC category among the special categories to the lower layer.

Alternatively, when the plurality of ACDC categories and the special category are applicable, the EMM sublayer may notify the plurality of ACDC categories and the special category or the indication information notifying the uncategorized application to the lower layer.

However, the following cases are excluded.

A case where in the selected PLMN, the UE uses AC11 to AC15

A case where the request responds to the paging

A case where the RRC establishment factor is configured as "Emergency Call"

TABLE 3

| NAS procedure | RRC establishment factor | Call type |
| --- | --- | --- |
| Tracking Area Update | In the case where the UE does not have the PDN connection established for an emergency bearer service and does not start the PDN connection request having the request type configured as "emergency", and in the case where the UE triggers for MO ACDC category I, the RRC establishment factor is set as MO signaling. | "originating ACDC Cat I" |
| | In the case where the UE does not have the PDN connection established for the emergency bearer service and does not start the PDN connection request having the request type set as "emergency", and in the case where the UE triggers for MO ACDC category II, the RRC establishment factor is set as MO signaling. | "originating ACDC Cat II" |
| | In the case where the UE does not have the PDN connection established for the emergency bearer service and does not start the PDN connection request having the request type set as "emergency", and in the case where the UE triggers for MO ACDC category III, the RRC establishment factor is set as MO signaling. | "originating ACDC Cat III" |

TABLE 3-continued

| NAS procedure | RRC establishment factor | Call type |
|---|---|---|
| | In the case where the UE does not have the PDN connection established for an emergency bearer service and does not start the PDN connection request having the request type configured as "emergency", and in the case where the UE triggers for MO ACDC category IV, the RRC establishment factor is set as MO signaling. | "originating ACDC Cat IV" |
| | In the case where the UE does not have the PDN connection established for an emergency bearer service and does not start the PDN connection request having the request type configured as "emergency", and in the case where the UE triggers for MO ACDC category V, the RRC establishment factor is set as MO signaling. | "originating ACDC Cat V" |
| | In the case where the UE does not have the PDN connection established for an emergency bearer service and does not start the PDN connection request having the request type configured as "emergency", and in the case where the UE triggers for MO ACDC category V, the RRC establishment factor is set as MO signaling. | "originating ACDC Cat 99" (special category) |

TABLE 4

| Service Request | In the case where the service request is to request a radio resource of a user plane and triggered for MO ACDC category I, the RRC establishment factor is set as MO data. | "originating ACDC Cat I" |
|---|---|---|
| | In the case where the service request is to request a radio resource of a user plane and triggered for MO ACDC category II, the RRC establishment factor is set as MO data. | "originating ACDC Cat II" |
| | In the case where the service request is to request a radio resource of a user plane and triggered for MO ACDC category III, the RRC establishment factor is set as MO data. | "originating ACDC Cat III" |
| | In the case where the service request is to request a radio resource of a user plane and triggered for MO ACDC category IV, the RRC establishment factor is set as MO data. | "originating ACDC Cat IV" |
| | In the case where the service request is to request a radio resource of a user plane and triggered for MO ACDC category V, the RRC establishment factor is set as MO data. | "originating ACDC Cat V" |
| | In the case where the service request is to request a radio resource of a user plane and triggered for the uncategorized application, the RRC establishment factor is set as MO data. | "originating ACDC Cat 99" (special category) |

Meanwhile, the proposals 1, 4, and 5 will be described according to a 3GPP standard TS 24.301 document.

The base station transmits SIB type 2 including common radio resource configuration information to all the UEs. The SIB type 2 may include the following information.

TABLE 5

Description of SIB type 2 field ac-BarringFactor
When a random value generated by the UE is smaller than a value of ac-BarringFactor, access is allowed. If not, the access is barred.
acdc-BarringFactor
When the random value generated by the UE is smaller than a value of acdc-BarringFactor, access is allowed. If not, the access is barred.
acdc-BarringForMO-Data per ACDC category
ACDC check for MO call per ACDC category
acdc-BarringForMO-Signalling per ACDC category
ACDC check for MO signaling per ACDC category
ACDC category
ACDC category (for example, ACDC Cat I, ACDC Cat II, . . . , ACDC Cat 127).
ac-BarringForSpecialAC
ACB check for ACs 11 to 15. The first/the leftmost bit is a bit for AC11 and the second bit is a bit for AC 12.
acdc-BarringForSpecialAC TABLE 5-continued Description of SIB type 2 field ACB check for ACs 11 to 15. The first/the leftmost bit is a bit for AC11 and the second bit is a bit for AC 12.
ac-BarringTime
Mean access barring time (second)

Meanwhile, the UE performs the RRC connection procedure according to a request of the higher layer. When performing the procedure, the NAS layer of the UE provides one ACDC category to the AS layer (that is, the RRC layer) performs the ACDC barring check on the basis of the provided ACDC category. In this case, even in the case of determining and providing the highest or lowest ACDC category among the plurality of ACDC categories (including the uncategorized application), the ACDC barring check is performed on the basis of the ACDC category.

1> While the higher layer indicates the RRC connection request as an object of the ACDC check, in the case where the higher layer provides the ACDC category and the UE tries to establish the RRC connection for the MO with respect to ADCD category I (categories II, III, . . . ), 2> the UE performs the ACDC barring check per ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the UE provides the ACDC category and the UE establishes the RRC connection for the MO signaling, 2> the UE performs the ACDC barring check per ACDC category by using Tyyy as Tbarring and acdc-BarringForMO-Signalling as an ACDC barring parameter.

2> In the case where the access is barred,

3> the UE notifies a failure of the RRC connection establishment to the higher layer and notifies that the ACDC is applied to the MO signaling.

On the other hand, a method of providing a call type by the NAS layer will be described as follows.

1> While the higher layer indicates the RRC connection request as an object of the ACDC check, in the case where the higher layer provides the ACDC category and the UE tries to establish the RRC connection for the MO with respect to ADCD category I (categories II, III, . . . ), 2> the UE performs the ACDC barring check per ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the higher layer provides the indication information notifying the special ACDC category (for example, the category of 0 or 99) or the uncategorized application and the UE establishes the RRC connection for the MO with respect to the special ACDC category (for example, the category of 0 or 99), 2> the UE performs the ACDC barring check with respect to the selected lowest ACDC category by using Txxx as Tbarring, using acdc-BarringForMO-Data as an ACDC barring parameter, and selecting the lowest ACDC category provided network through the SIB.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the higher layer provides the ACDC category and the UE tries to establish the RRC connection for the MO with respect to ADCD category I (categories II, III, . . . ), 2> The UE performs the ACDC barring check per ACDC category by using Tyyy as Tbarring and acdc-BarringForMO-Signalling as an ACDC barring parameter.

2> In the case where the access is barred,

3> the UE notifies a failure of the RRC connection establishment to the higher layer and notifies that the ACDC is applied to the MO signaling.

1> Meanwhile, while the higher layer indicates the RRC connection request as an object of the ACDC check, in the case where the higher layer provides the indication information notifying the special ACDC category (for example, the category of 0 or 99) or the uncategorized application and the UE establishes the RRC connection for the MO with respect to the special ACDC category (for example, the category of 0 or 99), 2> the UE performs the ACDC barring check with respect to the selected lowest ACDC category by using Txxx as Tbarring, using acdc-BarringForMO-Data as an ACDC barring parameter, and selecting the lowest ACDC category provided network through the SIB.

2> In the case where the access is barred,

3> the UE notifies a failure of the RRC connection establishment to the higher layer and notifies that the ACDC is applied to the MO signaling.

On the other hand, when the NAS layer provides the indication information notifying the special ACDC category (for example, the category of 0 or 99) or the uncategorized application to the AS layer (that is, the RRC layer) with respect to the uncategorized application, the AS layer (that is, the RRC layer) performs the ACDC barring check on the basis of the ACDC barring information for the lowest ACDC category among the ACDC barring information provided from the current network. This will be described in detail as follows.

1> While the higher layer indicates the RRC connection request as an object of the ACDC check, in the case where the higher layer provides the indication information notifying the special ACDC category (for example, the category of 0 or 99) or the uncategorized application and the UE establishes the RRC connection for the MO call, 2> the UE performs the ACDC barring check with respect to the selected lowest ACDC category by using Txxx as Tbarring, using acdc-BarringForMO-Data as an ACDC barring parameter, and selecting the lowest ACDC category provided network through the SIB.

2> In the case where the access is barred,

3> the UE notifies a failure of the RRC connection establishment to the higher layer and notifies that the ACDC for the MO call is applied.

1> Meanwhile, while the higher layer indicates the RRC connection request as an object of the ACDC check, in the case where the higher layer provides the indication information notifying the special ACDC category (for example, the category of 0 or 99) or the uncategorized application and the UE establishes the RRC connection for the MO signaling, 2> the UE performs the ACDC barring check per ACDC category by using Tyyy as Tbarring and using acdc-BarringForMO-Signalling as an ACDC barring parameter.

2> In the case where the access is barred,

3> the UE notifies a failure of the RRC connection establishment to the higher layer and notifies that the ACDC for the MO signaling is applied.

Meanwhile, when the NAS layer provides all of the ACDC categories to the AS layer (that is, the RRC layer), the AS layer (that is, the RRC layer) determines the highest or lowest category to perform the ACDC barring check based thereon. This will be described in detail as follows.

1> While the higher layer indicates the RRC connection request as an object of the ACDC check, in the case where the higher layer provides a plurality of ACDC categories/IDs and the UE tries to establish the RRC connection for the MO call, 2> the highest or lowest ACDC category is determined among the plurality of ACDC categories/IDs.

2> Thereafter, the UE performs the ACDC barring check per ACDC category by using Txxx as Tbarring and acdc-BarringForMO-Data as an ACDC barring parameter.

2> In the case where the access is barred,

3> the UE notifies a failure of the RRC connection establishment to the higher layer and notifies that the ACDC is applied to the MO call.

1> While the higher layer indicates the RRC connection request as an object of the ACDC check, in the case where the higher layer provides a plurality of ACDC categories/IDs and the UE tries to establish the RRC connection for the MO signaling, 2> the highest or lowest ACDC category is determined among the plurality of ACDC categories/IDs.

2> The UE performs the ACDC barring check per ACDC category by using Tyyy as Tbarring and using acdc-BarringForMO-Signalling as an ACDC barring parameter.

2> In the case where the access is barred,

3> the UE notifies a failure of the RRC connection establishment to the higher layer and notifies that the ACDC is applied to the MO signaling.

On the other hand, when the NAS layer provides the plurality of ACDC categories and the special ACDC category (for example, the category of 0 or 99) or the indication for the uncategorized application to the AS layer (that is, the RRC layer), the AS layer (that is, the RRC layer) determines the highest or lowest category to perform the ACDC barring check based thereon. This will be described in detail as follows.

1> While the higher layer indicates the RRC connection request as an object of the ACDC check, in the case where the higher layer provides the plurality of ACDC categories and the special ACDC category (for example, the category of 0 or 99) or the indication for the uncategorized application and the UE establishes the RRC connection for the MO call, 2> the UE determines the plurality of ACDC categories and the highest or lowest ACDC category among the special categories.

2> When the SIB2 includes the ac-BarringForMO-Data per ACDC category, the UE performs the ACDC barring check per ACDC category by using Txxx as Tbarring and using acdc-BarringForMO-Data as the ACDC barring parameter.

2> When the SIB2 does not include the ac-BarringForMO-Data per ACDC category, the UE performs the ACDC barring check on the basis of the lowest ACDC category by using Txxx as Tbarring and using acdc-BarringForMO-Data as the ACDC barring parameter.

2> In the case where the access is barred,

3> the UE notifies a failure of the RRC connection establishment to the higher layer and notifies that the ACDC is applied to the MO call.

1> Meanwhile, while the higher layer indicates the RRC connection request as an object of the ACDC check, in the case where the higher layer provides the plurality of ACDC categories and the special ACDC category (for example, the category of 0 or 99) or the indication for the uncategorized application and the UE establishes the RRC connection for the MO signaling, 2> the UE determines the plurality of ACDC categories and the highest or lowest ACDC category among the special categories.

2> When the SIB2 includes the acdc-BarringForMO-Signalling per ACDC category, the UE performs the ACDC barring check per ACDC category by using Txxx as Tbarring and using acdc-BarringForMO-Data as the ACDC barring parameter.

2> When the SIB2 does not include the ac-BarringForMO-Data per ACDC category, the UE performs the ACDC barring check on the basis of the lowest ACDC category by using Txxx as Tbarring and using acdc-BarringForMO-Data as the ACDC barring parameter.

2> In the case where the access is barred,

3> the UE notifies a failure of the RRC connection establishment to the higher layer and notifies that the ACDC is applied to the MO signaling.

On the other hand, the ACDC barring check per ACDC category will be described as follows according to a standard.

1> In the case where a timer T3xx or Tbarring is driving,

2> it is considered that the access to the corresponding cell is barred.

1> However, in the case where the SIB type 2 includes the ACDC barring parameter, 2> when the UE stores one or more access classes 11 to 15 in the USIM, 2> with respect to at least one of available access classes, a corresponding bit of acdc-BarringForSpecialAC included in the ACDC barring parameter is set as 0.

3> It is considered that the access to the corresponding cell is not barred.

2> If not,

3> a random value rand which is evenly distributed to satisfy a range of 0≤rand<1 is generated.

3> In the case where the rand is smaller than the value indicated by acdc-BarringFactor included in the ACDC barring parameter, 4> it is considered that the access to the corresponding cell is not barred.

3> If not,

4> it is considered that the access to the corresponding cell is barred.

1> If not,

2>2> it is considered that the access to the corresponding cell is barred;

1> In the case where the access to the corresponding cell is barred and the timers Txxx and Tbarring are not driving, 2>2> a random value rand which is evenly distributed to satisfy a range of 0≤rand<1 is generated.

2> The timer Tbarring set as a timer value calculated as follows is driven by using acdc-BarringTime in the ACDC barring parameter.

"$Tbarring$"=$(0.7+0.6*rand)*acdc$-BarringTime.

V-4. Proposal 5-4 of the Present Invention (Proposal 18d in Provisional Application)

As described above, when the UE acquires and stores the application-related attribute information (that is, application-related attribute information (for example, the ACDC category information)) through the ACDC device management object (MO) according to the USIM or OMA DM protocol, the NAS layer of the UE may acquire the stored application-related attribute information (for example, the ACDC category information) by using AT-command and the like. The AS layer (that is, the RRC layer) may provide the ACDC barring information received from the network to the NAS layer or the application layer. The NAS layer or the application layer may determine the ACDC category for the executing application on the basis of the application-related attribute information (for example, the ACDC category information). Thereafter, information on the determined category is provided to the AS layer (that is, the RRC layer) again. The AS layer (that is, the RRC layer) performs the ACDC barring check on the basis of the ACDC barring information received from the network or the category information received from the application layer.

Unlike this, when the UE acquires and stores the application-related attribute information (for example, the application-related attribute information (for example, the ACDC category information)) through the ACDC device management object (MO) according to the USIM or OMA DM protocol, the NAS layer of the UE may acquire the stored application-related attribute information (for example, the ACDC category information) by using AT-command and the like. The AS layer (that is, the RRC layer) may perform the ACDC barring check on the basis of the application-related attribute information (that is, the application-related attribute information (for example, the ACDC category information)) and the ACDC barring information.

Meanwhile, as described above, the barring check based on the ACDC barring information defined per application-related attribute information means the ACDC barring check.

Meanwhile, the proposals described above may be combined.

The contents described above may be implemented by hardware. This will be described with reference to the accompanying drawings.

Figure 31:
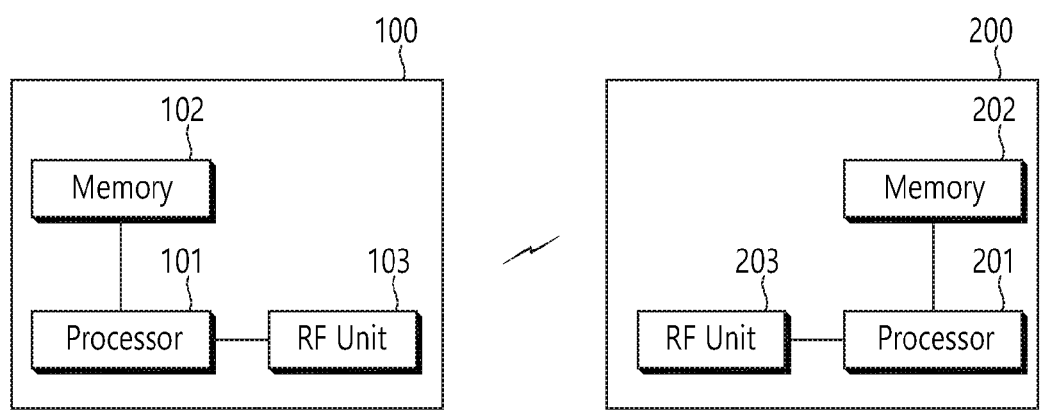
FIG. 31 is a diagram illustrating a configuration of a UE 100 and a base station 200 according to an embodiment of the present invention.

FIG. 31 is a configuration block diagram of UE 100 and a base station 200 according to the exemplary embodiment of the present invention.

As illustrated in FIG. 31, the UE 100 includes a storage means 101, a controller 102, and a transceiver 103. In addition, the base station 200 includes a storage means 201, a controller 202, and a transceiver 203.

The storage means 101 and 201 store the aforementioned methods.

The controllers 102 and 202 control the storage means 101 and 201 and the transceivers 103 and 203. In detail, the controllers 102 and 202 execute the methods stored in the storage means 101 and 201, respectively. In addition, the controllers 102 and 202 transmit the aforementioned signals through the transceivers 103 and 203.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A method for barring a network access, the method performed by a user equipment (UE) and comprising:
   determining, by a non-access stratum (NAS) layer of the UE, an application specific congestion control for data communication (ACDC) category for a network access request of one application based on information acquired from a higher layer above the NAS layer; and
   performing an ACDC barring check based on the determined ACDC category,
   wherein, if a plurality of ACDC categories are determined for the network access request of the one application, a highest ACDC category of the plurality of ACDC categories of the one application is used to perform the ACDC barring check, and
   wherein the network access request is barred or allowed according to the ACDC barring check.

2. The method of claim 1, further comprising:
   determining whether there exists ACDC barring information, which corresponds to the determined category,
   wherein the ACDC barring information is received from a network and used to perform the ACDC barring check.

3. The method of claim 2, wherein the ACDC barring information includes at least one of:
   a barring rate, a barring factor, a barring time, a roaming information, or an access class barring (ACB) skipping configuration, which are defined per a specific unit of an application.

4. The method of claim 2, wherein the ACDC barring information is configured per a public land mobile network (PLMN).

5. The method of claim 2, wherein if there does not exist the ACDC barring information, which corresponds to the determined category, a highest or lowest category is used to perform the ACDC barring check.

6. The method of claim 2, wherein the ACDC barring information is received from a home-PLMN (H-PLMN) or a visited PLMN (V-PLMN).

7. The method of claim 6, wherein if the ACDC barring information received from the H-PLMN or the V-PLMN does not include any information mapped to the determined category, a highest or lowest category is used to perform the ACDC barring check.

8. The method of claim 2, further comprising:
   receiving the ACDC barring information from a home-PLMN (H-PLMN) or a visited PLMN (V-PLMN).

9. The method of claim 8, wherein if the ACDC barring information received from the H-PLMN or the V-PLMN does not include any information mapped to the determined category, the corresponding ACDC barring information used for the ACDC barring check is for a highest or lowest category.

10. The method of claim 1, wherein the information acquired from the higher layer indicates an uncategorized application.

11. The method of claim 1, further comprising:
    receiving ACDC configuration information including information on ACDC categories.

12. The method of claim 11, wherein the ACDC configuration information is received at a home-PLMN (H-PLMN).

13. A user equipment (UE) for barring a network access, the UE comprising:
    a transceiver;
    a processor configured to control the transceiver and configured to:
    operate a non-access stratum (NAS) layer and a higher layer above the NAS layer,
    wherein the NAS layer determines an application specific congestion control for data communication, ACDC, category for a network access request of one application based on information acquired from the higher layer;
    wherein the NAS layer performs a ACDC barring check based on the determined ACDC category,
    wherein if a plurality of ACDC categories are determined for the network access request of the one application, a highest ACDC category of the plurality of ACDC categories of the one application is used to perform the ACDC barring check, and
    wherein the network access request is barred or allowed according to the ACDC check.

14. The UE of claim 13,
    wherein the processor determines whether there exists ACDC barring information, which corresponds to the determined category, and
    wherein the ACDC barring information is received from a network and used to perform the ACDC barring check.

15. The UE of claim 14, wherein the ACDC barring information includes at least one of:
    a barring rate, a barring factor, a barring time, a roaming information, and or an access class barring (ACB) skipping configuration, which are defined per a specific unit of an application.

16. The UE of claim 14, wherein the ACDC barring information is configured per a public land mobile network (PLMN).

17. The UE of claim 14, wherein if the ACDC barring information which corresponds to the determined category does not exist, a highest or lowest category is used to perform the ACDC barring check.

18. The UE of claim 13, wherein the information acquired from the higher layer indicates an uncategorized application.

* * * * *